United States Patent
Farb et al.

(10) Patent No.: US 11,905,929 B2
(45) Date of Patent: Feb. 20, 2024

(54) MPPT HIGH LEVEL CONTROL OF A TURBINE CLUSTER

(71) Applicants: Mark Daniel Farb, Lawrence, NY (US); Jonathan Forbes, Lauderhill, FL (US)

(72) Inventors: Mark Daniel Farb, Lawrence, NY (US); Jonathan Forbes, Lauderhill, FL (US)

(73) Assignee: FLOWER TURBINES, INC., Lawrence, NY (US)

( * ) Notice: Subject to any disclaimer, the term of this patent is extended or adjusted under 35 U.S.C. 154(b) by 0 days.

(21) Appl. No.: 18/113,366

(22) Filed: Feb. 23, 2023

(65) Prior Publication Data
US 2023/0250793 A1 Aug. 10, 2023

Related U.S. Application Data

(63) Continuation of application No. PCT/US2023/062170, filed on Feb. 8, 2023.
(Continued)

(51) Int. Cl.
*F03D 7/02* (2006.01)
*F03D 7/06* (2006.01)
(Continued)

(52) U.S. Cl.
CPC ............ *F03D 7/0244* (2013.01); *F03B 15/00* (2013.01); *F03B 15/06* (2013.01); *F03D 7/0204* (2013.01);
(Continued)

(58) Field of Classification Search
CPC ........ F03B 15/06; F03B 15/00; F03D 7/0204; F03D 7/042; F03D 7/06; F03D 7/0244; F03D 9/257; F03D 7/048; F05B 2270/204
See application file for complete search history.

(56) References Cited

U.S. PATENT DOCUMENTS

| 6,784,566 B2 | 8/2004 | Thomas |
| 7,902,688 B2 | 3/2011 | Krivcov |

(Continued)

FOREIGN PATENT DOCUMENTS

| CN | 103683622 A | 3/2014 |
| EP | 3096004 A1 | 11/2016 |

(Continued)

OTHER PUBLICATIONS

International Search Report and Written Opinion for International Application No. PCT/US2022/082035 dated Mar. 28, 2023 (8 pages).

(Continued)

*Primary Examiner* — Viet P Nguyen
(74) *Attorney, Agent, or Firm* — Finnegan, Henderson, Farabow, Garrett & Dunner LLP

(57) ABSTRACT

Systems, methods, and non-transitory computer readable media including instructions for coordinating MPPT operations for a cluster of geographically-associated fluid turbines are disclosed. Coordinating MPPT operations for a cluster of geographically-associated fluid turbines includes receiving data from the cluster of geographically-associated fluid turbines; determining changes to total power output of the cluster based on changes in loading states of individual fluid turbines in the cluster; selecting a combination of loading states for the individual fluid turbines in the cluster to coordinate total power output for the cluster; and transmitting the selected combination of loading states to at least some of the individual fluid turbines in the cluster in order to vary rotational speeds of the at least some of the individual fluid turbines in the cluster.

24 Claims, 23 Drawing Sheets

Related U.S. Application Data

(60) Provisional application No. 63/329,900, filed on Apr. 12, 2022, provisional application No. 63/307,653, filed on Feb. 8, 2022.

(51) Int. Cl.
  F03B 15/00 (2006.01)
  F03B 15/06 (2006.01)
  F03D 7/04 (2006.01)
  F03D 9/25 (2016.01)

(52) U.S. Cl.
  CPC ............ *F03D 7/042* (2013.01); *F03D 7/048* (2013.01); *F03D 7/06* (2013.01); *F03D 9/257* (2017.02); *F05B 2270/204* (2020.08)

(56) References Cited

U.S. PATENT DOCUMENTS

| | | |
|---|---|---|
| 7,944,067 B2 | 5/2011 | Kammer |
| 7,988,413 B2 | 6/2011 | Haar |
| 8,207,623 B2 | 6/2012 | Rivas |
| 8,333,564 B2 | 12/2012 | Krivcov |
| 8,364,323 B2 | 1/2013 | Arinaga |
| 8,491,262 B2 | 7/2013 | McGrath |
| 8,648,483 B2 | 2/2014 | Haar |
| 9,689,372 B2 | 6/2017 | Gonzalez |
| 9,835,138 B2 | 12/2017 | Westergaard |
| 10,330,086 B2 | 6/2019 | Farb |
| 10,612,519 B2 | 4/2020 | Franke et al. |
| 2002/0105190 A1 | 8/2002 | Thomas |
| 2002/0125880 A1 | 9/2002 | Murai |
| 2005/0034937 A1 | 2/2005 | Agardy |
| 2005/0143221 A1 | 6/2005 | Kuwahara |
| 2006/0131889 A1 | 6/2006 | Corten |
| 2009/0220342 A1 | 9/2009 | Wu et al. |
| 2009/0243295 A1 | 10/2009 | Kammer |
| 2009/0278352 A1 | 11/2009 | Rivas |
| 2010/0140939 A1 | 6/2010 | Scholte-Wassink |
| 2011/0037269 A1 | 2/2011 | Poon et al. |
| 2011/0111700 A1 | 5/2011 | Hacket |
| 2011/0164977 A1 | 7/2011 | Vallejo |
| 2011/0215640 A1 | 9/2011 | Donnelly |
| 2011/0302864 A1 | 12/2011 | Ramsay |
| 2011/0304150 A1 | 12/2011 | Hara |
| 2012/0056424 A1 | 3/2012 | Holstein |
| 2012/0169052 A1 | 7/2012 | Leipold-Buettner |
| 2012/0175879 A1 | 7/2012 | Keech |
| 2013/0008242 A1 | 1/2013 | Sakaguchi |
| 2013/0197704 A1 | 8/2013 | Pan |
| 2014/0010656 A1 | 1/2014 | Nies |
| 2014/0150843 A1 | 6/2014 | Pearce |
| 2015/0076828 A1 | 3/2015 | Palethorpe |
| 2015/0123401 A1 | 5/2015 | Vigars |
| 2015/0377213 A1 | 12/2015 | Deshpande |
| 2016/0222946 A1 | 8/2016 | Krings |
| 2017/0054301 A1 | 2/2017 | Fintzos |
| 2017/0058899 A1 | 3/2017 | Ichihara |
| 2017/0074249 A1 | 3/2017 | Smook |
| 2017/0114778 A1 | 4/2017 | Madson |
| 2018/0301906 A1 | 10/2018 | Qureshi |
| 2019/0052206 A1 | 2/2019 | Noderer |
| 2019/0186145 A1 | 6/2019 | Farb |
| 2020/0280281 A1 | 9/2020 | Vaidyanathan |
| 2021/0033062 A1* | 2/2021 | Mishra ................... F03D 7/048 |
| 2021/0098994 A1 | 4/2021 | White |
| 2021/0164442 A1 | 6/2021 | Bonfiglio |
| 2022/0077686 A1 | 3/2022 | Ma |
| 2023/0184218 A1 | 6/2023 | Lund |

FOREIGN PATENT DOCUMENTS

| | | |
|---|---|---|
| EP | 3023636 B1 | 4/2021 |
| GB | 2440264 A | 1/2008 |
| JP | 2007107496 A | 4/2007 |
| WO | WO 2013/174090 A1 | 11/2013 |

OTHER PUBLICATIONS

Haces-Fernandez, et al., "Improving wind farm power output through deactivating selected wind turbines, Energy Conversion and Management", vol. 187, 2019, pp. 407-422, ISSN 0196-8904.

Howland, M.F., Quesada, J.B., Martínez, J.J.P et al. "Collective wind farm operation based on a predictive model increases utility-scale energy production." *Nat Energy* 7, 818-827 (2022).

Howland et al., "Wind farm power optimization through wake steering." Proc Natl Acad Sci U S A., May 20, 2019, vol. 116, No. 29, p. 14495-500.

Pape et al., "Turbine Startup and Shutdown in Wind Farms Featuring Partial Power Processing Converters," IEEE Open Access Journal of Power and Energy, vol. 7, pp. 254-264, 2020, doi: 10.1109/OAJPE.2020.3006352.

"*Each Wind Harvester Project in 2023 and 2024 will advance our commercialization objectives*" Wind Harvest International, 2023, Inc. https://windharvest com/about/projects/ (Last accessed on Feb. 17, 2023).

Chandler D.L., "A new method boosts wind farms' energy output, without new equipment," MIT News, Aug. 22, 2022.

PCT International Search Report and Written Opinion dated Jul. 28, 2023, issued in corresponding International Application No. PCT/US23/62170 (6 pgs.).

Blum, Franz, et al. "Device for providing a platform on the roof of a building", May 14, 2020, EPO, DE 102018128308-A1 (Year: 2020).

Arias, Vega Fernando et al., "Mounting for Instruments on Buildings and Method for Installing Same", Oct. 15, 2012, ES-2388388-A1 (Year: 2012).

Guetty, Richard Jean Claude, "Covering Element for Houses, Motor-Vehicles or the Like", Mar. 30, 2015, Romanian Patent Office, RO 130984A2 (Year: 2016).

Non-Final Office Action U.S. Appl. No. 18/195,592 dated Jul. 18, 2023, in the United States Patent and Trademark Office.

Non-Final Office Action Application No. 118/113,381 dated Jul. 14, 2023, in the United States Patent and Trademark Office.

Non-Final Office Action U.S. Appl. No. 18/113,388 dated Jun. 9, 2023, in the United States Patent and Trademark Office.

Non-Final Office Action U.S. Appl. No. 18/195,412 dated Aug. 16, 2023, in the United States Patent and Trademark Office.

Non-Final Office Action U.S. Appl. No. 18/195,437 dated Jul. 11, 2023, in the United States Patent and Trademark Office.

Notice of Allowance U.S. Appl. No. 18/195,455 dated Jul. 20, 2023, in the United States Patent and Trademark Office.

Non-Final Office Action U.S. Appl. No. 18/298,584 dated Jul. 20, 2023, in the United States Patent and Trademark Office.

* cited by examiner

MPPT HIGH LEVEL CONTROL OF A TURBINE CLUSTER

CROSS REFERENCES TO RELATED APPLICATIONS

This application is a continuation of PCT International Application No. PCT/US23/62170, filed on Feb. 8, 2023, which claims the benefit of priority of U.S. Provisional Patent Application No. 63/307,653, filed on Feb. 8, 2023, and U.S. Provisional Patent Application No. 63/329,900, filed on Apr. 12, 2022, all of which are incorporated herein by reference in their entirety

BACKGROUND

I. Technical Field

The present disclosure generally relates to the field of fluid turbines. More specifically, the present disclosure relates to systems, methods, and devices for operating a cluster of fluid turbines.

II. Background Information

As challenges posed by climate change continue to increase, more attention is devoted to green energy alternatives to fossil fuels. Some attractive alternatives to fossil fuels include turbines that harness power from a fluid flow, such as wind, ocean currents, a steam flow, or a gas flow. In some cases, due to physical constraints limiting how much energy may be generated by any single turbine, clusters of turbines may be constructed, allowing to aggregate energy generated by multiple individual turbines. For example, aggregating energy produced by a cluster of turbines may allow scaling up green energy production sufficiently to provide a reliable supply of green energy to an electrical grid, as a replacement for fossil fuels. However, clusters of fluid turbines may require coordinated maintenance, repairs, and safety checks. In addition, in some cases, coordinating the operations of clustered turbines may improve performance, allowing them to increase green energy production with improved efficiency. Systems and methods for coordinating operations of clustered turbines may therefore be beneficial.

SUMMARY

Embodiments consistent with the present disclosure provide systems and methods generally relating to operating a cluster of geographically-associated fluid turbines. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer readable storage media may store program instructions, which are executable by at least one processing device and perform any of the steps and/or methods described herein.

Consistent with disclosed embodiments, systems, methods, and computer readable media for coordinated braking of a plurality of geographically-associated fluid turbines are disclosed. The embodiments may include at least one processor configured to: access memory storing information indicative of a tolerance threshold for at least one operating parameter associated with the plurality of geographically-associated fluid turbines; receive information from at least one sensor indicative of the at least one operating parameter for a particular fluid turbine among the plurality of geographically-associated fluid turbines; compare the information indicative of the at least one operating parameter for the particular fluid turbine with the tolerance threshold stored in memory; determine, based on the comparison, whether the at least one operating parameter for the particular fluid turbine deviates from the tolerance threshold; and upon a determination that the at least one operating parameter for the particular fluid turbine deviates from the tolerance threshold, send a braking signal to each of the geographically-associated fluid turbines to slow each of the geographically-associated fluid turbines.

Consistent with disclosed embodiments, systems, methods, and computer readable media for coordinating MPPT operations for a cluster of geographically-associated fluid turbines are disclosed. The embodiments may include at least one processor configured to: receive data from the cluster of geographically-associated fluid turbines; determine changes to total power output of the cluster based on changes in loading states of individual fluid turbines in the cluster; select a combination of loading states for the individual fluid turbines in the cluster to coordinate total power output for the cluster; and transmit the selected combination of loading states to at least some of the individual fluid turbines in the cluster in order to vary rotational speeds of the at least some of the individual fluid turbines in the cluster.

Consistent with disclosed embodiments, systems, methods, and computer readable media for synchronizing a plurality of geographically-associated fluid turbines are disclosed. The embodiments may include at least one processor configured to: receive first signals indicative of a phase of a rotational cycle of a first plurality of rotating blades of a first fluid turbine of the plurality of geographically-associated fluid turbines, wherein the first plurality of rotating blades is configured to generate a first fluid turbine downstream fluid flow; receive second signals indicative of a phase of a rotational cycle of a second plurality of rotating blades of a second fluid turbine of the plurality of geographically-associated fluid turbines, wherein the second plurality of rotating blades is configured to receive at least a portion of the first fluid turbine downstream fluid flow and generate a differential power output attributable to the at least portion of the first fluid turbine downstream fluid flow; determine from the first signals and the second signals that greater aggregate power output is achievable through blade phase coordination; determine a phase correction between the first plurality of rotating blades and the second plurality of rotating blades based on the first signals and the second signals, in order to achieve the greater aggregate power output; calculate coordinating signals based on the determined phase correction; and output the coordinating signals to impose the phase correction and thereby achieve the greater aggregate power output.

DETAILED DESCRIPTION

Figure 1:
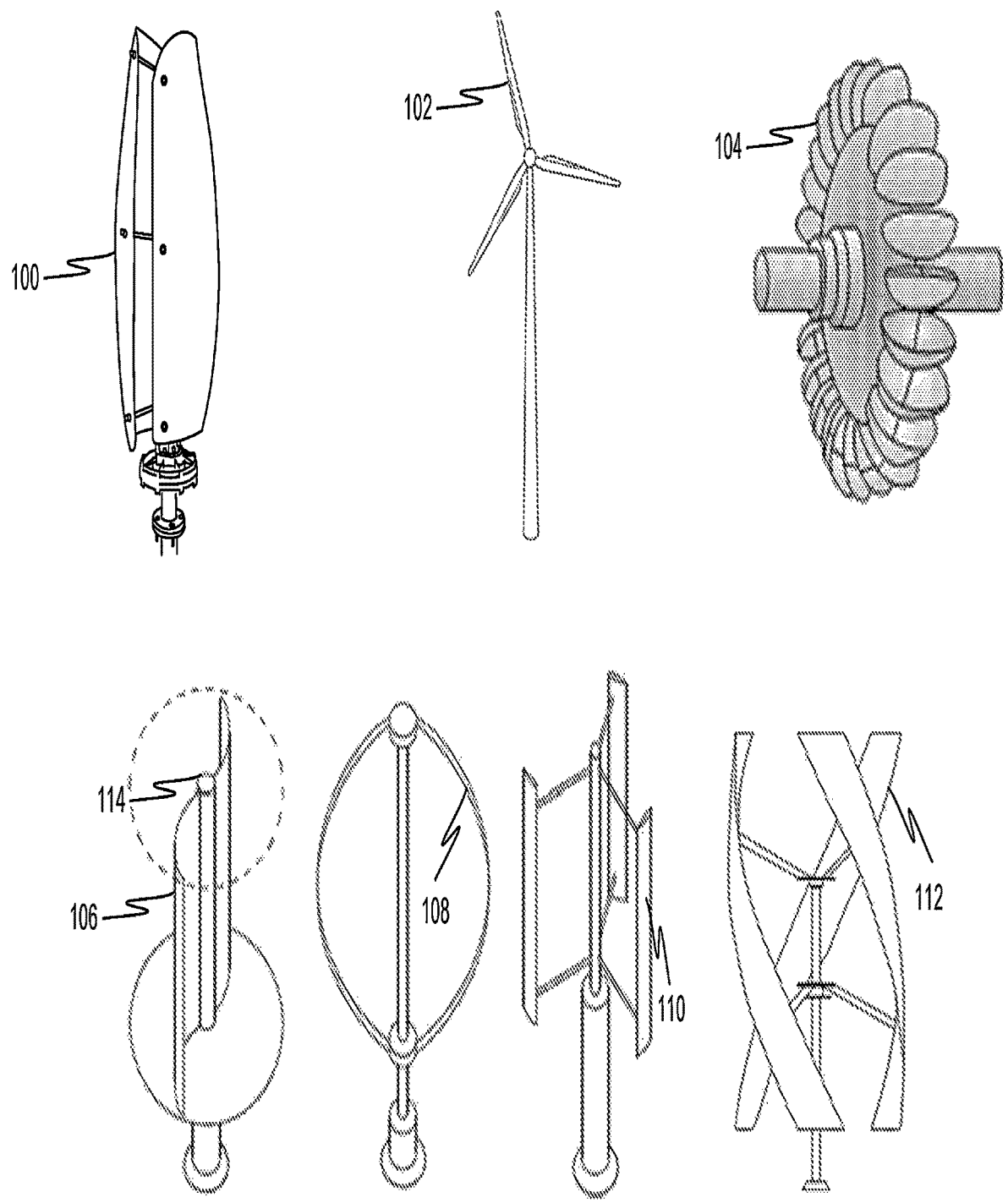
FIG. 1 illustrates an exemplary variety of fluid turbines, consistent with some embodiments of the present disclosure.

Disclosed herein are systems, methods, and non-transitory computer readable media for controlling and/or coordinating operations of a plurality of geographically-associated fluid turbines (e.g., a cluster of fluid turbines). The fluid turbines referred to herein may be configured to harness energy from wind, water, steam, and/or gas flow. Although some non-limiting examples are given relating to wind turbines (specifically vertical wind turbines), these examples are intended for illustrative purposes only, and do not limit this disclosure. Furthermore, in some cases the term "fluid turbine" may be understood to include an electric generator in an integral fluid energy conversion system.

Various terms used in this detailed description and in the claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily lack that feature or characteristic.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples, but is inclusive of general principles described herein and illustrated in the figures in addition to the general principles encompassed by the appended claims.

The present disclosure is directed to systems, devices, methods, and non-transitory computer readable for operating a plurality of geographically associated fluid turbines (e.g., a cluster of fluid turbines) in a coordinated manner to allow the cluster of fluid turbines to operate collectively as a single fluid energy conversion system. In some cases, each of the geographically associated fluid turbines may be exposed to the same environmental factors (e.g., the same or similar wind conditions, water current, and temperature). In some instances, coordinating the operation of the geographically associated fluid turbines as a cluster may involve responding to changes in environmental factors. For example, if fluid speed exceeds a safety threshold for operating a cluster of fluid turbines, braking may be applied in a coordinated manner to each fluid turbine in the cluster to prevent damage or breakage of mechanical parts for an entire cluster of fluid turbines. As another example, coordinated braking and re-starting of a cluster of fluid turbines may involve coordinating and/or synchronizing electrical power generation (e.g., AC power) from a fluid flow, e.g. to synchronize a phase of the AC power output, to conform with regulations for supplying electrical energy to a power grid, and/or to charge one or more batteries. As yet a further example, coordinating operations for a cluster of fluid turbines may involve tuning the operation of each fluid turbine in the cluster to improve the performance of the cluster as a whole, e.g., as an integral fluid energy conversion system including multiple individual fluid turbines. For instance, the operation of one or more fluid turbines in a cluster may be coordinated to exploit aerodynamical coupling between individual turbines, to apply one or more algorithms for optimizing turbine energy conversion (e.g., an algorithm may be applied to an individual turbine, to a subset of turbines in the cluster, and/or to each turbine in the cluster).

A flow (e.g., a fluid flow) may refer to movement or continual deformation of a fluid under an applied force. Flow may correspond to kinetic energy of particles or molecules of a fluid. For example, a temperature gradient in a fluid may cause warmer fluid to rise and cooler fluid to sink in a cyclical flow motion. Uneven heating of the Earth by the sun (e.g., combined with the Earth's rotation) may cause wind (e.g., airflow). Similarly, wind, water density differentials, gravity, and the Earth's rotation may cause ocean currents (e.g., water flow). Examples of turbines for obtaining energy from a flow may include a windmill, a waterwheel, a steam turbine, or a gas turbine.

A fluid turbine may include a mechanical device configured to capture energy from a fluid flow (e.g., a flow of water, steam, gas, or wind) and convert the captured energy to a form of work (e.g., a rotary motion). A fluid turbine may be combined with a generator to apply the work produced by the fluid turbine to generate electrical power (e.g., for feeding to an electrical power grid). A fluid turbine may include at least one moving part (e.g., a rotor) coupled to a plurality of blades. A fluid turbine may have a horizontal axis of rotation (e.g., the axis around which the fluid turbine rotates is substantially parallel to the ground or flow), or a vertical axis of rotation (e.g., the axis around which the fluid turbine rotates is at a right angle to the ground or flow). In some embodiments the axis of rotation may be neither horizontal or vertical, and in other embodiments, the axis of rotation may be variable. A fluid turbine may begin generating usable power when a fluid flow exceeds a lower threshold (e.g., a cut-in value). A fluid turbine may include a plurality of blades connected to a shaft. Fluid flow may cause the plurality of blades and shaft to rotate. The plurality of blades and shaft may connect to a rotor of an electric generator for converting the mechanical rotational motion of the plurality of blades and shaft to electrical energy, as described in greater detail below. Some embodiments may lack a shaft, with blades connected to a shaftless rotating disc or support. In such examples, the rotating disk or support may be part of a rotor-stator arrangement.

In embodiments involving a shaft, the shaft may include a pole, a rod, a post, a support, a pylon, or any other axle or axis. In some embodiments, a shaft may be used to support one or more objects in a vertical configuration. For example, blades of a vertical fluid turbine may be connected to a shaft allowing the blades to be supported vertically by the shaft which may rotate with the blades. Connecting the shaft with the blades to a rotor may allow transferring kinetic energy of a flowing fluid to a rotary motion by the rotor to produce electrical energy.

A blade (e.g., as part of a plurality of blades) of a turbine may refer to an object having a cross-sectional shape with a curved surface (e.g., an airfoil shape or a cupped shape typical of drag-type turbines) configured to cause a motion (e.g., a rotational motion) consistent with the fluid motion incident on the blades. A fluid turbine may include a plurality of blades mounted onto a rim of a disc for producing a tangential force to rotate a rotor connected thereto. Moving fluid may act on the blades of a fluid turbine causing the blades to rotate and impart rotational energy to a rotor. The blades may extend from the rotor in that they protrude from the rotor or from a mounting plate mechanically connected to the rotor. Connecting a plurality of blades to a rotor (e.g., directly or indirectly) may cause the plurality of blades to extend outwards and/or upwards from the rotor.

An electric generator (e.g., an alternator) may refer to a device including windings electromagnetically coupled to an alternating magnetic field via a rotor and stator allowing for conversion of energy in a non-electrical form (e.g., chemical, radiant, mechanical, thermal or nuclear energy) to electrical energy. For example, mechanical energy as rotational motion may be transferred from a turbine to a rotor of an electric generator. The rotational motion of the rotor may cause an alternating magnetic field to surround the windings, which may induce an alternating current, thereby converting mechanical energy to electrical energy. In some embodiments, the rotor may include a magnet or magnets, and the stator may include windings. In some embodiments, the rotor may include windings and the stator may include a magnet or magnets. In some embodiments, the rotor may be configured to rotate within the stator. For instance, the stator may be formed as a ring or donut surrounding the rotor. In some embodiments, the rotor is configured to rotate about the stator. For instance, the rotor may be formed as a ring or donut surrounding the stator. In some embodiments, the rotor is connected to blades that are configured to rotate in response to a wind flow. A wind flow may refer to a fluid flow consisting of air. In some embodiments, the rotor may be configured to rotate in response to water flow on an impeller (e.g., paddle wheel, a water wheel), or in response to steam or gas flow.

A rotor may refer to a rotating component of an electromagnetic system (e.g., an electric motor, electric generator, or an alternator). A rotor may rotate, turn, or spin to induce a torque around an axis of the rotor. A stator may refer to a stationary (e.g., non-moving) component of a rotary electromagnetic system. A rotor electromagnetically coupled to a stator may allow for interactions between an electromagnetic coil of an electric conducting wire (e.g., windings) and an alternating magnetic field. The interactions may allow conversion of electrical energy to mechanical energy as rotational motion (e.g., as in a motor) and to convert mechanical energy as rotational motion to electrical energy (e.g., as in an electric generator). For example, energy may flow from a rotating component to a stator, as in a generator where a stator may convert a rotating magnetic field to an alternating electric current.

Geographically-associated fluid turbines may refer to a plurality of fluid turbines positioned in relative proximity of each other, to form a group or cluster of fluid turbines. Geographically-associated fluid turbines may be positioned in an arrangement such that each fluid turbine may be exposed to substantially similar environmental conditions and fluid flow (e.g., wind conditions, temperature, precipitation, water current). In some embodiments, at least some of the geographically-associated fluid turbines may be fluidly coupled such that blade motion of a fluidly-coupled upstream fluid turbine may cause a fluid flow or turbulence that may affect or influence the blade motion of a fluidly-coupled downstream fluid turbine in the cluster. In some embodiments, each of the geographically-associated fluid turbines may be fluidly coupled with at least one other geographically associated fluid turbine. In some embodiments, at least one of the geographically-associated fluid turbines may be independent, such that fluid flow generated by the blade motion of one of the geographically-associated fluid turbines may have no effect on the blade motion of any other of the geographically-associated fluid turbines, and the fluid flow generated by the other geographically-associated fluid turbines may have no effect on the one geographically-associated fluid turbine, and at least some of the geographically-associated fluid turbines are fluidly dependent. In some embodiments, all of the geographically-associated fluid turbines may be independent, such that fluid flow generated by the blade motion of any one of the geographically-associated fluid turbines may have no effect on the blade motion of any other of the geographically-associated fluid turbines.

In some embodiments, each fluid turbine in a cluster of geographically associated fluid turbines may be connected to an electrical generator for separately converting the rotational blade motion of the fluid turbine to electrical energy. In some instances of this disclosure, the term "fluid turbine" may refer to a fluid turbine connected to an electric generator as a single fluid energy conversion unit. In some embodiments, a fluid turbine (e.g., each fluid energy conversion unit) may include dedicated electronic circuitry for monitoring, operating, and/or controlling the fluid turbine, as described in greater detail elsewhere in this disclosure, (e.g., the term "fluid turbine" may include a fluid turbine connected to an electric generator and dedicated electronic circuitry).

In some embodiments, geographically associated fluid turbines may be interconnected via electronic circuitry (e.g., the interconnecting electronic circuitry may differ from the electronic circuitry dedicated to each fluid turbine). For example, the interconnecting electronic circuitry may connect to each geographically-associated fluid turbine via each dedicated electronic circuitry. The interconnecting electronic circuitry may allow the plurality of geographically-associated fluid turbines to operate collectively as a single fluid energy conversion system (e.g., as a central control). For instance, the interconnecting electronic circuitry may allow coordinated aggregation of electrical power generated by each geographically associated fluid turbine in the cluster for outputting the aggregate electric power to an electrical grid. As another example, the interconnecting electronic circuitry may include a controller for coordinating the operation of one or more of the geographically associated fluid turbines, such as to coordinate braking, slowing, stopping, restarting, synchronizing two or more fluid turbines, controlling a relative phase between two or more fluid turbines, control a rotational speed, a rotational direction, and/or any other aspect of operating one or more fluid turbines.

Electronic circuitry may include any combination of electronic componentry (e.g., memory units, switches, transistors, diodes, gates, capacitors, inductors, resistors, transformers, converters, inverters, rectifiers, DC-to-DC converters, more power supplies, voltage sensors, current sensors, or other electronic componentry) connected via one or more connecting wires and/or contacts for performing one or more operations (e.g., logical operations) in response to receiving an electric signal as an input (e.g., from at least one processor operating as a controller). Circuitry may include one or more integrated circuits (ICs), including application-specific integrated circuits (ASICs), microchips, microcontrollers, microprocessors, all or part of a central processing unit (CPU), graphics processing unit (GPU), accelerated processing unit (APU), digital signal processor (DSP), field programmable gate array (FPGA), or other circuits suitable for executing computing instructions and/or capable of performing logical operations, e.g., based on a computing instruction or an input signal. The circuitry may further include one or more memory units, such as Random-Access Memory (RAM), a cache memory, a Read-Only Memory (ROM), a hard disk, an optical disk, a magnetic medium, a flash memory, other permanent, fixed, or volatile memory, or any other mechanism capable of storing data and/or computing instructions for performing a logical operation. The circuitry may further include one or more communication channels and/or links. The communication links may couple the one or more ICs to the memory, thereby enabling the one or more ICs to receive a computing instruction and/or data stored thereon required to perform a corresponding logical operation. The communication channels coupling the one or more ICs to the memory may include wired channels, such as one or more cables, fibers, wires, buses, and any other mechanically coupled communication channel. The communication channels may include wireless channels such as short, medium, and long-wave radio communication channels (e.g., Wifi, BlueTooth, Zigbee, cellular, satellite), optical, and acoustic communication channels. The communications channels or links may include wires, cables, and/or fibers configured to transmit power (e.g., AC and/or DC power) generated by one or more fluid turbines. The communications channels or links may include communication links for transmitting electronic signals readable by at least one processor.

Direct current (DC) may refer to a one-directional flow of electric charge. DC power may be used to operate a processor or controller. An example of DC power may include power produced by an electrochemical cell (e.g., a battery) or power stored in a capacitor. Electronic devices such as processors, controller, and memory devices may be with DC electricity. Alternating current (AC) may refer to a bi-directional flow of electrical charge exhibiting a period change in direction. An AC current flow may change between positive and negative due to the positive or negative flow of electrons, producing a sinusoidal AC wave. An alternator may create AC power by positioning a conductive coil (e.g., copper windings) inside a fluctuating magnetic field. The fluctuating magnetic polarities may cause electric current in the conductive coil to change direction, producing an electrical waveform signal. AC power may travel farther than DC power without losing power, which may be advantageous for delivering power from power generating systems to consumers of electricity. An electric generator may generate AC power, and an electric power grid may supply AC power to consumers.

A rectifier may refer to a device or circuitry that converts an alternating current (AC) to a direct current (DC) signal (e.g., an AC-to-DC converter). A rectifier may convert AC power (e.g., generated by an electric generator) to DC power (e.g., to power at least one processor). In some embodiments, each of the geographically-associated fluid turbines may be associated with a dedicated rectifier. The dedicated rectifiers for each fluid turbine may be housed in a separate housing (e.g., per fluid turbine), or in a common housing for multiple fluid turbines.

An inverter (e.g., a power inverter) may refer to a device or circuitry that converts a direct current (DC) signal to an AC signal (e.g., a DC-to-AC converter). An inverter may convert a DC signal to produce a square wave, a sine wave, a modified sine wave, a pulsed sine wave, a pulse width modulated wave (PWM) depending on the circuit design of the inverter. An inverter may convert DC power to AC power for transmitting to an electric power grid. In some embodiments, the plurality of geographically-associated fluid turbines may be associated with a single inverter for outputting collectively generated AC power to a power grid.

For instance, each AC power signal outputted by each geographically-associated fluid turbine may be converted to a DC power signal via each of the dedicated rectifiers. Circuitry (e.g., including at least one processor) may process the DC power signals to enable combining each of the DC power signals to form an aggregate DC power signal, such that converting the aggregate DC power signal via an inverter may produce an AC power signal that may be compatible for transmitting to an electric power grid.

In some embodiments, a fluid turbine may operate under one or more loads (e.g., power sinks, such as an electrical grid and/or battery bank) drawing power from the fluid turbine, causing a rotational speed of a fluid turbine to slow down. Controlling a load on a fluid turbine may help ensure compliance with one or more regulations, specifications, and/or recommendations relating to operation of the fluid turbine, and/or electrical grid, and/or a battery bank connected thereto. For example, absent a load, under high fluid speeds, a rotational speed of a fluid turbine may exceed an operating threshold, potentially leading to damage or destruction. As another example, varying fluid speeds may cause a rotational speed of a fluid turbine to vary as well, leading to a variable power output that may fail to comply with the requirements associated with an electrical grid.

As a further example, overcharging may lead to damage or destruction of a battery bank, requiring diversion of electric power to a different load (e.g., a dump load) once the battery bank reaches capacity. A dump load may provide a safety feature for a fluid turbine. Excess power generated under high fluid speeds may be routed to a dump load (e.g., or a dump resistor) to prevent the fluid turbine from spinning freely. A dump load may convert the excess power to heat. In some embodiments, a dump load may function as an electrical brake for a fluid turbine. In some cases, combining multiple AC power outputs from a cluster of geographically associated fluid turbines fluid turbines may cause the AC power outputs to interfere with each other, resulting in cancellations and loss.

For instance, aggregating different AC power outputs from different generators may pose problems due to different operating frequencies or phase angles, which may lead to synchronization issues and potential damage. Combining different AC power signals may result in cancellations if the phase angles of the signals are not properly aligned. When AC signals are out of phase with each other, the peaks and troughs of the signals may fail to line up, causing some of the energy in one signal to cancel the energy in the other signal (e.g., if a peak of one signal at least partially aligns with a trough of another signal), leading to a reduction in the overall power output of the combined signals (e.g., the aggregated power output). To avoid this, generators may be synchronized in phase (e.g., by adjusting the phase angle of one generator or by using a phase-locked loop) before combining the respective power outputs. Additionally, different generators may have different voltage levels, which may need to be regulated and/or balanced before transmitting power. Moreover, different AC outputs produced by different generators may be converted to DC for combining as an aggregate DC power output before transmitting power. Furthermore, different generators may have different response times to changes in loads, posing difficulties for maintaining a stable aggregated power output.

A charge controller may refer to an electronic device configured to help ensure compliance of a fluid turbine with one or more regulations, specifications, and/or recommendations. For instance, a charge controller may prevent overcharging of a battery bank by a fluid turbine while limiting a rotational speed of the fluid turbine (e.g., when the battery bank is full and/or under high fluid speed conditions), and may allow aggregation of power from multiple fluid turbines without incurring loss due to interference. A charge controller may include an AC-to-DC converter (e.g., a rectifier), one or more of a voltage sensor switch, a voltage regulator (e.g., for regulating a DC voltage for supplying DC power to a battery bank), and/or a dump load (e.g., for diverting excess power to prevent overcharging). In some embodiments, a charge controller may include a user interface (e.g., one or more Light Emitting Diodes, or LEDs) and/or features to protect against excessive voltage, current, and/or temperature.

A charge controller may be connected to an AC output of an electric generator connected to a fluid turbine. The AC-to-DC converter of the charge controller may convert the AC output to a DC signal (e.g., for aggregating with other DC signals produced by other charge controllers associated with other fluid turbines without incurring lossy interference). At least one voltage sensor switch of the charge controller may transmit the DC signal to charge the battery bank when the DC voltage level is beneath an upper limit for the battery bank, and may divert the DC signal (e.g., excess DC power) to the dump load when the DC voltage level exceeds the upper limit. The voltage regulator may regulate the DC voltage transmitted to the battery bank to comply with one or more specification, regulations, and/or recommendations associated with the battery bank.

An aggregate power signal may refer to a power signal produced by combining multiple electrical power signals originating from different power sources (e.g., generators) into a single, merged power signal. Aggregating power signals may require synchronizing the generators (e.g., synchronizing the frequency, the phase angle, and/or adjusting the voltage levels to reach a matched voltage level) or making the power signals asynchronous in a synchronized manner. Once the power signals from each generator are synchronized and matched, the power signals may be combined using electrical devices such as power combiners or power distribution panels. The combined (e.g., aggregate) signal may be transmitted to an electrical grid or used to power a load.

In some embodiments, each fluid turbine of a plurality of geographically-associated turbines (e.g., a cluster of turbines) may be associated with a dedicated charge controller. In some embodiments, a single charge controller may be associated with the plurality of geographically associated turbines.

A capacitor may refer to an electronic component configured to store electrostatic energy in an electric field by storing electric charge on two opposing surfaces (e.g., conducting plates) separated by an insulator (e.g., a dielectric medium). Applying an electric potential difference (e.g., a voltage) across the plates of a capacitor, may cause an electric field to develop across the dielectric medium, causing a net positive charge to accumulate on one plate and net negative charge to accumulate on the opposing plate, allowing for storage of electrical energy as a potential difference between the two plates. The plates of a capacitor may be connected to other circuit components (e.g., via contacts of the capacitor) allowing for integration of one or more capacitors into an electronic circuit. In some embodiments, a capacitor may function as a source of electrical energy (e.g., similar to a battery). However, a capacitor may be differentiated from a battery because a capacitor may lack a chemical reaction to receive, store and generate electrical energy. A capacitor may be manufacturable on a microelectronic scale for integration with other microelectronic components, e.g., in a photolithographic process.

A battery may refer to an electrical device configured to convert chemical energy into electrical energy or vice versa. A battery may include one or more cells, each cell containing electrodes and an electrolyte. When the electrodes are connected to an external circuit, a chemical reaction may occur in the electrolyte, creating a flow of electrons, which generates an electric current. The amount of electrical energy that can be stored in a battery may be determined by the capacity (e.g., measured in amp-hours, Ah, or milliampere-hours, mAh). Batteries may be rechargeable, or non-rechargeable.

A battery bank may include a plurality of batteries connected together in a series or parallel configuration to provide a larger capacity and/or higher voltage. A battery bank may be used to store electrical energy generated by a renewable energy source, such as a plurality of fluid turbines, e.g., for subsequent use by a consumer. In some embodiments, a battery bank may include multiple batteries connected in series to increase the voltage while maintaining a steady capacity. In some embodiments, a battery bank may include multiple batteries connected in parallel to increase capacity while maintaining a steady voltage. In some embodiments, a battery bank may include multiple batteries connected in series and in parallel to allow increasing voltage and capacity. A charge controller may be used to ensure that the batteries in a battery bank have a similar state of charge and similar characteristics, e.g., to prevent overcharging, over-discharging, and/or uneven aging of one or more batteries included therein.

An electrical grid (e.g., a power grid) may include an interconnected network delivering electric power (e.g., AC power) from a single or plurality of generators to a single or plurality of consumers. A grid may be designed to supply electricity at a substantially steady voltage level under varying demand and supply by generators. A grid may use one or more tap changers on transformers near to adjust the voltage for maintaining within specification. Attributes of power supplied to an electrical grid (e.g., frequency, phase, power level) by one or more generators may be required to comply with regulations or standards. At least one processor may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

A processor may be configured to perform calculations and computations, such as arithmetic and/or logical operations to execute software instructions, control and run processes, and store, manipulate, and delete data from memory. An example of a processor may include a microprocessor manufactured by Intel™. A processor may include a single core or multiple core processors executing parallel processes simultaneously. It is appreciated that other types of processor arrangements could be implemented to provide the capabilities disclosed herein.

At least one processor may include a single processor or multiple processors communicatively linked to each other and capable of performing computations in a cooperative manner, such as to collectively perform a single task by dividing the task into subtasks and distributing the subtasks among the multiple processors, e.g., using a load balancer. In some embodiments, at least one processor may include multiple processors communicatively linked over a communications network (e.g., a local and/or remote communications network including wired and/or wireless communications links). The multiple linked processors may be configured to collectively perform computations in a distributed manner (e.g., as known in the art of distributed computing).

In some embodiments, at least one processor may include a plurality of processors configured to control a plurality of geographically-associated fluid turbines (e.g., a cluster of fluid turbines). In some embodiments, one or more fluid turbines in a cluster of fluid turbines may be associated with one or more specific processors, e.g., dedicated to a specific fluid turbine or a subset of specific fluid turbines in a cluster. In some embodiments, one or more processors may be configured in a central control unit to collectively control the operations of each fluid turbine in a cluster of fluid turbines. In some embodiments, at least one processor may include one or more processors dedicated to a specific fluid turbine in a cluster of fluid turbines, and one or more processors in a central control unit configured to control operations of the entire cluster of fluid turbines. In some embodiments, at least one processor may control operations of a plurality of geographically-associated fluid turbines to allow the plurality of geographically-associated fluid turbines to operate collectively as a single fluid energy conversion system.

A non-transitory computer-readable storage medium (e.g., a memory) refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located locally (e.g., in physical proximity to at least one processor and connected via a local communications link) or at a remote location (e.g., accessible to at least one processor via a communications network). Additionally, one or more computer-readable storage mediums can be utilized in implementing a computer-implemented method. Accordingly, the term computer-readable storage medium should be understood to include tangible items and exclude carrier waves and transient signals.

In some embodiments, a memory may include a plurality of memory storage devices configured to store information for controlling a plurality of geographically-associated fluid turbines (e.g., a cluster of fluid turbines). In some embodiments, one or more fluid turbines in a cluster of fluid turbines may be associated with one or more specific memory devices, e.g., dedicated to a specific fluid turbine or a subset of specific fluid turbines in a cluster. In some embodiments, one or more memory devices may be configured with a central control unit to collectively store information for controlling each fluid turbine in a cluster of fluid turbines. In some embodiments, a memory may include one or more memory devices dedicated to a specific fluid turbine in a cluster of fluid turbines, and one or more memory devices in a central control unit configured to store information for controlling the entire cluster of fluid turbines. In some embodiments, a memory may store information for controlling operations of a plurality of geographically-associated fluid turbines to allow the plurality of geographically-associated fluid turbines to operate collectively as a single fluid energy conversion system.

A sensor may refer to a device that may output a signal (e.g., an electronic signal) in response to detecting, sensing, or measuring a physical phenomenon (e.g., an electronic phenomena or a non-electronic phenomena). A sensor may be configured to convert a measurement of a physical phenomenon to a medium (e.g., an electronic medium) for receiving by at least one processor. Examples of sensors may include an anemometer for measuring wind speed, a water flow sensor, a voltmeter and/or current meter for measuring an electrical signal, a magnetometer (e.g., to measure a magnetic field), an accelerometer (e.g., to sense vibrations, such as blade and/or shaft vibrations or wobble), a thermometer (e.g. to sense temperature), an optical sensor (e.g., to sense visible and/or IR light), a microphone (e.g., to sense sound), and/or any other type of sensor for measuring a physical phenomenon.

A signal may refer to information encoded for transmission via a physical medium. Examples of signals may include signals in the electromagnetic radiation spectrum (e.g., AM or FM radio, Wi-Fi, Bluetooth, radar, visible light, lidar, IR, Zigbee, Z-wave, and/or GPS signals), sound or ultrasonic signals, electrical signals (e.g., voltage, current, or electrical charge signals), electronic signals (e.g., as digital data), tactile signals (e.g., touch), and/or any other type of information encoded for transmission between two entities via a physical medium.

Maximum Power Point Tracking (MPPT) may include one or more algorithms for using the maximum power available in a fluid flow to extract maximum power from a fluid energy conversion system (e.g., a fluid turbine mechanically coupled to a generator). As a fluid flow continually varies over time, the amount of power that may be generated from a fluid turbine may depend upon the accuracy with which the peak power points of the fluid energy conversion system may be tracked by a controller controlling a rotational speed of a fluid turbine. The controller may enable maximum energy extraction by adjusting a shaft speed (e.g., corresponding to a rotational speed) of a fluid turbine in response to varying fluid speeds. The controller may adjust the shaft speed by sending an electrical signal to the copper windings of a generator rotor coupled thereto. The electrical signal may introduce an impedance (e.g., by shunting or shorting the copper windings) causing the rotor to slow, and causing a corresponding slowing of the fluid turbine coupled thereto for producing maximum power under varying fluid conditions. A charge controller may adjust a shaft speed by increasing or decreasing a load on a generator connected thereto. Some MPPT algorithms may require one or more inputs, such as the fluid speed, a rotational speed of the fluid turbine (e.g., rotor speed), a maximum power curve for a fluid turbine, or a mechanical power equation for a fluid turbine (e.g., obtained experimentally or via a simulation).

MPPT algorithms for fluid turbines may be based on direct and/or indirect power measurement, fluid speed measurement, and/or hybrid and/or smart algorithms (e.g., based on artificial intelligence techniques such as neural networks and fuzzy logic controllers) for tracking a maximum power point of a specific fluid turbine. Some MPPT algorithms for fluid turbines may employ one or more fluid speed sensors (e.g., anemometers, ultrasonic fluid sensors), such as a Tip Speed Ratio (TSR) algorithm, or a power signal feedback (PSF) algorithm, described in greater detail below. Some MPPT algorithms for fluid turbines may avoid using fluid speed sensors, such as a perturb and observe (P&O) algorithm, an optimal relation based (ORB) algorithm, or an incremental conductance (INC) algorithm. Some MPPT techniques may combine one or more MPPT algorithms (e.g., hybrid techniques).

For example, a Tip Speed Ratio (TSR) Based MPPT Algorithm may use the ratio between a fluid speed and the rotational speed of the blade tips of a fluid turbine to regulate the rotational speed of a generator coupled thereto to maintain the TSR of the fluid turbine at an optimum value for extracting maximum power. In addition to the fluid speed and turbine rotational speed, a TSR algorithm may require the optimum TSR of the fluid turbine as an input.

As another example, a power signal feedback (PSF) algorithm may be used to control a fluid turbine to extract maximum power from a fluid flow. A reference power level may be generated using a recorded maximum power curve or a mechanical power equation for the fluid turbine. The curve may be tracked for varying fluid speeds to control the fluid turbine to output maximum power.

As an additional example, a hill-climb search (HCS) control algorithm may continuously track a power output of a fluid turbine to search for a peak power output. An HCS tracking algorithm may compute a desired optimum signal for driving a fluid turbine to the point of maximum power based on the location of the operating point and the relation between changes in power and speed.

An MPPT protocol (e.g., for a single fluid turbine) may involve transmitting signals to adjust a rotational speed of a single fluid turbine by adjusting a load, adjust a brake (e.g., a mechanical and/or electronic brake), and/or use any other method to adjust a rotational speed of a single fluid turbine. In some embodiments, an MPPT protocol for a single fluid turbine may involve increasing a load on a generator connected thereto and/or sending a signal to the generator to output a maximum (e.g., or near-maximum) energy at a point in time.

An MPPT protocol (e.g., fora cluster of fluid turbines) may involve adjusting a rotational speed of at least some fluid turbines in a cluster of geographically-associated fluid turbines to cause the cluster to output a maximum (e.g., or near-maximum) aggregate power output at a point in time and/or under certain fluid conditions. In some embodiments, implementing an MPPT protocol for a cluster of fluid turbines may include transmitting at least some signals associated with applying an MPPT protocol (e.g., for a single fluid turbine) to at least some individual fluid turbines in the cluster, and at least some signals unassociated with applying an MPPT protocol (e.g., for a single fluid turbine) to any individual fluid turbine in the cluster. In some instances, an MPPT protocol for a cluster of fluid turbines may override one or more signals associated with an MPPT protocol for a single fluid turbine in the cluster.

In some embodiments, a charge controller may include at least one processor to implement an MPPT protocol on a fluid turbine connected thereto.

Reference is made to FIG. 1 illustrating a variety of exemplary fluid turbines 100 to 112. Fluid turbine 100 is an exemplary vertical wind turbine, fluid turbine 102 is an exemplary horizontal wind turbine, fluid turbine 104 may be an exemplary water, gas, or steam turbine, fluid turbine 106 may be an exemplary Savonius (e.g., vertical) wind turbine, fluid turbine 108 may be an exemplary Darrieus-rotor (e.g., vertical) wind turbine, fluid turbine 110 may be an exemplary H-type lift vertical wind turbine, and fluid turbine 112 may be an exemplary Helix (e.g., vertical) wind turbine. It is to be noted that exemplary fluid turbines 100 to 112 are shown for illustrative purposes and are not intended to limit the disclosure to any particular type or implementation of a fluid turbine because inventive principles described herein may be applied to any turbine or turbine cluster, regardless of structure or arrangement. Moreover, while some non-limiting examples may refer to fluid turbine any one of fluid turbines 100-112, these examples are provided for conceptual purposes only and do not limit the disclosure to any particular implementation or type of fluid turbine.

Figure 2:
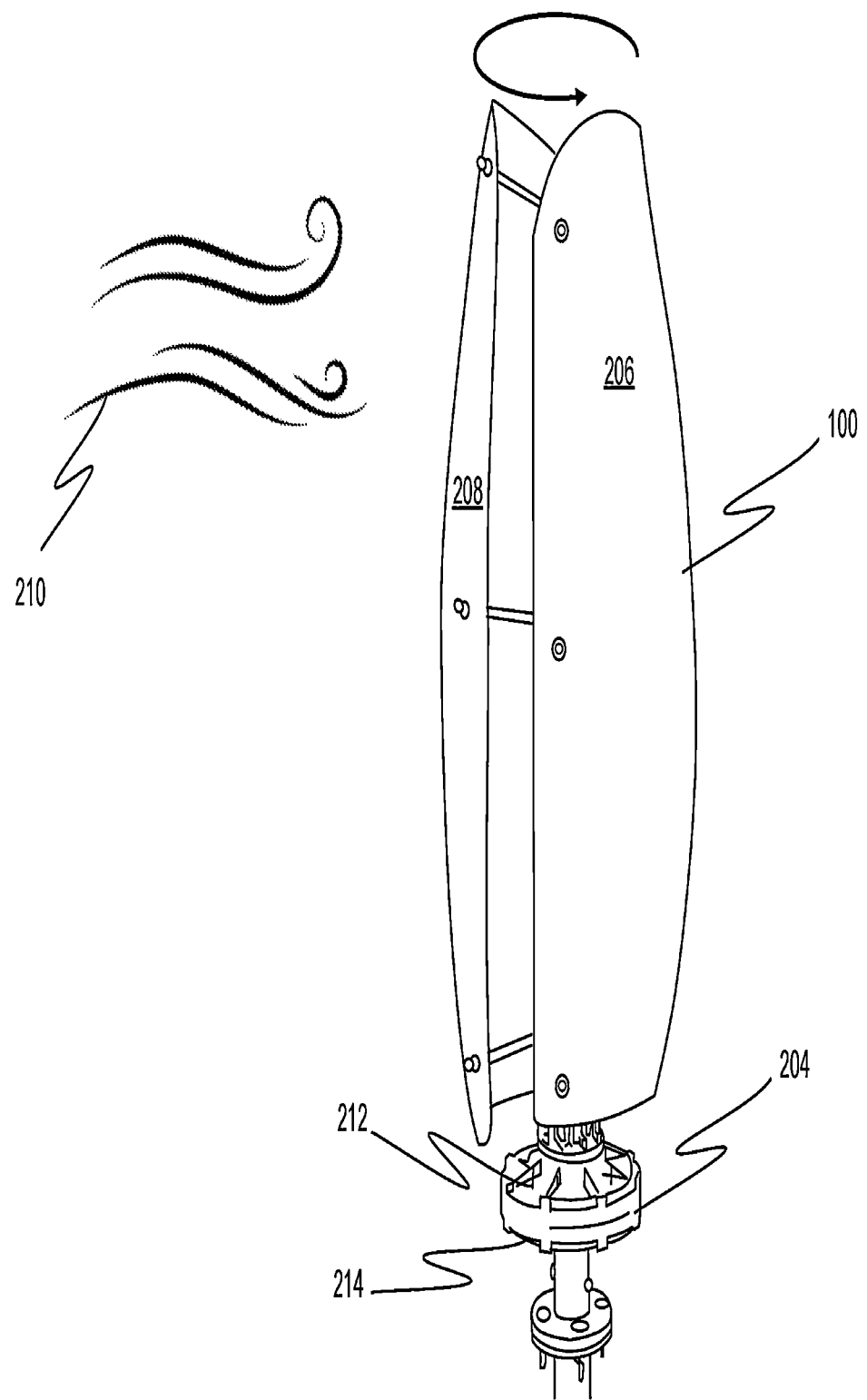
FIG. 2 is an orthogonal view of a fluid energy conversion system including a fluid turbine coupled to a generator, consistent with some embodiments of the present disclosure.

Reference is made to FIG. 2 is an orthogonal view of a fluid energy conversion system including a fluid turbine 100 coupled to a generator 204, consistent with some embodiments of the present disclosure. Fluid turbine 100 may include a plurality of blades 206 and 208 configured to spin in response to a fluid flow 210. Generator 204 may include a rotor 212 and a stator 214, together housing one or more permanent magnets and copper windings (e.g., the rotor may include the magnets and the stator may include the copper windings, or the reverse). Generator 204 may be configured to induce an alternating current (AC) when rotor 212 rotates relative to stator 214 (e.g., by generating a fluctuating magnetic field to surround the copper windings from the rotational motion). Kinetic energy contained in fluid flow 210 may exert a force on fluid turbine 100 causing blades 206 and 208 to rotate. The rotational motion of blades 206 and 208 may cause rotor 212 of generator 204 to spin relative to stator 214, generating an alternating current, thereby converting the kinetic energy of fluid flow 210 to electrical energy. Although fluid turbine 100 is illustrated as a vertical-axis wind turbine and fluid flow 210 is shown as air flow, this example is not intended to be limiting, and fluid turbine 100 may be a horizonal-axis wind turbine, a water turbine, a gas turbine, or a steam turbine. Similarly, fluid flow 210 may be water, gas, or steam, respectively.

Figure 3:
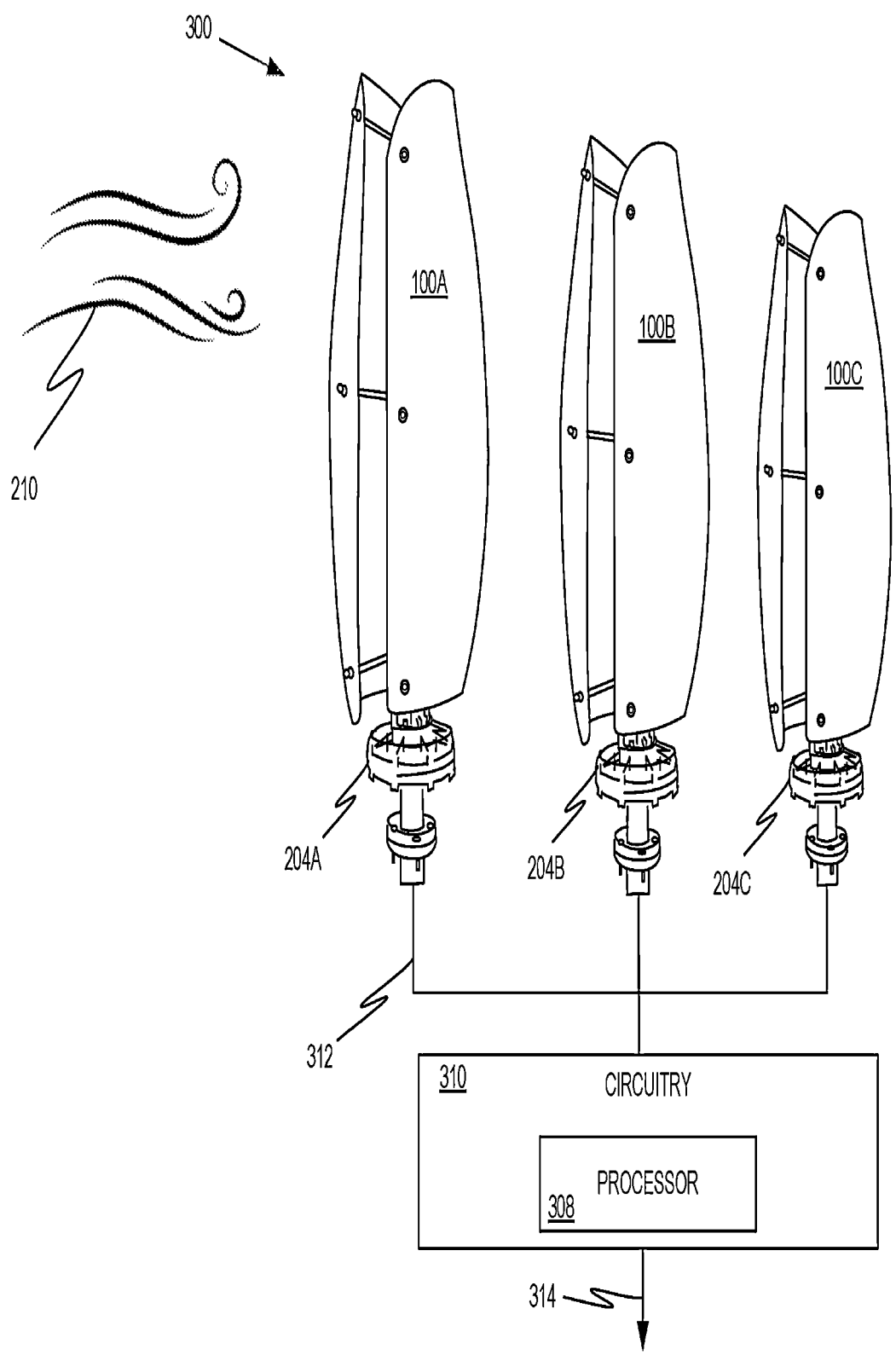
FIG. 3 is an orthogonal view of an exemplary cluster of geographically associated fluid turbines, consistent with some embodiments of the present disclosure.

Reference is made to FIG. 3 illustrating an orthogonal view of an exemplary cluster 300 of geographically associated fluid turbines 100A, 1006, and 100C, consistent with some embodiments of the present disclosure. Geographically associated fluid turbines 100A, 1006, and 100C may be connected to at least one processor 308 via circuitry 310 and one or more communication links 312. Communication links 312 may include differing types of wired communication links (e.g., wires, cables, fibers) and wireless communication links (e.g., WiFi, BlueTooth, Zigbee, AM, FM, PM radio transceivers, satellite or GPS transceivers, IR transceivers, ultrasound transceivers, and/or any other type of wireless communications links). Communications links may include high power communication links, e.g., for receiving electric power generated by fluid turbines 100A, 100B, and 100C and/or for sending a load-bearing signal to fluid turbines 100A, 100B, and 100C, as well as lower power communication links, e.g., for sending and receiving data between a plurality of processors and/or sensors.

At least one processor 308 may be configured to control each of fluid turbines 100A, 100B, and 100C separately or coordinate operation of each of fluid turbines 100A, 100B, and 100C, for example, by coordinating operations such as braking, slowing, stopping, locking, unlocking, and/or starting one or more of fluid turbines 100A, 100B, and 100C, controlling a rotational direction and/or speed for any of fluid turbines 100A, 100B, and 100C, implementing an MPPT algorithm for one or more of fluid turbines 100A, 100B, and 100C, controlling a relative rotational phase between any of fluid turbines 100A, 100B, and 100C, and/or performing any other procedure to coordinate operations for one or more of fluid turbines 100A, 100B, and 100C. While cluster 300 is shown having three fluid turbines, this is for illustrative purposes only, and cluster 300 may include as few as two fluid turbines, or more than three fluid turbines. Moreover, FIG. 3 shows fluid turbines 100A, 100B, and 100C as vertical wind turbines (e.g., corresponding to fluid turbine 100 of FIG. 1), however this is for illustrative purposes only and is not intended to limit this disclosure to any specific implementation. Cluster 300 may include different types of fluid turbines, e.g., other than fluid turbine 100, such as one or more horizontal wind turbines, as well as one or more water, steam, and/or gas turbines. It bears repeating that although the discussion of FIG. 3 occurs in connection with the example turbine structures illustrated, the principles described in FIG. 3 apply to all turbines, regardless of turbine structure.

Figure 4:
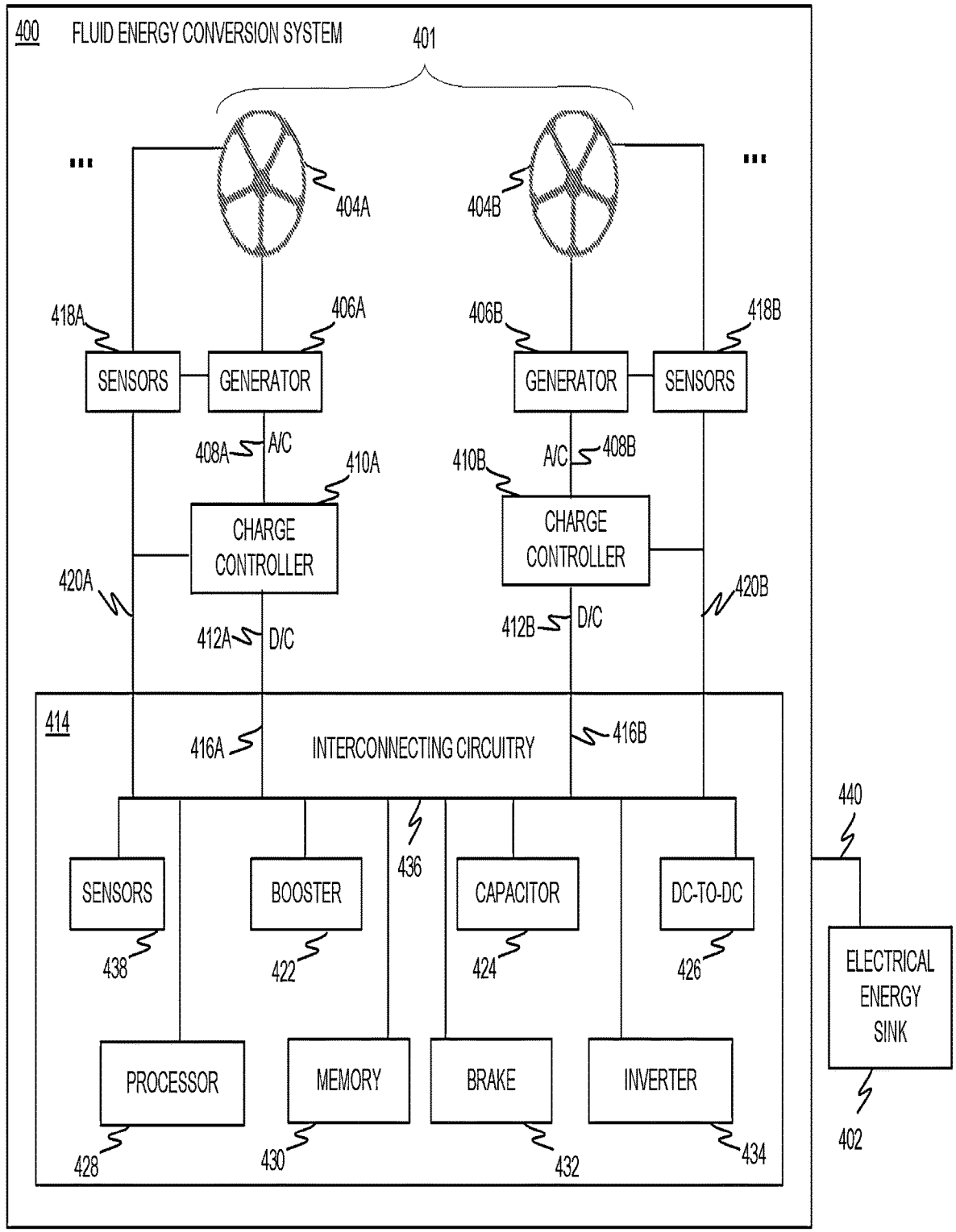
FIG. 4 is a schematic diagram of an exemplary fluid energy conversion system configured to generate electric power from a fluid flow and output the generated electric power to an energy sink, consistent with some embodiments of the present disclosure.

Reference is made to FIG. 4 illustrating a schematic diagram of an exemplary fluid energy conversion system 400 configured to generate electric power from a fluid flow and output to an energy sink 402, consistent with some embodiments of the present disclosure. Fluid energy conversion system 400 may include a plurality (e.g., a cluster) 401 of geographically-associated fluid turbines 404 (e.g., fluid turbines 404A and 404B). Each of fluid turbines 404A and 404B may be connected to generators 406 (e.g., electric generators 406A and 406B), respectively, for converting energy in a fluid flow (e.g., fluid flow 210 shown in FIG. 2) to electric power (e.g., a total electric power output 440) for at least one energy sink 402 (e.g., a load). Total electrical power output 440 may include a DC power output, e.g., for powering a battery bank, or an AC power output, e.g., for delivery to an electric grid. In some embodiments, a portion of total electrical power output 440 may be delivered as a DC signal to charge one or more batteries, and a portion of total electrical power output 440 may be delivered as an AC signal to an electrical gird. Fluid turbines 404A and 404B may be any fluid turbine, including but not limited to the various exemplary turbines illustrated in FIG. 1. Examples of an energy sink may include an electric power grid, one or more batteries, and/or any other sink for electric power. Generators 406A and 406B may convert mechanical rotational energy received from fluid turbines 404A and 404B to a plurality of AC power outputs 408 (e.g., AC power outputs 408A and 408B). Each of fluid turbines 404A and 404B and electric generators 406A and 406B may be associated with a charge controller 410 (e.g., charge controllers 410A and 410B), respectively. AC power outputs 408A and 408B may be converted to DC power signals 412 (e.g., DC power signals 412A and 412B) via charge controllers 410 (e.g., charge controllers 410A and 410B), respectively. Charge controller 410 may include electronic circuitry such as one or more of a rectifier (e.g., an AC-to-DC converter), a voltage sensor switch, a dump load, a braking circuit, a capacitor, and/or a voltage booster. DC power signals 412A and 412B may be conveyed to interconnecting circuitry 414 via a plurality of links 416 (e.g., links 416A and 416B). Links 416A and 416B may include one or more of coaxial cables, fiber, and/or wires configured to transmit power signals.

Charge controllers 410A and 410B may transmit one or more electronic signals to interconnecting circuitry 414 via communications links 420 (e.g., links 420A and 420B). Links 420A and 420B may include one or more wired and/or wireless communication channels configured to transmit and receive electronic signals between at least one processor 428 and charge controllers 410A and 410B.

Each of fluid turbines 404A and 404B and electric generators 406A and 406B may be associated with at least one sensor 418 (e.g., at least one sensor 418A and 418B), described in greater detail below. Each at least one sensor 418 may connect to fluid turbine 404 and/or generator 406, e.g., to sense one or more operational parameters associated with fluid turbine 404 and/or generator 406 connected thereto. Each at least one sensor 418 may connect to charge controller 410. For example, at least one sensor 418A may connect to fluid turbine 404A and/or generator 406A and charge controller 410A, and at least one sensor 418B may connect to fluid turbine 404B and/or generator 406B and charge controller 410B.

Interconnecting circuitry 414 may include at least one sensor 438, at least one booster (e.g. voltage boosters) 422, at least one capacitor 424, at least one DC-to-DC converter 426, at least one processor 428, at least one memory 430, at least one brake circuit 432, and/or one or more inverters 434, interconnected via a communications link 436. In some embodiments, inverter 434 may be a single inverter configure to convert aggregated DC power produced by plurality of geographically-associated fluid turbine 404 to a grid-compatible AC signal (e.g., 110V, 120V, 220V, 240V, or any other voltage level compatible with a regional electric power grid). One non-limiting example of an inverter that may be employed is an IQ7 Plus manufactured by Enphase Energy, Inc. of Fremont California.

Figure 5:
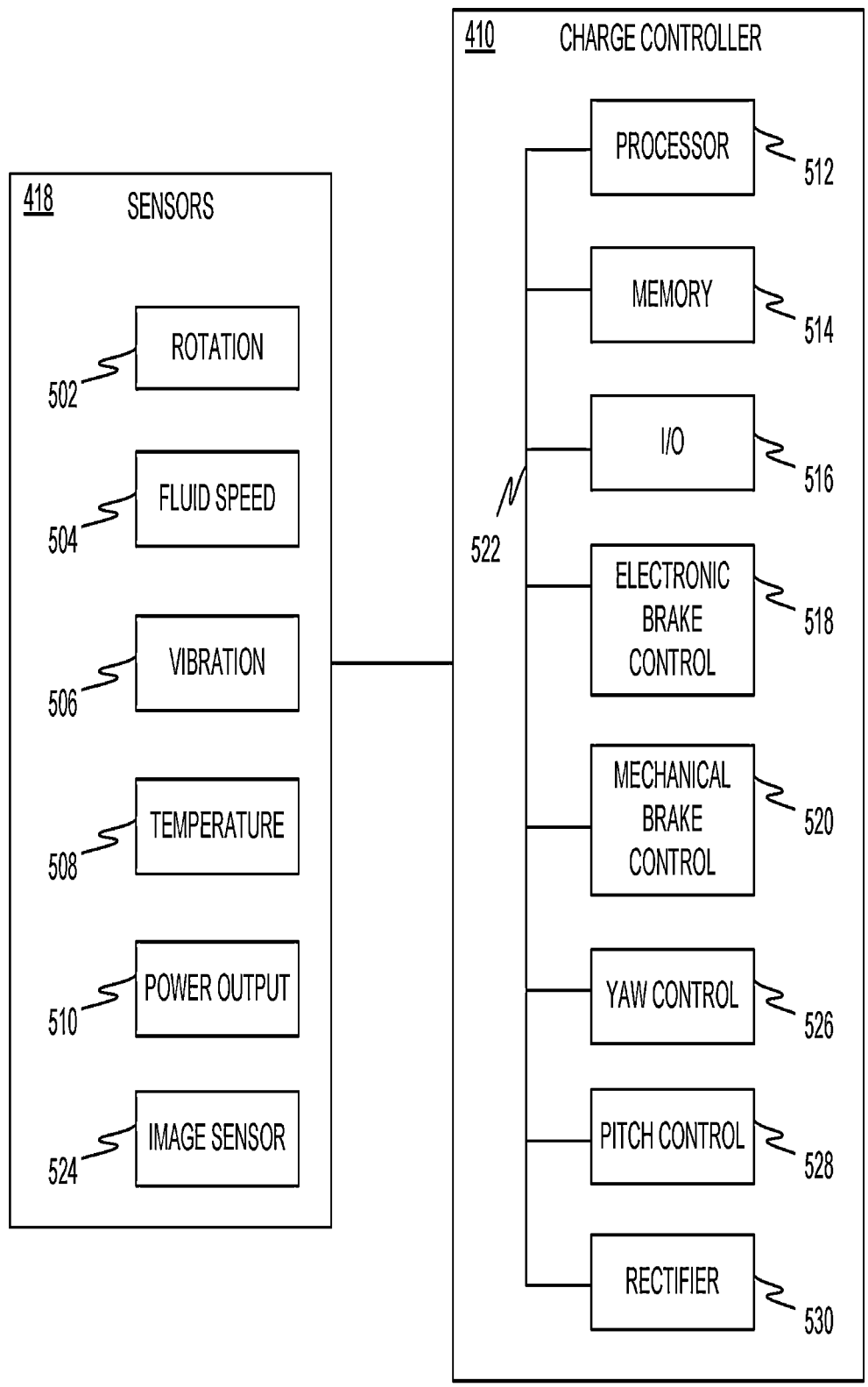
FIG. 5 is an exemplary schematic diagram of a charge controller connected to at least one sensor, consistent with some embodiments of the present disclosure.

Reference is made to FIG. 5 illustrating an exemplary schematic diagram of a charge controller 410 connected to at least one sensor 418, consistent with some embodiments of the present disclosure. At least one sensor 418 may include one or more rotation sensors 502, one or more fluid speed sensors 504, one or more vibration sensors 506, one or more temperature sensors 508, one or more power output sensors 510, and/or one or more image sensors 524. The one or more rotation sensors 502 may be configured with a rotating component of fluid turbine 404 and/or generator 406, such as with one or more blades and/or a shaft of fluid turbine 404, and/or a rotor of generator 406. Fluid speed sensor 504 may include one or more as examples of an anemometer, a water current sensor, a gas flow meter, and/or a steam flow meter for sensing a speed of a fluid flow affecting fluid turbine 404. Vibration sensor 506 may include as examples one or more accelerometers, piezoelectric, piezoresistive, and/or capacitive MEMS for sensing vibrations of one or more components of fluid turbine 404 and/or generator 406. Temperature sensor 508 may include, for example, a thermometer, a thermostat, a thermocouple, a thermopile, an infrared thermometer, a bimetallic strip thermometer, or any other type of temperature measurement device. Power output sensor 510 may include, for example, a volt meter (e.g., a voltage sensor) and/or a current meter (e.g., a current sensor) for measuring power generated by generator 406. One or more image sensors 524 may include one or more cameras (e.g., a charged coupled device or CCD camera, and/or a CMOS camera for detecting visible light and/or an IR camera).

Each charge controller 410 may include one or more of at least one processor 512, a memory 514, an input/output (I/O) 516 (e.g., for communicating with at least one processor 428 via communications link 420), an electronic brake control 518, a mechanical brake control 520, a yaw control 526, a pitch control 528, and/or a rectifier 530. At least one processor 512, memory 514, I/O 516, electronic brake control 518, mechanical brake control 520, yaw control 526, pitch control 528, and rectifier 530 may be interconnected via bus system 522. In some embodiments, a clock (e.g., of at least one processor) may be used as a sensor, e.g., to schedule a maintenance or safety procedure, and/or to synchronize operation of fluid turbine 404. In some embodiments, a clock may be used in conjunction with scheduling software to issue alerts (e.g., signals) to invoke braking, slowing, stopping, locking, and/or unlocking of a fluid turbine by at least one processor.

Electronic brake control 518 may include an inverter and a booster, e.g., to implement an electronic braking mechanism. For example, electronic braking of fluid turbine 404 may be implemented by imposing a load (e.g., impedance) on generator 406. At least one processor (e.g., at least one processor 428 and processor 512) may determine a suitable AC signal for imposing a specific load to achieve a desired level of braking. The at least one processor may transmit a DC signal I to electronic brake control 518 of charge controller 410. Electronic brake control 518 may use the DC signal to produce an AC signal, and the booster of electronic brake control 518 may amplify the AC signal to a level corresponding to the AC signal suitable for imposing the specific load on generator 406. The amplified AC signal may be transmitted to a rotor of generator 406 to impose the load and thereby control (e.g., by slowing and/or stopping) fluid turbine 404. For example, the AC signal may be used to implement an MPPT protocol, engage an electronic brake, adjust a phase of fluid turbine 404 (e.g., by slowing one fluid turbine relative to another fluid turbine), adjust a rotational speed, adjust a rotational direction, and/or to perform any other controlling operation on fluid turbine 404.

Mechanical brake control 520 may include one or more electronic switches allowing at least one processor (e.g., at least one processor 428 and/or processor 512) to control one or more mechanical brakes (e.g. brake pads, disks, and/or drums) configured with one or more rotating components of fluid turbine 404 and/or generator 406.

In some embodiments, electronic braking of fluid turbines 404 may be implemented by charge controllers 410, e.g., by diverting power produced by generators 406 to a dump load.

Figure 6:
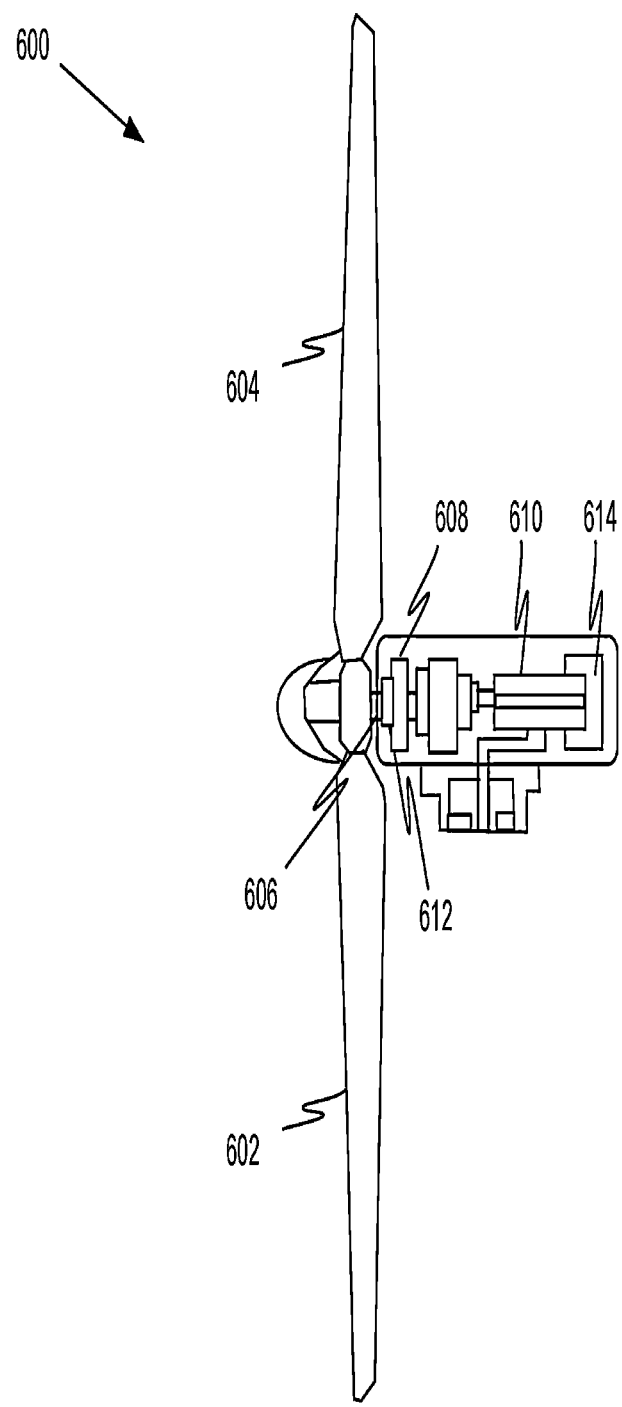
FIG. 6 is a cross-sectional top view of an exemplary fluid turbine configured with at least one mechanical brake, consistent with some embodiments of the present disclosure.

Reference is made to FIG. 6 illustrating a cross-sectional top view of an exemplary fluid turbine 600 configured with at least one mechanical brake, consistent with some embodiments of the present disclosure. Fluid turbine 600 may include blades 602 and 604 connected to a rotatable shaft 606, at least one mechanical brake 608, a generator 610, at least one lock 612, and a charge controller 614 (e.g., corresponding to charge controller 410). Generator 610 may be connected to rotatable shaft 606 for converting rotational mechanical energy by blades 602 and 604 to electric power. Charge controller 614 may be connected to one or more of generator 610, rotatable shaft 606, blades 602 and 604, at least one mechanical brake 608, and at least one lock 612. At least one mechanical brake 608 and/or at least one lock 612 may operate on any rotatable component associated with fluid turbine 600, such as rotatable shaft 606, a rotor of generator 610, and/or blades 602 and 604 (e.g., although at least one mechanical brake 608 and lock 612 are shown in FIG. 6 to operate on shaft 606, this is for illustrative purposes only and does not limit the disclosure to any specific implementation). At least one processor (e.g., at least one processor 512 and/or processor 428) may control a level of engagement and/or disengagement of at least one mechanical brake 608 and at least one lock 612 by sending signals to mechanical brake control 520 for controlling one or more switches configured to control a level of engagement and/or disengagement of at least one mechanical brake 608 and or at least one lock 612.

Charge controller 614 may receive signals from one or more sensors (e.g., at least one sensor 418) configured with fluid turbine 600 (e.g., including rotatable shaft 606, blades 602 and 604, at least one brake 608, and/or at least one lock 612) and/or generator 610. The one or more signals may be received by the at least one processor to determine operating parameters associated with fluid turbine 600. For instance, the at least one processor may use the signals to communicate with charge controller 614 to engage or disengage electronic braking and/or to communicate with at least one brake 608 to engage or disengage mechanical braking. While a braking system is described above with reference to fluid turbine 600, this is for illustrative purposes only. The braking system principles described herein are intended to apply to all fluid turbines, including but not limited to the turbines illustrated in FIG. 1.

Figure 7:
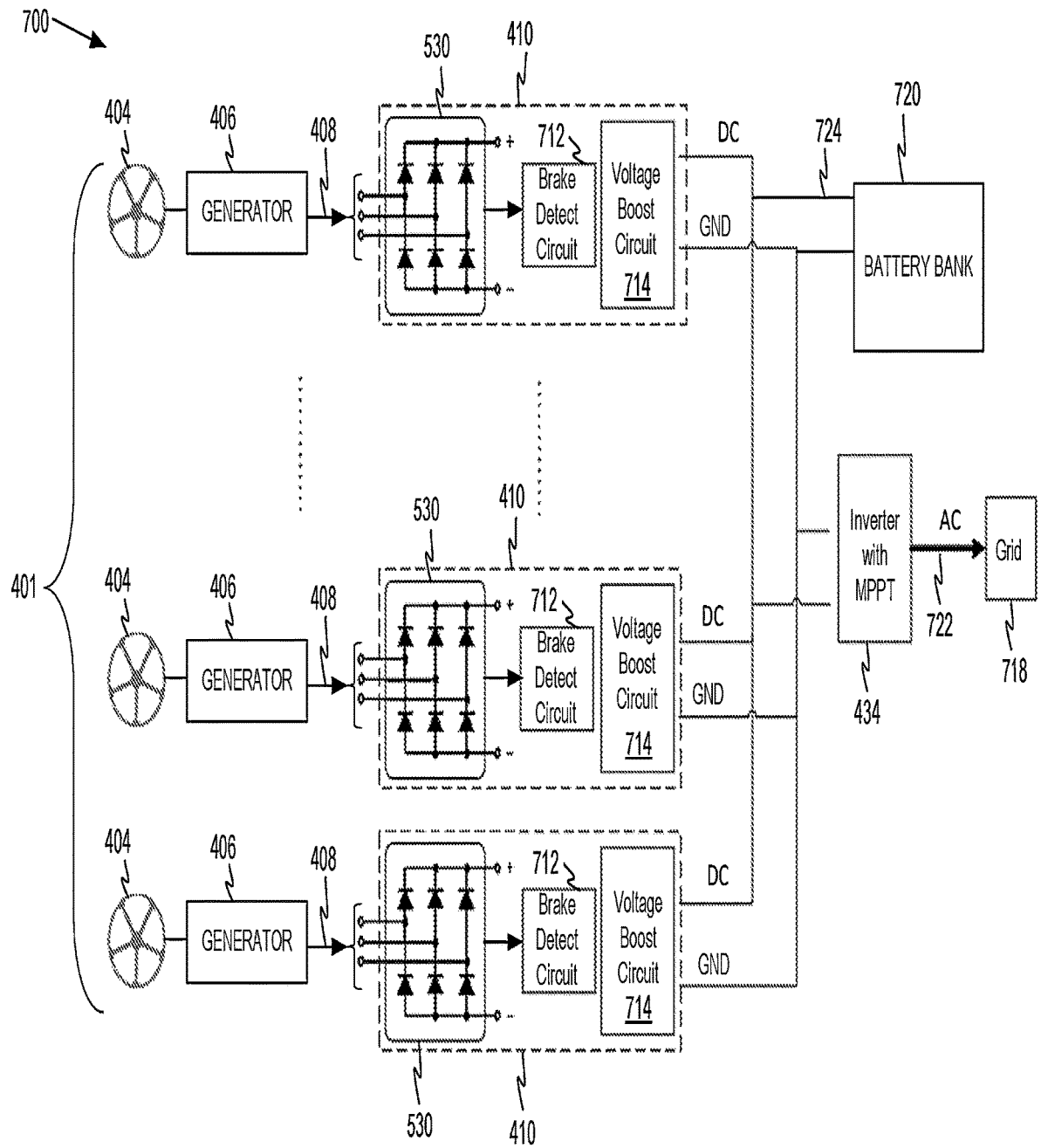
FIG. 7 is a schematic diagram of an exemplary circuit for controlling a plurality of geographically-associated fluid turbines, consistent with some embodiments of the present disclosure.

By way of a non-limiting example, reference is made to FIG. 7 illustrating a schematic diagram of an exemplary circuit 700 for controlling a plurality 401 of geographically-associated fluid turbines 404, consistent with some embodiments of the present disclosure. Exemplary circuit 700 may be understood in conjunction with FIGS. 4 and 5. Fluid turbines 404 (throughout this disclosure including as described in connection with FIGS. 7-11) may be any fluid turbine, including but not limited to the various exemplary fluid turbines illustrated in FIG. 1. Fluid turbines 404 may be geographically-associated as cluster 401. Each of fluid turbines 404 may be connected to a generator 406 for converting energy in a fluid flow to an AC power output. Each of AC power outputs 408 may be connected to a charge controller 410. Each charge controller 410 may include at least a rectifier 530, a brake circuit 712 (e.g., including a brake detection circuit), and a voltage booster 714. Rectifier 530 may convert AC power outputs 408 to DC signals, and may transmit the DC signals to brake circuit 712 and voltage booster 714. Brake circuit 712 may be configured to perform electronic braking on fluid turbine 404 (e.g., based on information received from one or more of at least one sensor 418). In some embodiments, each charge controller 410 may be configured to implement an MPPT protocol on generator 406 connected thereto. Each of charge controllers 410 may be connected (e.g., in parallel) to an inverter 434, which may be connected to an electrical grid 718 (e.g., corresponding to energy sink 402). Charge controllers 410 may deliver AC power signals to inverter 434, and inverter 434 may convert an aggregate of the AC power signals to an aggregate AC power output 722. Inverter 434 may be associated with at least one processor (e.g., at least one processor 428 of FIG. 4). In some embodiments, inverter 434 (e.g., via at least one processor configured therewith) may be configured to implement an MPPT protocol on fluid turbines 404, e.g., by manipulating a load configured with electrical grid 718. For example, increasing the load may cause fluid turbines 404 to slow, and decreasing the load may cause fluid turbines 404 to increase in rotational speed. Thus, in some embodiment, a single inverter 434 may be configured to implement an MPPT protocol on multiple fluid turbines 404 via multiple charge controllers 410. In some embodiments, inverter 434 and electrical grid 718 may be replaced by a battery bank 720.

Figure 8:
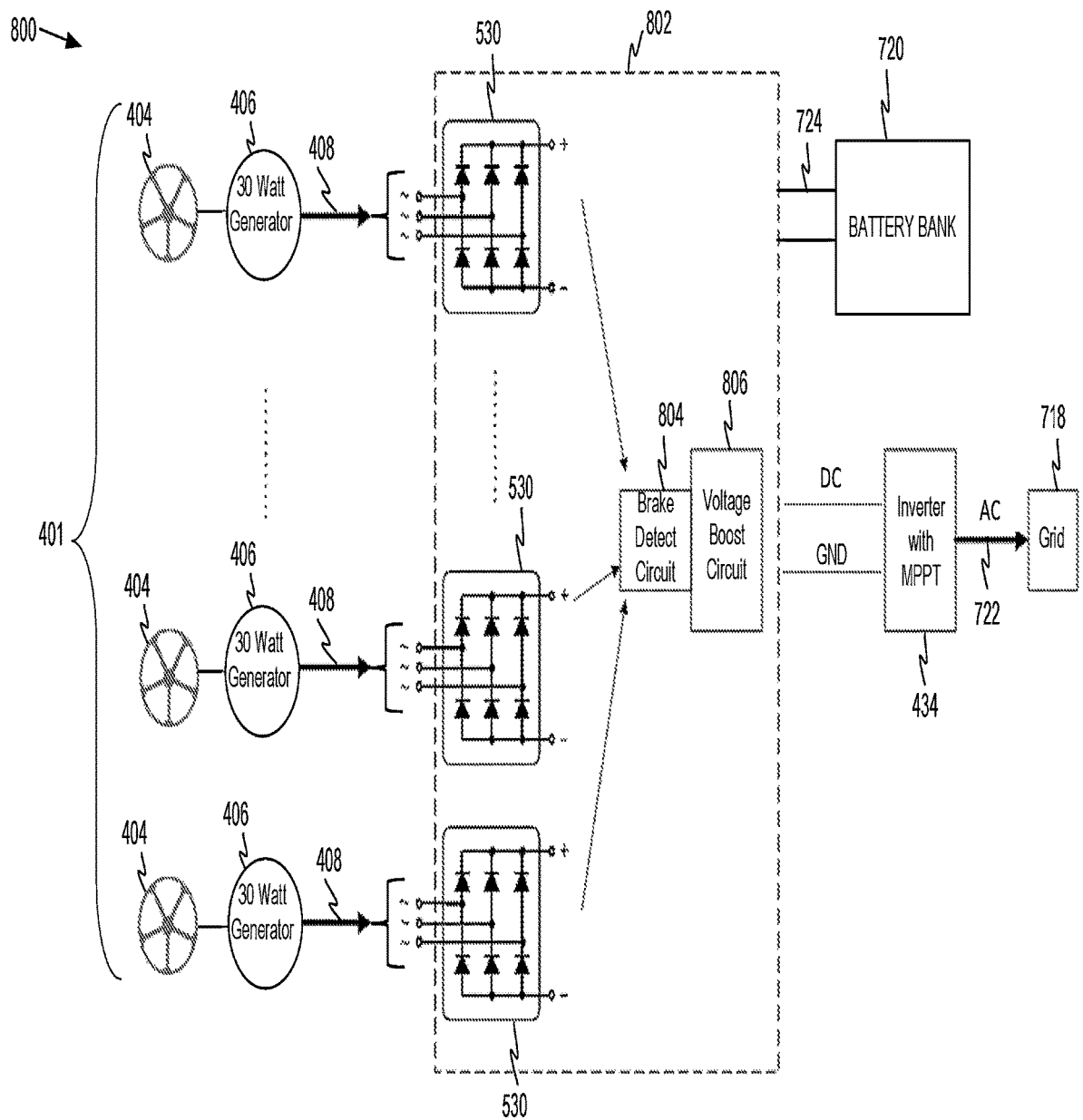
FIG. 8 is another schematic diagram of an exemplary circuit for controlling a plurality of geographically-associated fluid turbines, consistent with some embodiments of the present disclosure.

By way of another non-limiting example, reference is made to FIG. 8 is another schematic diagram of an exemplary circuit 800 for controlling a plurality of geographically-associated fluid turbines 404, consistent with some embodiments of the present disclosure. Circuit 800 may be substantially similar to circuit 700 (e.g., in conjunction with FIGS. 4 and 5) with the noted difference of a common (e.g., shared) charge controller 802 containing multiple rectifiers 530 for each of generators 406. Each of generators 406 may be connected to common charge controller 802 via multiple wires (e.g. three wires for each of three phases of the output AC power signal). Each of rectifiers 530 may be connected (e.g., via two wires) to a common brake circuit 804 (e.g., including at least a braking sensor). Common brake circuit 804 may be connected to a common voltage booster 806 (e.g., a single voltage booster for all of fluid turbines 404). Charge controller 802 (e.g., common to all of fluid turbines 404) may be connected to inverter 434 for outputting AC power to electrical grid 718. Thus, a common or shared charge controller 802 may connect multiple fluid turbines 404 to a single inverter 434 via multiple rectifiers 530 (e.g., one rectifier per fluid turbine 404). In some embodiments, inverter 434 may be configured to implement an MPPT protocol on each of fluid turbines 404 via rectifiers 530. In some embodiments, a cable may connect each generator 406 to single charge controller 410, due to relatively low power loss of a three-phase AC output. This may be advantageous when fluid turbines 404 are spread out over a large region (e.g., when the distance between any two of fluid turbines 404 is at least greater than a blade diameter for each fluid turbine, and/or when the cluster of turbines includes many fluid turbines). Circuit 800 may lack an MPPT control, may include an individual MPPT control for each fluid turbine 404, or may include a centralized MPPT control for the plurality of geographically associated fluid turbines 404, e.g., operating as a single fluid energy conversion system.

Figure 9:
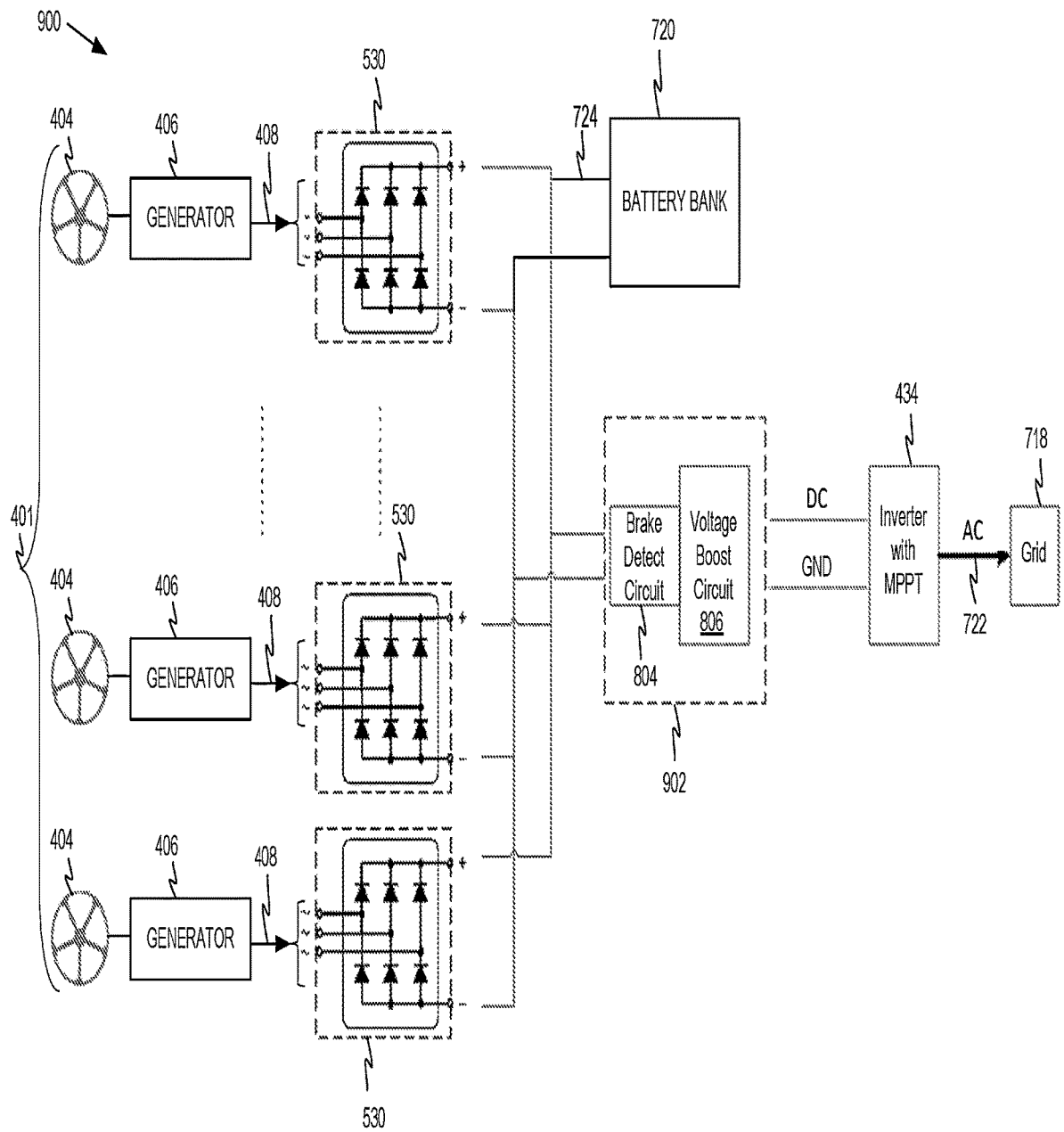
FIG. 9 is a further schematic diagram of an exemplary circuit for controlling a plurality of geographically-associated fluid turbines, consistent with some embodiments of the present disclosure.

By way of another non-limiting example, reference is made to FIG. 9 illustrating a further schematic diagram of an exemplary circuit 900 for controlling a plurality of geographically-associated fluid turbines 404, consistent with some embodiments of the present disclosure. Circuit 900 may be substantially similar to circuits 700 and 800 (e.g., in conjunction with FIGS. 4 and 5) with the notable difference that each of generators 406 may be connected to a different rectifier 530 (e.g., via three inputs for a three-phase AC signal). Each of rectifiers 530 may output a DC signal (e.g., via two wires for positive and negative) to a single (e.g., common) charge controller 902, including a common brake circuit 804 and a common voltage booster 806 for the plurality of fluid turbines 404. Rectifiers 530 may be connected to charge controller 902 in parallel.

Figure 10:
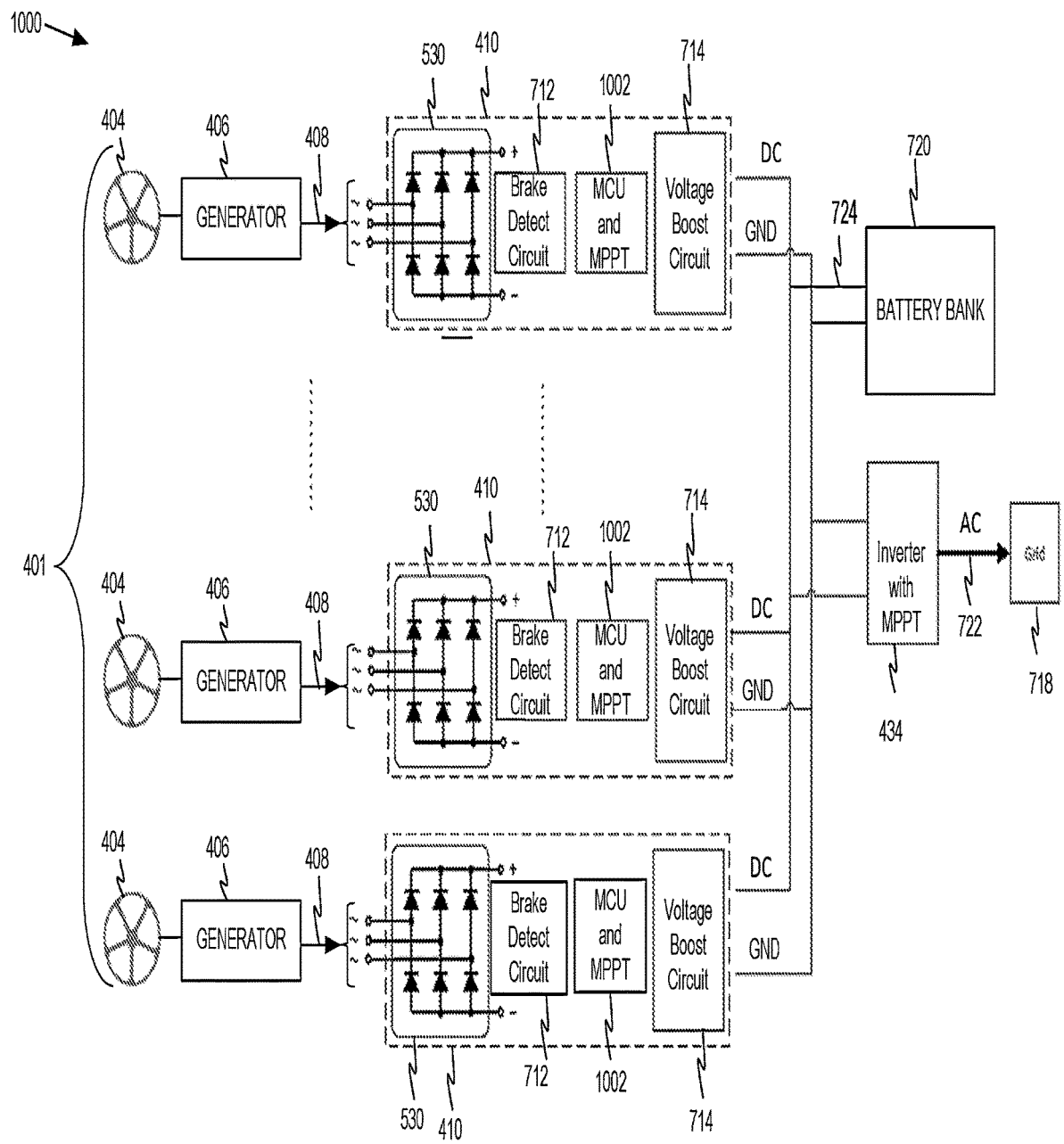
FIG. 10 is yet another schematic diagram of an exemplary circuit for controlling a plurality of geographically-associated fluid turbines, consistent with some embodiments of the present disclosure.

By way of another non-limiting example, reference is made to FIG. 10 illustrating yet another schematic diagram of an exemplary circuit 1000 for controlling a plurality of geographically-associated fluid turbines 404, consistent with some embodiments of the present disclosure. Circuit 1000 may be substantially similar to circuits 700, 800, and 900 (e.g., in conjunction with FIGS. 4 and 5) with the noted difference that each generator 406 may be connected to a separate charge controller 410, with each charge controller 410 including at least a rectifier 530, a brake circuit 712, an MPPT control 1002, and a voltage booster 714. Each of charge controllers 410 may transmit (e.g., in parallel) DC power signals to inverter 434 for connecting to electrical grid 718, or alternatively to battery bank 720.

Figure 11:
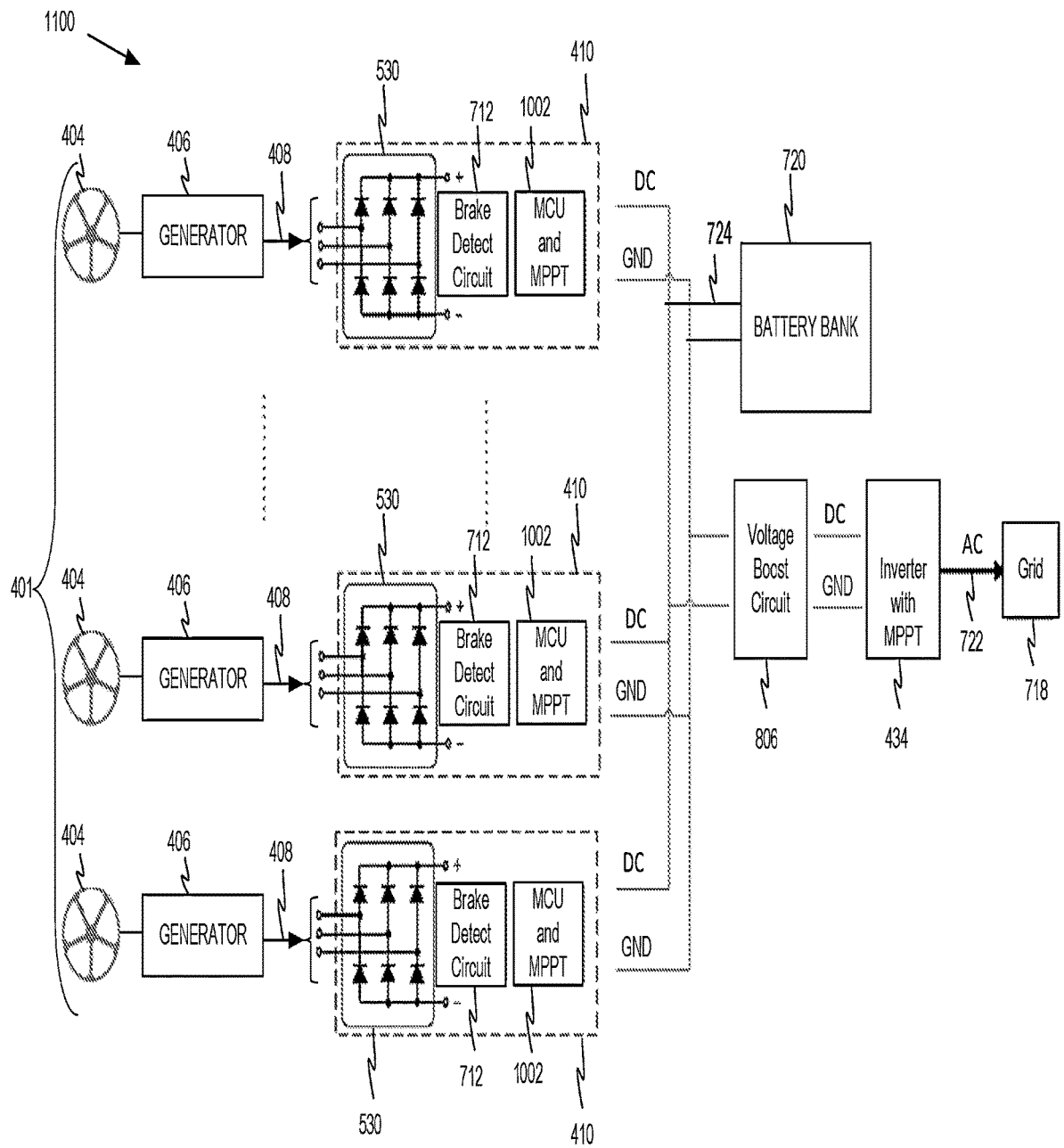
FIG. 11 is an additional schematic diagram of an exemplary circuit for controlling a plurality of geographically-associated fluid turbines, consistent with some embodiments of the present disclosure.

By way of another non-limiting example, reference is made to FIG. 11 illustrating an additional schematic diagram of an exemplary circuit 1100 for controlling a plurality of geographically-associated fluid turbines 404, consistent with some embodiments of the present disclosure. Circuit 1100 may be substantially similar to circuits 700, 800, 900, and 1000 with the noted difference that each charge controller 410 may include a rectifier 530, a brake circuit 712 and an MPPT control 1002. Each charge controller 410 may output a DC signal to common voltage booster 806, which may transmit aggregated DC power to inverter and grid, or alternatively to battery bank 720.

Reference is made to exemplary Table 1 (below) comparing circuits 700 through 1100 for harnessing power from a plurality of geographically-associated fluid turbines.

TABLE 1 comparing differing configurations for harnessing power from a plurality of geographically-associated fluid turbines.

| Option | # rectifiers | #brakes | #controllers | #dump loads | #voltage boosters | Serial or parallel to controller? | High level MPPT |
|---|---|---|---|---|---|---|---|
| 1 | 10 | 10 | 10 | 10 | 10 | parallel | No |
| 2 | 10 | 1 | 1 | 1 | 1 | Parallel rectifiers in controller to single controller | No |
| 3 | 10 | 1 | 1 | 1 | 1 | Parallel rectifiers at generator to single controller | No |
| 4 | 10 | 10 | 10 | 10 | 10 | parallel | Yes |
| 5 | 10 | 10 | 10 | 10 | 1 | Parallel to voltage booster | yes |

Figure 12:
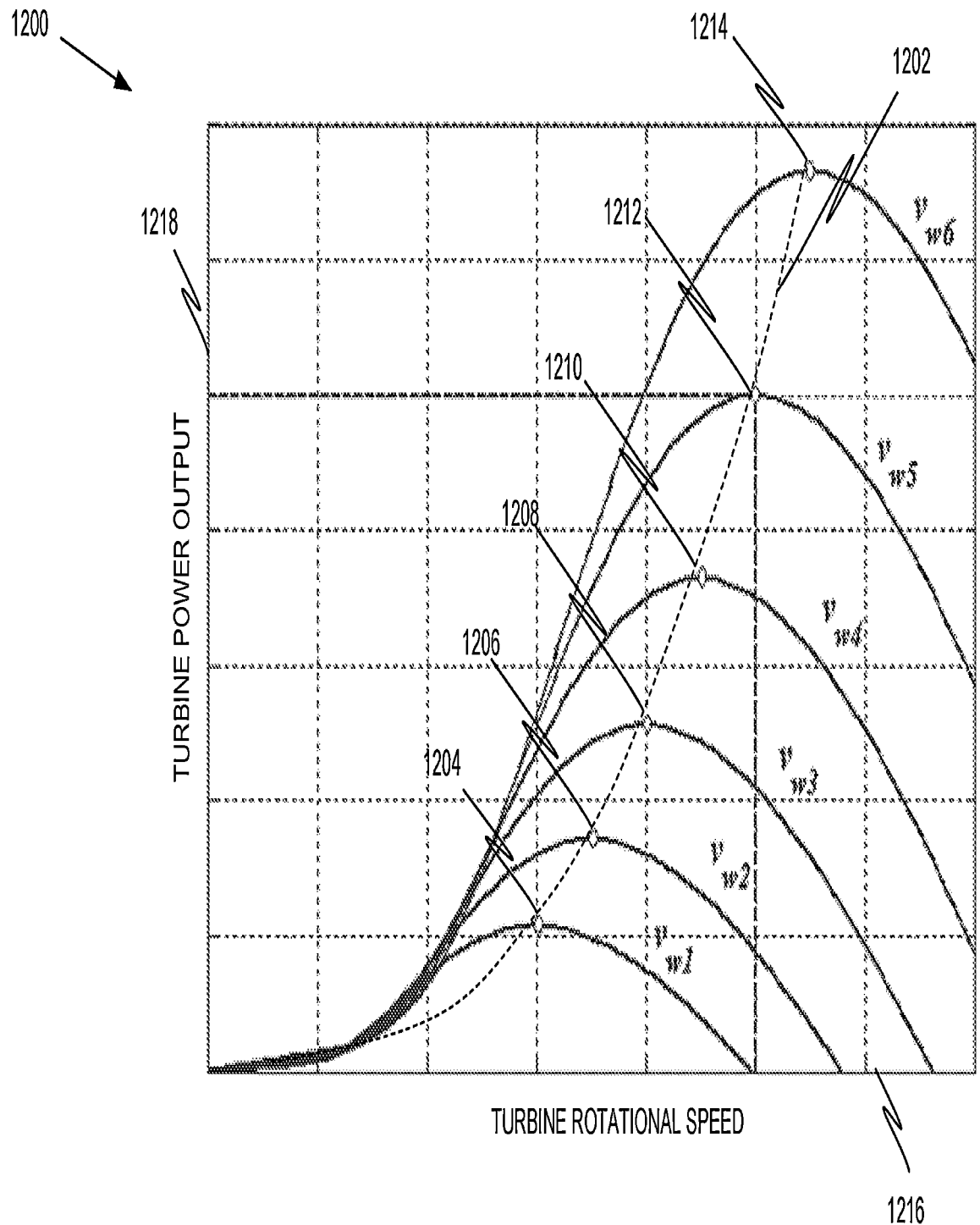
FIG. 12 is an exemplary chart showing a variation of power output versus rotational speed for a fluid turbine operating at various fluid speeds, consistent with some embodiments of the present disclosure.

Reference is made to FIG. 12 illustrating an exemplary chart 1200 showing a variation of power output versus rotational speed for a fluid turbine operating at various fluid speeds, consistent with some embodiments of the present disclosure. Horizontal axis 1216 (e.g., x-axis) of chart 1200 corresponds to the rotational speed of a fluid turbine (e.g., measured as RPM). Vertical axis 1218 (e.g., y-axis) of chart 1200 corresponds to the power outputted by a fluid turbine for each rotational speed. Chart 1200 may include multiple curved lines, each curved line corresponding to a differing fluid speed (e.g., $v_{w1}$ to $v_{w6}$). Each of the curved lines of chart 1200 may include a peak (e.g., peaks 1204, 1206, 1208, 1210, 1212, and 1214) indicating a rotational speed at which a fluid turbine may produce a maximum (e.g., or near-maximum) level of power for the corresponding fluid speed. For instance, peak 1204 may indicate a maximum power output for a fluid turbine when the fluid speed is $v_{w1}$, and achievable when the fluid turbine spins at the corresponding rotational speed, peak 1206 may indicate a maximum power output when the fluid speed is $v_{w2}$, and achievable when the fluid turbine spins at the corresponding rotational speed, and so on.

Line 1202 (e.g., tracing the peak power outputs 1204 to 1214 for each of fluid speeds $v_{w1}$ to $v_{w6}$) may be used to determine a target rotational speed for a fluid turbine to produce a maximum (e.g., or near-maximum) power output under each fluid speed. In some embodiments, chart 1200 may be used to implement an MPPT protocol for a specific fluid turbine. In some embodiments, at least one processor (e.g., at least one processor 428 and/or 512) may use chart 1200 to control a load on a fluid turbine via a charge controller (e.g., charge controllers 410, 802, and/or 902) to cause a fluid turbine to spin at a rotational speed corresponding to line 1202 for a particular fluid speed. In some embodiments, each fluid turbine in a plurality of geographically-associated fluid turbines may be associated with a different version of chart 1200 (e.g., depending on the design and operating parameters for each fluid turbine). In some embodiments, each fluid turbine in a plurality of geographically-associated fluid turbines may be associated with a substantially similar version of chart 1200.

Figure 13:
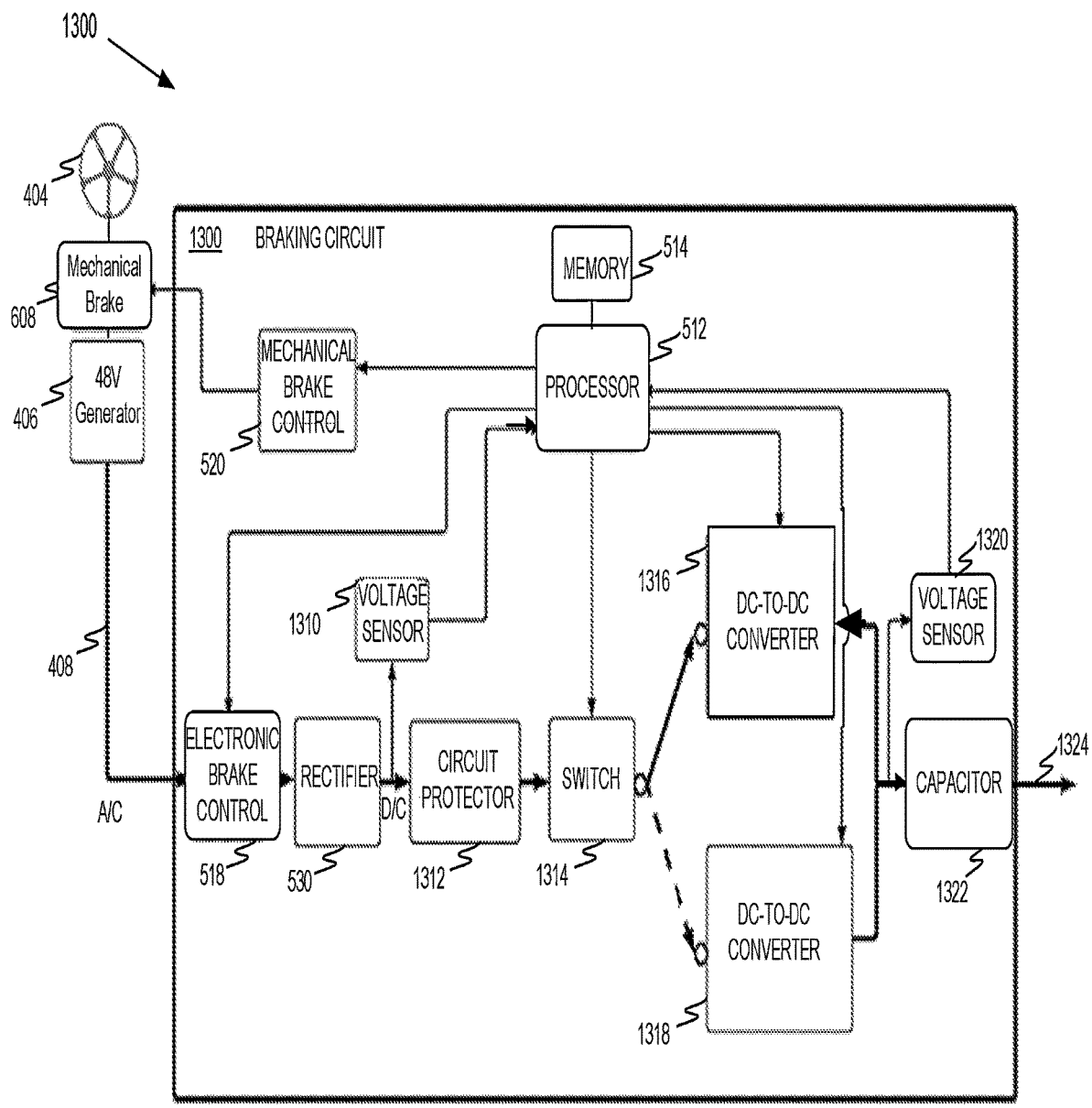
FIG. 13 is a schematic diagram of an exemplary braking circuit, consistent with some embodiments of the present disclosure.

Reference is made to FIG. 13 showing a schematic diagram of an exemplary braking circuit 1300, consistent with some embodiments of the present disclosure. In some embodiments, at least part of braking circuit 1300 may be associated with any of charge controllers 410, 802, and/or 902. In some embodiments, at least a portion of braking circuit 1300 may be associated with interconnecting circuitry 414. In some embodiments, a portion of braking circuit 1300 may be associated with any of charge controller 410, 802, and/or 902, and another portion of braking circuit 1300 may be associated with interconnecting circuitry 414.

Braking circuit 1300 may include at least one processor (e.g., at least one processor 512), memory (e.g., memory 514), mechanical brake control (e.g., mechanical brake control 520), electronic brake control (e.g., electronic brake control 518), a rectifier (e.g., rectifier 530), a first voltage sensor 1310, a circuit protector 1312 (e.g., including at least one of an electrostatic discharge, over-voltage, and/or over-current protection circuits), a switch 1314 (e.g., a single pole, double throw switch), a first DC/DC converter 1316 (e.g., configured to operate above a voltage threshold), a second DC/DC converter 1318 (e.g., configured to operate below the voltage threshold), a second voltage sensor 1320, a capacitor 1322, and a DC output 1324. Rectifier 530 may be a three-phase rectifier configured to produce a variable DC voltage output. In some embodiments, DC power output 1324 may be channeled to an inverter (e.g. inverter 434) for converting to an AC power output signal. In some embodiments, DC output 1324 may channel DC power output 1324 to a battery bank.

At least one processor 512 may control braking for fluid turbine 404 connected to generator 406 based on one or more signals, such as AC power output 408 (e.g., a three-phase AC power output signal) delivered to braking circuit 1300, and/or a signal received from one or more sensors (e.g., at least one sensor 418). Rectifier 530 may convert AC power output 408 to a DC power signal. At least one processor 512 may receive an indication of AC power output 408 as a DC power output measurement via first voltage sensor 1310. Fluid turbine 404 and generator 406 may be associated with mechanical brake 608. To control mechanical braking of fluid turbine 404 and/or generator 406, at least one processor 512 may send a control signal to mechanical brake control 520 for engaging mechanical brake 608. To control electronic braking of fluid turbine 404, at least one processor 512 may subject generator 406 to a load via electronic brake control 518. In some embodiments, power output sensor 510 may be associated with first voltage sensor 1310 and/or second voltage sensor 1320.

By way of a non-limiting example, first DC/DC converter 1316 may be configured to operate at 500 Watts, receive an input ranging between 18-60V and output a voltage ranging between 3.3-24V, switch on at 16.5V, an operate at an efficiency below 98.5%), second DC/DC converter 1318 may be configured to operate at 300 Watts, receive an input ranging between 9-36V and output a voltage ranging between 8-24V, switch on at 9V, and operate at an efficiency below 97%). Switch 1314 may channel DC signals above or equal to 22V to first DC/DC converter 1316 and channel DC signals below 22V to second DC/DC converter 1318. In some embodiments, at least one processor 512 may subject fluid turbine 404 to an MPPT protocol by matching an electronic load imposed on generator 406 to a rotational speed of fluid turbine 404 for a given fluid speed (e.g., based on a version of chart 1200 stored in memory 514) to produce a peak (or near-peak) AC power output.

In some embodiments, at least one processor 512 may communicate with at least one processor 428, e.g., to transmit information associated with a load imposed on fluid turbine 404. For example, the information may be used by the at least one processor to implement one or more MPPT protocols (e.g., including an individual MPPT protocol or lower-level MPPT protocol for a single fluid turbines, and/or a cluster MPPT protocol or an upper-level MPPT protocol for a plurality of geographically-associated fluid turbines), to coordinate braking for a cluster of geographically-associated fluid turbines, and/or to coordinate blade orientation for a cluster of geographically-associated fluid turbines.

For example, FIG. 10 may be taken together with FIGS. 4, and 13 as a detailed schematic diagram of integral fluid energy conversion system 400. A version of braking circuit 1300 may be associated with each one of MPPT controls 1002 of charge controllers 410, allowing each of at least one processors 512 (e.g., each dedicated to one of individual fluid turbines 404) to coordinate operations for each fluid turbine 404 (e.g., in isolation). In addition, interconnecting circuitry 414 may connect to each of MPPT controls 1002, allowing at least one processor 428 to receive information from any of charge controllers 410 (e.g., each dedicated to one of individual fluid turbines 404) to coordinate operations for fluid turbines 404 operating in cluster 401 as integral fluid energy conversion system 400.

Figure 14:
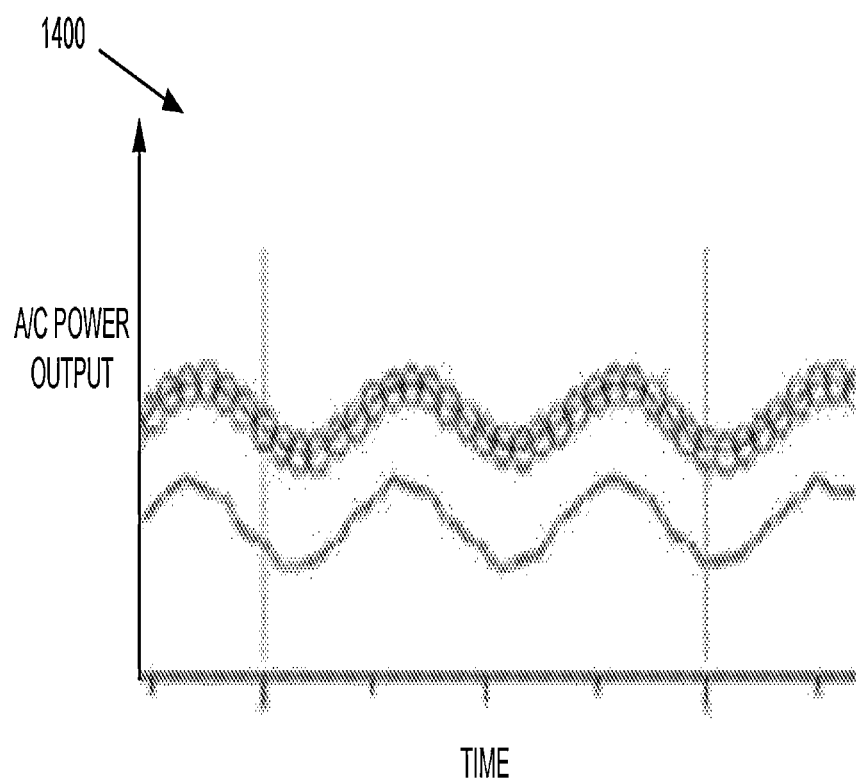
FIG. 14 is an exemplary graph of cyclical power signal generated by an electric generator connected to a fluid turbine, consistent with some embodiments of the present disclosure.

Reference is made to FIG. 14 showing an exemplary graph 1400 of cyclical power signal generator by an electric generator connected to a fluid turbine, consistent with some embodiments of the present disclosure. Graph 1400 may represent a power signal produced by generator 406 as fluid turbine 404 rotates in response to fluid flow 210. In some embodiments, graph 1400 may be substantially sinusoidal, corresponding to a rotating motion of fluid turbine 404, where different stages of rotation may correspond to the generation of differing levels of energy.

In some circumstances, it may be useful to quickly slow or shut down an entire cluster (e.g., a plurality of geographically-associated) fluid turbines. For instance, when all the fluid turbines in the cluster are exposed to similar fluid conditions, and one turbine of the cluster operates outside a safety threshold, slowing or stopping all of the fluid turbines may preserve structural integrity of the cluster. A safety threshold may be associated, for example, with a high wind speed or strong ocean current that may be likely to affect other fluid turbines in the cluster as well. Centralized braking may also prove useful for other purposes such as system calibration, synchronization, maintenance, testing, repairs, and/or coordination to allow the cluster of wind fluid turbines to operate as an integral fluid energy conversion system. Embodiments are disclosed for a centralized braking system for an entire cluster of fluid turbines.

Some embodiments involve a system for coordinated braking of a plurality of geographically-associated fluid turbines. A fluid turbine may include a mechanical device configured to capture energy from a fluid flow, as described elsewhere in this disclosure. Geographically associated fluid turbines may refer to a plurality of fluid turbines positioned in relative proximity of each other, to form a group or cluster of fluid turbines, as described elsewhere in this disclosure. Braking of a fluid turbine may include an exertion of a force affecting a plurality of rotating blades of a fluid turbine. The force may cause the rotation of the blades to slow or stop, even under high fluid flow conditions. In some embodiments, braking may be achieved mechanically, for example by introducing friction (e.g., via a brake pad, drum, or disk) to one or more rotating components of a fluid turbine. In some instances, a mechanical brake may be engaged via a switch, allowing at least one processor to control the mechanical break using one or more electronic signals (e.g., transmitting a braking signal may turn on a switch to engage a mechanical brake, and halting transmission of the braking signal may turn off the switch to disengage the mechanical brake.) In some embodiments, braking may be achieved electrically, for example by transmitting an electrical signal to a rotor of a generator connected to a fluid turbine. The electrical signal may introduce an impedance in the rotor, causing rotation of the rotor to slow, thereby and causing a fluid turbine connected to the rotor to slow as well. Coordinated braking of a plurality of geographically-associated fluid turbines may refer to a controlled or regulated force (e.g., an electrical and/or mechanical braking force) exerted on one or more rotating components of each fluid turbine in a cluster of geographically-associated fluid turbines. In some instances, coordinated braking may cause each fluid turbine in the cluster to slow or stop at substantially the same time, (e.g., substantially in unison) and/or according to a pattern (e.g., a time and/or location based pattern). Coordinated braking may allow at least one processor to synchronize the operations of a plurality of geographically-associated fluid turbines. In some embodiments, coordinated braking may allow a plurality of geographically-associated fluid turbines to operate collectively as a single fluid energy conversion system.

By way of a non-limiting example, referring to FIG. 4, fluid energy conversion system 400 may provide coordinated braking for plurality of geographically-associated fluid turbines 404.

By way of another non-limiting example, FIG. 13, each of fluid turbines 404 may be associated with a braking circuit 1300 for enabling coordinated braking of a plurality of geographically associated fluid turbines 404.

In some embodiments, the geographically-associated fluid turbines are wind turbines. Wind turbines may include horizontal axis turbines (e.g., HAWTs) or vertical axis turbines (e.g., VAWTs). A HAWT wind turbine may include at least one blade, and may typically include three evenly spaced blades (e.g., spaced 120° apart). The amount of energy produced by a wind turbine may be proportional to the length of the at least one blade. A VAWT wind turbine may include one or more wide blades configured for receiving a wind flow, or one or more long, thin blades configured to be aerodynamic. Due to the horizontal geometry of HAWT wind turbines, HAWT wind turbines with long blades for producing high amounts of energy may be located in remote areas to prevent the blades from interfering with physical structures and/or living creatures. Clusters of HAWT wind turbines (e.g., wind farms) may span over large areas (e.g., hundreds of square kilometers). The vertical geometry of VAWT wind turbines may allow positioning VAWT fluid turbines with relatively long blades for producing high amounts of energy in urban areas. In addition, VAWT fluid turbines may be clustered (e.g., grouped) closer together than HAWT turbines, facilitating interconnecting a cluster of geographically-associated wind turbines via interconnecting circuitry.

In some embodiments, the geographically-associated fluid turbines are water turbines. A water turbine may include reaction turbines or impulse turbines. A reaction water turbine may draw energy from a water flow passing through, such that the water pressure of water exiting the reaction water turbine is lower than the water pressure of water entering. An impulse water turbine may change a direction of a water flow. The change may induce an impulse that may cause the blades of the impulse water turbine to turn.

By way of a non-limiting example, FIG. 4 shows a plurality of geographically associated turbines 404 (e.g., including at least fluid turbines 404A and 404B) connected to at least one processor 428 via interconnecting circuitry 310. Fluid turbines 404 may include one or more water turbines, gas turbines, and/or steam turbines (e.g., fluid turbine 104 of FIG. 1), and/or one or more wind turbines (e.g., fluid turbines 100, 102, 106-112 of FIG. 1).

Some embodiments involve at least one processor (e.g., to perform operations for coordinating braking of a plurality of geographically associated fluid turbines). At least one processor may include a single processor or multiple processors communicatively linked to each other, e.g., to control operations of a plurality of geographically-associated fluid turbines to operate collectively as a single fluid energy conversion system, as described elsewhere in this disclosure.

By way of a non-limiting example, in FIG. 4, at least one processor 428 may be connected to plurality of geographically associated fluid turbines 404A and 404B, e.g., to perform operations for coordinating braking.

Some embodiments involve accessing memory storing information indicative of a tolerance threshold for at least one operating parameter associated with the plurality of geographically-associated fluid turbines. Memory may refer to at least one non-transitory computer-readable storage medium, as described elsewhere in this disclosure. Accessing memory may include receiving and/or transmitting data to and/or from at least one memory to perform one or more operations (e.g., reading, writing, changing, adding, deleting, and/or any other memory access operation). An operating parameter associated with the plurality of geographically-associated fluid turbines may include a variable or setting affecting the performance and/or operation of the plurality of geographically-associated fluid turbines. Examples of operating parameters for a fluid turbine may include fluid flow speed, rotor speed, blade tip speed, blade pitch, blade yaw, blade wobble, blade vibration, shaft wobble, shaft vibration, power output, generator temperature, and/or any other parameter affecting the operation of a fluid turbine. Operating parameters may be monitored and controlled by a control system (e.g., implemented via circuitry) for a plurality of geographically-associated fluid turbines to ensure proper performance and efficiency. A tolerance threshold may refer to a limit or boundary imposed on one or more parameters affecting the operation of a system (e.g., operating parameters) to cause the system to operate according to (e.g., comply with) one or more standards or regulation. The standards or regulations may pertain to one or more interests, such as safety, efficiency, maintenance regulation, durability, damage-control, and/or any other interest for operating a system of fluid turbine. Thus, a tolerance threshold may be associated with one or more of a safety threshold, an operating threshold, an efficiency threshold, a durability threshold, a performance threshold, a compatibility threshold (e.g., for outputting power to an electrical grid), an energy-producing threshold, a maintenance threshold, and/or any other type of threshold for a fluid turbine. Controlling one or more fluid turbines to operate within a tolerance threshold may facilitate proper, safe, and/or efficient operation of the one or more fluid turbines, whereas operating one or more fluid turbines outside a tolerance threshold may introduce risks of damage, harm, or injury. Information indicative of a tolerance threshold for an operating parameter associated with the plurality of geographically-associated fluid turbines may include data encoding a tolerance threshold for one or more operating parameters for a fluid turbine, and/or information that may be used to determine a tolerance threshold for one or more operating parameters for a fluid turbine. The at least one processor may access information indicative of a tolerance threshold for the plurality of geographically-associated fluid turbines for use in monitoring, controlling, and/or adjusting one or more operating parameters of the plurality of geographically-associated fluid turbines.

By way of a non-limiting example, in FIG. 4, at least one processor 428 may access memory 430 storing information indicative of a tolerance threshold for one or more operating parameters associated with fluid turbines 404A and 404B. For example, the tolerance threshold may be associated with one or more of a rotational speed for fluid turbines 404A and 404B, a fluid speed affecting fluid turbines 404A and 404B, vibrations of fluid turbines 404A and 404B, temperature of fluid turbines 404A and 404B, and/or a power output of fluid turbines 404A and 404B. In some instances, the tolerance threshold may be associated with information received by at least one processor 428 from one or more of at least one sensor 418 configured with charge controllers 410A and 410B.

Some embodiments involve receiving information from at least one sensor indicative of the at least one operating parameter for a particular fluid turbine among the plurality of geographically-associated fluid turbines. A sensor may refer to a device that may output a signal in response to detecting, sensing, or measuring a physical phenomenon, as described elsewhere in this disclosure. In some embodiments, the at least one sensor may include one or more of a mechanical sensor, an optical sensor, a resistive sensor, a capacitive sensor, a temperature sensor, a piezoelectric sensor, a Hall sensor, a thermocouple sensor, photoelectric sensor, a digital position sensor, a current sensor, a voltage sensor, a photoelectric encoder, a pressure sensor, a fluid (e.g., liquid) level sensors, a temperature sensor, a flow sensor, and/or any other type of sensor that may be used to detect position, linear displacement, pressure, temperature, flow, vibrations, rotational velocity, current, voltage, power, and/or any other parameter associated with the operation of a fluid turbine. At least one sensor indicative of an operating parameter for a particular fluid turbine may include one or more sensors connected to the particular turbine, one or more sensors connected to a device connected to the particular turbine, and/or one or more sensors located in proximity to the particular turbine (e.g., and mechanically disconnected from the particular turbine, such as an anemometer located next to a particular fluid turbine but disconnected therefrom). The at least one sensor may be connected to a moving component (e.g., a blade, rotatable, shaft, and/or rotor connected to the particular fluid turbine) and/or a stationary component associated with the particular fluid turbine (e.g., a stator, an electrical output, an electrical input, and/or generator housing associated with the particular fluid turbine). For instance the at least one sensor may include one or more of a sensor configured with a blade (e.g., a blade tip) and/or a shaft of the particular turbine, one or more sensors configured with a rotor connected to the particular turbine, one or more sensors connected to an electrical power output of the particular fluid turbine, one or more sensors connected to an electric input (e.g., for controlling an operational aspect of the particular fluid turbine), one or more sensors for measuring environmental factors affecting operation of the particular fluid turbine, and/or one or more sensors associated with any other operational aspect of the particular fluid turbine.

Receiving information from a sensor may involve polling a sensor periodically for an output signal, and/or receiving a signal from a sensor, e.g., as a synchronized event and/or an unsynchronized event such as a real-time interrupt event. The at least one processor may receive information from a sensor via a wired and/or wireless communications link either locally or remotely, and may store the received information in memory (e.g., for immediate and/or subsequent access). For example, the at least one processor may receive the information from a sensor configured with a remote weather monitor (e.g., a weather balloon or weather satellite). Information indicative of the at least one operating parameter for a particular fluid turbine may include data measured by one or more sensors associated with a particular fluid turbine and indicating a variable or setting affecting the performance and/or operating of the particular fluid turbine. The information may include a single measurement made at a particular point in time, or multiple measurements made over a time period. In some embodiments, the information may include an average of multiple measurements made over a time period (e.g., over a 10 second interval, or a 30 second interval), and/or a trend over a time period. The information may be indicative of a specific operating parameter (e.g., fluid speed) or of multiple operating parameters (e.g., fluid speed, blade tip rotational speed, and rotor rotational speed). The information may be based on a single measurement (e.g., by a single sensor) or based on multiple measurements (e.g., by a single sensor over a time period, by multiple sensors each making a single measurement, or by multiple sensors making multiple measurements over a time period).

In some embodiments, the at least one sensor includes a rotational sensor, and wherein the at least one operating parameter corresponds to a rotational speed of the particular fluid turbine. A rotational speed may correspond to a number of revolutions that the blades and/or shaft of a fluid turbine complete per minute (e.g. revolutions per minute, or RPM) or the number of completed cycles per second. A rotational sensor may include one or more of a tachometer (e.g., configured to measure rotational speed of a fluid turbine shaft), a magneto-resistive sensor, an inductive sensor, a Hall effect sensor (e.g., configured to use a Hall Effect to detect a presence of a magnetic field for determining the rotations of a fluid turbine shaft), an oscillatory sensor, an optical sensor (e.g., an encoder and/or an infrared sensor configured to measure a rotational speed of a turbine shaft by counting a number of rotations or by measuring a time duration between rotations), an ultrasonic sensor (e.g., configured to emit ultrasonic waves for measuring a distance between the sensor and the blades of a fluid turbine, from which a rotational speed of the blades may be determined). A rotational speed tolerance threshold may limit a rotational speed of a fluid turbine to prevent blade erosion and/or stress on the blades and shaft of the fluid turbine causing instability and breakage and ensure proper, effective, and/or safely operation.

In some embodiments, the at least one sensor includes a fluid speed detector, and wherein the at least one operating parameter corresponds to fluid speed affecting the particular fluid turbine. A fluid speed may refer to movement or continual deformation of a fluid (e.g., wind, water, steam, and/or gas) under an applied force for a given time unit (e.g., measured as kilometers per hour, or meters per second). Fluid speed may correspond to kinetic energy of particles or molecules of a fluid. A fluid speed sensor may include an anemometer (e.g., a van anemometer, a thermal anemometer, and/or a cup anemometer), an ultrasonic fluid speed sensor, and/or a draw-wire displacement sensor, and/or any other device configured to measure a fluid speed and/or a fluid direction. A fluid speed affecting a particular fluid turbine may refer to an amount of kinetic energy transferred from a fluid flow to a plurality of blades of a fluid turbine, causing rotation of the plurality of blades. The orientation of the plurality of blades relative to the direction of the fluid flow (e.g., the incident angle between the plurality of blades and the fluid flow), the geometry of the blades, and/or the weight (e.g., inertia) of the blades may influence the amount of kinetic energy transferred from the fluid flow to the plurality of blades, thereby influencing rotational speed of the fluid turbine. A fluid speed (e.g., together with the fluid flow direction) may be used to predict a rotational speed of a fluid turbine, and may be used as an indicator if a particular fluid turbine is operating within a rotation speed tolerance threshold. A fluid speed tolerance threshold may limit operation of a fluid turbine within fluid speeds deemed safe and/or productive to ensure proper, effective, and/or safely operation of the fluid turbine.

In some embodiments, the at least one sensor includes a vibration sensor, and wherein the at least one operating parameter corresponds to a vibration of the particular fluid turbine. Vibration of a fluid turbine may include interactions between mechanical components of a fluid turbine (e.g., a rotor, a stator, and/or rotation bearings of an electric generator, one or more blades, a shaft, a braking mechanism, an adjustment mechanism) and a fluid flow, causing (e.g., regular or random) oscillations that may destabilize a fluid turbine and cause breakage. A vibration sensor may include an eddy current sensor, an accelerometer, a displacement sensors (e.g., a laser displacement sensor, and/or a capacitive displacement sensor). A vibration tolerance threshold may limit how much oscillation or wobbling may be permitted when operating a fluid turbine to ensure proper, effective, and/or safely operation.

In some embodiments, the at least one sensor includes a temperature sensor, and wherein the at least one operating parameter corresponds to a temperature of the particular fluid turbine. Temperature may indicate an amount of heat emitted by a fluid turbine. A temperature sensor may include a thermometer and/or a thermostat (e.g., configure to activate a switch when a threshold temperature has been reached). A temperature tolerance threshold may limit how much heat may be emitted from a fluid turbine, to prevent overheating. For example, a temperature of a generator (e.g., copper wirings and/or bearings of a generator) may indicate an amount of power produced by the generator. If a generator produces a level of power exceeding a safety threshold, the generator may overheat. Monitoring the generator temperature may indicate if a fluid turbine is operating within a tolerance threshold. Controlling a fluid turbine to operate within a temperature tolerance threshold may prevent overheating, damage to electronic circuitry, and/or a fire, and may ensure that the fluid turbine is operating properly, effectively, and safely.

In some embodiments, the at least one sensor includes a power output sensor, and wherein the at least one operating parameter corresponds to a power output of the particular fluid turbine. A power output may refer to an amount of AC power produced by an electric generator connected to a fluid turbine, and/or an amount of DC power outputted by a rectifier connected to an AC power output of the electric generator. A power output of a fluid turbine may indicate rotational speed of a fluid turbine. For example, a frequency of an AC power output may correspond to a rotational speed of a rotor connected to a plurality of blades of a fluid turbine, to thereby allow determining a rotational speed of the plurality of blades. As another example, a power output (e.g., an amplitude of an AC and/or DC power output) may allow determining an amount of electrical energy produced by a fluid turbine, which may allow determining an amount of kinetic energy contained in the rotation of the fluid turbine. A power output sensor may include a voltmeter and/or a current meter connected to an output of an electric generator connected to a fluid turbine. A power output tolerance threshold may limit how much power may be produced by a fluid turbine. Controlling a fluid turbine to operate within a power output tolerance threshold may prevent the fluid turbine from exceeding a rotational and/or temperature tolerance threshold, to ensure that the fluid turbine is operating properly, effectively, and safely.

In some embodiments, the at least one sensor includes an image sensor, and the at least one operating parameter corresponds to image data of the particular fluid turbine acquired by the image sensor. For example, the at least one processor may analyze the image data to determine an RPM rate of the particular fluid turbine.

By way of a non-limiting example, in FIG. 4, at least one processor 428 may receive information from at least one sensor (e.g., at least one sensor 418 of FIG. 5) associated with charge controller 410A, indicating an operating parameter for fluid turbine 404A (e.g., of plurality of geographically-associated fluid turbines 404A and 404B). For instance, at least one processor 428 may receive one or more indications of a rotational speed for fluid turbine 404A and/or generator 406A from rotational sensor 502, a fluid speed from fluid speed sensor 504, a vibration of fluid turbine 404A and/or generator 406A from vibration sensor 506, a temperature of generator 406A from temperature sensor 508, and/or a power output (e.g., AC and/or DC power) of generator 406A from power output sensor 510. In some embodiments, at least one processor 428 may receive image data from image sensor 524. By way of another non-limiting example, in FIGS. 7 to 11, at least one processor (e.g., at least one processor 428) may receive information from a brake sensor (e.g., a voltage sensor) configured with brake circuit 712.

By way of a further non-limiting example, in FIG. 13, at least one processor 512 and/or at least one processor 428 may receive voltage data (e.g., corresponding to a power output of generator 406) from first voltage sensor 1310 and/or second voltage sensor 1320).

Some embodiments involve comparing the information indicative of the at least one operating parameter for the particular fluid turbine with the tolerance threshold stored in memory. Comparing may include examining and/or evaluating similarities and differences between two or more values, such as between two or more measurements, and/or between one or more measurements and a predefined value used as a control. In some embodiments, the at least one processor may make a direct comparison between the information received from the at least one sensor to the tolerance threshold. In some embodiments, the at least one processor may process the information received from the at least one sensor (e.g., to compute an aggregate value, a trend or a prediction based on a trend, and/or a statistical attribute) and compare an output of the processing of the information to the tolerance threshold (e.g., to make an indirect comparison between the information received from the at least one sensor and the tolerance threshold). For instance, the information received from the at least one sensor may include multiple measurements (e.g., as described earlier) and the at least one processor may compute an aggregate value (e.g. an overall risk level) from the information for comparing to a single valued tolerance threshold (e.g., an overall risk threshold). For example, the at least one processor may compute a statistical attribute based on multiple measured or sensed values received from one or more sensors (e.g., an average, a median, a mode, a standard deviation, and/or a variance), a maximum or a minimum, a pattern or trend (e.g., based on a principal component analysis), a compressed form of multiple data values (e.g., based on a t-Distributed Stochastic Neighbor Embedding, or t-SNE method), and/or any other attribute of the information received from the at least one sensor. As another example, the at least one processor may receive multiple signals from different sensors, such as a fluid speed measurement from a first sensor, a blade tip rotational speed measurement from a second sensor, and a rotor rotational speed from a third sensor. The at least one processor may compute an average (e.g., a weighted average) based on the blade tip rotational speed, the fluid speed and/or the rotor rotational speed to calculate an aggregate speed for comparing to a threshold tolerance for rotational speed.

By way of a non-limiting example, in FIG. 4, at least one processor 428 may compare the information indicative of the at least one operating parameter for fluid turbine 404A with the tolerance threshold stored in memory 430.

Some embodiments involve determining, based on the comparison, whether the at least one operating parameter for the particular fluid turbine deviates from the tolerance threshold. Deviating may include departing from, failing to conform with, or violating (e.g., a regulation or recommended standard). Determining may refer to making a measurement, comparison, estimation, or calculation to arrive at a conclusive outcome. Determining based one the comparison whether the at least one operating parameter for the particular fluid turbine deviates from the tolerance threshold may include identifying if the at least one operating parameter measured for the particular fluid turbine departs from or fails to conform with the tolerance threshold (e.g., by exceeding the tolerance threshold, falling below the tolerance threshold, or otherwise diverging from the tolerance threshold). For instance, a deviation from the tolerance threshold may indicate violation of one or more regulations and/or recommended standards. In some embodiments, the determination of deviation from the tolerance threshold may be based on a single comparison (e.g., a single operating parameter). In some embodiments, the determination of deviation from the tolerance threshold may be based on multiple comparisons (e.g., of multiple operating parameters, of the same operating parameter over time, or of multiple operating parameters over time). In some embodiments, the at least one processor may assign weights to multiple indications of differing operating parameters and compute an aggregate deviation from the tolerance threshold based on multiple operating parameters. In some embodiments, the deviation from the tolerance threshold may be determined over a time period (e.g., for at least 10 seconds, or at least 30 seconds). For example, the at least one processor may refrain from determining a deviation from the tolerance threshold if the deviation lasts for a brief duration (e.g., less than 1 second, less than 10 seconds, less than 30 seconds, or less than any other timeframe), and/or may require the deviation to continue for a time duration (e.g., 1 minute).

By way of a non-limiting example, in FIG. 4, at least one processor 428 may determine, based on the comparison, whether the at least one operating parameter received from at least one sensor 418 of charge controller 410A of fluid turbine 404A deviates from the tolerance threshold.

Some embodiments involve upon a determination that the at least one operating parameter for the particular fluid turbine deviates from the tolerance threshold, send a braking signal to each of the geographically-associated fluid turbines to slow each of the geographically-associated fluid turbines. Slowing a fluid turbine may include reducing a rotational speed of one or more rotating components of a fluid turbine (e.g., one or more blades, a shaft, a yaw mechanism, a rotor, and/or any other rotating component connected to the fluid turbine). Sending a braking signal to a fluid turbine may include transmitting an electronic notification to one or more controls configured to activate or engage one or more braking systems configured to slow a fluid turbine. In some embodiments, a braking mechanism for a fluid turbine may only be engaged while a switch is in an "on" state, requiring power to continually engage the braking mechanism (e.g., over a time period). In some embodiments, at least one processor may transmit a braking signal to a fluid turbine in response to receiving a signal indicating a rotation speed of the fluid turbine exceeds a safety threshold, that a maintenance or repair procedure is scheduled, that a synchronization procedure is scheduled, that a fluid speed exceeds a safety threshold, that an electric power grid has reached capacity, and/or any other criterion for braking a fluid turbine.

In some embodiments, a braking system for a fluid turbine may include an electronic braking mechanism. An electronic braking mechanism for a fluid turbine may include a device for emitting an electronic signal configured to introduce a load or an electrical impedance, causing rotation of the fluid turbine to slow, and/or cause shorting or shunting of a rotor connected to the fluid turbine. For example, at least one processor may determine a braking signal based on an amount of load or impedance (e.g., controlled resistance) needed to cause a corresponding amount of slowing of the rotation of the fluid turbine (e.g. based on a measured rotational speed, angular momentum, and/or moment of inertia of the fluid turbine), for example, the limit an RPM of the fluid turbine. The at least one processor may transmit the impedance-bearing signal to a rotor connected to the fluid turbine. The impedance-bearing signal may cause some of the kinetic energy of the rotating fluid turbine to be converted to heat via one or more resistors included in circuitry associated with the rotor and fluid turbine. The loss of kinetic energy as heat may cause slowing of the rotor and the fluid turbine connected thereto. In some embodiments, energy lost through the impedance-bearing signal may be harnessed to power other electronic components and/or stored for later use. In some embodiments, heat generated by electronic braking may be monitored by a temperature sensor and transmitted to the at least one processor.

In some embodiments, the braking system includes one or more mechanical braking mechanisms. Examples of some mechanical braking mechanisms for a fluid turbine may include a brake pad, a disk brake, a pin, and/or any other mechanical component configured to slow or stop a rotation of a fluid turbine in response to receiving a braking signal (e.g., via an activation switch). A mechanical braking mechanism for a fluid turbine may be associated with a rotor connected to the fluid turbine, a yaw system of the fluid turbine, a shaft (e.g., a rotatable shaft) of the fluid turbine, one or more blades of a fluid turbine, and/or any other rotating component connected to the fluid turbine. For example, at least one processor may transmit a braking signal (e.g., an "on" signal) to one or more activation switches configured to activate one or more mechanical braking mechanisms for a fluid turbine. In some embodiments, the braking system may be a combination of an electronic braking system and one or more mechanical braking mechanisms.

Sending a braking signal to each of the geographically-associated fluid turbines may include transmitting multiple braking signals, each braking signal targeting a different braking mechanism configured with a different geographically-associated fluid turbine. For example, at least one processor may transmit one or more braking signals to each braking mechanism of each geographically-associated fluid turbine via interconnecting circuitry. In some embodiments, each of the geographically-associated fluid turbines may receive a braking signal at substantially the same time. In some embodiments, at least some of the geographically-associated fluid turbines may rotate at differing rotational speeds, and at least one processor may transmit a common braking signal to each geographically-associated fluid turbines, causing at least some of the geographically-associated fluid turbines to slow more than others. In some embodiments, the at least one processor may transmit a braking signal causing each geographically-associated fluid turbine to slow by the same amount. In some embodiments, the at least one processor may transmit a braking signal to slow the rotation of each geographically-associated fluid turbine such that each geographically-associated fluid turbine reaches substantially the same rotational velocity. In some embodiments, the at least one processor may transmit a braking signal to each of the geographically-associated fluid turbines in response to determining that a rotational speed of just one of the geographically-associated fluid turbines exceeds a tolerance threshold.

By way of a non-limiting example, in FIG. 4, upon a determination that the at least one operating parameter for fluid turbine 404A deviates from the tolerance threshold, at least one processor 428 may send a braking signal to each of geographically-associated fluid turbines 404A and 404B to slow each of geographically-associated fluid turbines 404A and 404B. For example, at least one processor 428 may send a DC signal to electronic brake control 518 (see FIG. 5) of each of charge controllers 410A and 410B, which may convert the DC signal to an AC signal and transmit the AC signal to a rotor of generators 406A and 406B, respectively. The AC signal may impose a load on the rotors of generators 406A and 406B to cause rotation of the rotors to slow, thereby causing rotation of fluid turbines 404A and 404B (e.g., connected thereto) to slow. As another example, at least one processor 428 may send an electronic signal (e.g., a digital signal) to mechanical brake control 520 to activate a switch for engaging at least one mechanical brake 608 (e.g., see FIG. 6) configured with each of fluid turbines 404A and 404B and/or generators 406A and 406B, to cause slowing of fluid turbines 404A and 404B. By way of another non-limiting example, in FIG. 13, at least one processor 428 may communicate with each processor 512 of each braking circuit 1300 (e.g., each associated with a different one of fluid turbines 404) to send a braking signal to mechanical brake control 520 and/or to electronic brake control 518 slow each of fluid turbines 404.

By way of a further non-limiting example, in FIGS. 7-11, at least one processor (e.g., configured with an inverter and/or MPPT control 1002) may send a braking signal to each of charge controllers 410, common charge controller 802, and/or common charge controller 902 to slow each of geographically-associated fluid turbines 404.

In some embodiments, slowing of each of the geographically-associated fluid turbines includes stopping each geographically-associated fluid turbine. Stopping a fluid turbine may include halting or ceasing rotation of one or more rotating components of a fluid turbine (e.g., one or more blades, a shaft, a yaw mechanism, a rotor, and/or any other rotating component connected to the fluid turbine), e.g., such that an angular velocity of the fluid turbine is substantially zero. For instance, at least one processor may transmit a stopping signal to flip a switch for activating a stopping mechanism for one or more of the rotating components of a fluid turbine, causing rotation of the fluid turbine to cease. A stopping mechanism for a fluid turbine may include one or more of a brake pad, a drum brake, a disk brake, a spring-applied brake, and/or a hydraulic brake, and may act to stop rotation of one or more of a rotor, a shaft, a yaw mechanism, and/or any other rotating component of a fluid turbine. In some embodiments, a stopping mechanism for a fluid turbine may only be activated while a switch is in an "on" state, requiring power to engage the stopping mechanism. In some embodiments, at least one processor may transmit a stopping signal to a stopping mechanism of a fluid turbine in response to receiving a signal indicating that a rotation speed of the fluid turbine has slowed beneath a threshold, that a maintenance or repair procedure is scheduled, that a synchronization procedure is scheduled, that an electric power grid has reached capacity, that a fluid speed exceeds a safety threshold, and/or any other criterion for stopping a fluid turbine.

Stopping each geographically-associated fluid turbine may include transmitting multiple stopping signals, each stopping signal targeting a different stopping mechanism configured with a different geographically-associated fluid turbine. For example, at least one processor may transmit one or more stopping signals to each stopping mechanism of each geographically-associated fluid turbine via interconnecting circuitry. In some embodiments, each of the geographically-associated fluid turbines may receive a stopping signal at substantially the same time. In some embodiments, at least some of the geographically-associated fluid turbines may rotate at differing rotational speeds, and at least one processor may transmit a common stopping signal to each geographically-associated fluid turbines, causing each geographically-associated fluid turbine to stop. In some embodiments, the at least one processor may transmit a braking signal to each of the geographically-associated fluid turbines in response to receiving an indication (e.g., from at least one sensor) to stop just one of the geographically-associated fluid turbines. For example, the indication may indicate a fluid speed exceeding a safety threshold affecting just one of the geographically-associated fluid turbines, and the at least one processor may determine to stop all of the geographically-associated fluid turbines.

By way of a non-limiting example, in FIG. 4, at least one processor 428 may transmit a signal to charge controllers 410A and 410B configured to stop each of fluid turbines 404A and 404B. For example, the signal may activate mechanical brake control 520 to engage at least one brake 608 (e.g., see FIG. 6) configured with each of fluid turbines 404A and 404B, and/or generators 406A and 406B. For instance, mechanical brake control 520 may engage mechanical brake 608 after fluid turbines 404A and 404B have slowed to reach a threshold speed by electronic braking (e.g., via electronic brake control 518 and/or any of charge controllers 410, 802, and/or 902). By way of another non-limiting example, in FIG. 13, at least one processor 428 may communicate with each processor 512 of each braking circuit 1300 (e.g., each associated with a different one of fluid turbines 404) to send a stopping signal to mechanical brake control 520 to stop each of fluid turbines 404 from spinning.

Some embodiments involve causing locking of each geographically-associated fluid turbine in a stopped state. Causing locking a fluid turbine in a stopped state may include, after stopping a fluid turbine, transmitting a locking signal configured to engage a locking mechanism for maintaining a fluid turbine in the stopped (e.g., substantially non-rotating) state. A locking mechanism for a fluid turbine may operate on a rotor, a shaft, a yaw mechanism, and/or any or rotating component of a fluid turbine and/or generator. Examples of a locking mechanism may include a pin (e.g., a spring loaded pin), a rod, a bolt, and/or a clamp. For instance, at least one processor may transmit a locking signal to flip a switch for engaging a locking mechanism for one or more of the rotating components of a fluid turbine. In some embodiments, the at least one processor may transmit a locking signal to a fluid turbine in response to receiving a signal (e.g., from a clock) indicating the fluid turbine is in a stopped state, that a maintenance or repair procedure is scheduled, that a synchronization procedure is scheduled, that a fluid speed exceeds a safety threshold, that an electric power grid has reached capacity, and/or any other criterion for locking a fluid turbine. In some embodiments, a locking mechanism for a fluid turbine may only be engaged while a switch is in an "on" state, requiring power to engage the locking mechanism.

Causing locking of each geographically-associated fluid turbines in a stopped state may include transmitting multiple locking signals each locking signal targeting a different locking mechanism configured with a different geographically-associated fluid turbine. For example, at least one processor may transmit one or more locking signals to each locking mechanism of each geographically-associated fluid turbine via interconnecting circuitry. In some embodiments, each of the geographically-associated fluid turbines may receive a locking signal at substantially the same time. In some embodiments, the at least one processor may transmit a locking signal to each of the geographically-associated fluid turbines in response to receiving an indication to lock just one of the geographically-associated fluid turbines.

By way of a non-limiting example, in FIG. 4, at least one processor 428 may transmit a signal to charge controller 410A and 410B to lock fluid turbines 404A and 404B. For example, mechanical brake control 520 of charge controllers 410A and 410B may include one or more switches to activate lock 612 (e.g., see FIG. 6) configured with fluid turbines 404A and 404B and/or generators 406A and 406B. For instance, the lock may be an electronically controlled pin configured to engage with an orifice of fluid turbines 404A and 404B and/or generators 406A and 406B to prevent rotational motion. At least one processor 428 may transmit a locking signal to mechanical brake control 520, to thereby engage lock 612. By way of another non-limiting example, in FIG. 13, at least one processor 428 may communicate with each processor 512 of each braking circuit 1300 (e.g., each associated with a different one of fluid turbines 404) to transmit a locking signal to each mechanical brake control 520, causing each lock 612 of each fluid turbine 404 to engage and lock each fluid turbine 404 in a stopped state.

Some embodiments involve receiving an unlock signal from a local or remote location and unlocking each of the geographically-associated fluid turbines in response to the unlock signal. An unlock signal may include an electronic signal indicating to unlock a fluid turbine, e.g., due to conditions for locking a fluid turbine ceasing. For example, an unlock signal may indicate that a scheduled maintenance or repair procedure has been completed, that a fluid speed has reverted to a level within a safety threshold, and/or that an electric grid has capacity to receive power. In some embodiments, an unlock signal may be received after the plurality of geographically-associated fluid turbines have been in a locked state for time duration, e.g., as part of a synchronization protocol for the geographically-associated fluid turbines. A local location may refer to a close or nearby location requiring a short-range and/or near-range communications network (e.g., wires, fiber, a bus, Wi-fi, IR, and/or BlueTooth) to send and receive signals between the at least one processor and the remote location. In some embodiments, a local location may include one or more locations in proximity to one or more of the plurality of geographically-associated fluid turbines. In some embodiments, a local location may include any location in proximity to one or more of the plurality of geographically-associated fluid turbines. Receiving an unlock signal from a local location may involve receiving an unlock signal via a short-range and/or near-range communications network. A remote location may refer to a distant location requiring a long-range communications network (e.g. long cables, fiber, a wide area network, AM or FM radio, a satellite communications link, and/or the Internet) to send and receive signals between the at least one processor and the remote location. In some embodiments, a remote location may include one or more locations in proximity to one or more of the plurality of geographically-associated fluid turbines, e.g. when the plurality of geographically-associated fluid turbines cover a large area. In some embodiments, a remote location may be associated with a weather balloon and/or a weather satellite. Receiving an unlock signal from a remote location may involve receiving an unlock signal via a communications network. For example, the at least one processor may receive an unlock signal from one or more sensors and/or processors (e.g., charge controllers) configured with each of the plurality of geographically-associated fluid turbines. Additionally or alternatively, the at least one processor may receive an unlock signal from one or more sensors and/or processors located remotely, e.g., from a weather server, a weather satellite, a maintenance server, a server associated with an electrical power grid, and/or any other remote location.

Unlocking a fluid turbine may involve disengaging a locking mechanism for a fluid turbine. For instance, at least one processor may transmit a signal to un-flip a switch engaging a locking mechanism for one or more of the rotating components of a fluid turbine. Unlocking each of the geographically-associated fluid turbines in response to the unlock signal may involve transmitting multiple signals to each locking mechanism of each geographically-associated fluid turbine for disengaging each locking mechanism, and/or halting transmission of one or more locking signals currently engaging each locking mechanism, thereby disengaging each locking mechanism.

Some embodiments involve, following the locking, the at least one processor is configured to receive a fluid speed signal, and to cause an unlocking of each geographically-associated fluid turbine when the fluid speed signal corresponds to a fluid speed within the tolerance threshold. A fluid speed signal may include a weather forecast (e.g., from a weather server), a reading by an anemometer or an ocean or river current signal (e.g., configured with a charge controller associated with one or more of the geographically associated fluid turbines), and/or any other electronic indication of fluid speed. A fluid speed within the tolerance threshold may refer to a fluid speed beneath an upper fluid speed threshold (e.g., a safety threshold, an operating threshold, a durability threshold, an efficiency threshold, and/or a compatibility threshold) and/or a fluid speed above a lower fluid speed threshold (e.g., a minimal power generating threshold, an efficiency threshold, and/or a compatibility threshold). For example, operating the plurality of geographically-associated fluid turbines at a fluid speed below the tolerance threshold may be inefficient, ineffective, and/or non-profitable. Once the fluid speed exceeds a lower fluid speed threshold, it may be profitable to unlock the plurality of geographically-associated fluid turbines and resume power generation.

By way of a non-limiting example, in FIG. 4, at least one processor 428 may receive an unlock signal from at least one sensor 418 (e.g., a local signal) to unlock fluid turbines 404A and 404B. For example, the unlock signal may be a vibration measurement received from vibration sensor 506 indicating that vibrations experienced by fluid turbines 404A and 404B are within the tolerance threshold, and that the conversion of fluid flow energy to electrical energy may resume. In response to the unlock signal, at least one processor 428 may halt transmitting the locking signal to mechanical brake control 520, causing disengagement of lock 612 of fluid turbines 404A and 404B. By way of another non-limiting example, in FIG. 13, at least one processor 428 may communicate with each processor 512 of each braking circuit 1300 (e.g., each associated with a different one of fluid turbines 404) to halt transmitting a locking signal to mechanical brake control 520 and thereby disengage each lock 612 of each of fluid turbines 404.

Some embodiments involve, following the slowing, the at least one processor is configured to receive a fluid speed signal, and to cause a release of the braking for each geographically-associated fluid turbine when the fluid speed signal corresponds to a fluid speed within the tolerance threshold. Causing a release of the braking of a fluid turbine may refer to causing disengagement of a braking mechanism configured with the fluid turbine. For instance, a mechanical brake may be released by halting transmission of a signal, thereby deactivating a switch engaging the mechanical brake, causing the brake pads, disks, or drums to disconnect from the fluid turbine. An electronic brake may be released by halting transmission of a load-bearing signal introducing an impedance to a rotor connected to the fluid turbine, thereby removing the load and allowing the turbine to spin more freely. When the fluid speed signal corresponds to a fluid speed within the tolerance threshold may refer to a fluid speed beneath a fluid speed tolerance threshold.

By way of a non-limiting example, in FIG. 4, at least one processor 428 may receive a fluid speed signal from fluid speed sensor 504, indicating that the current fluid speed is within the tolerance threshold for fluid turbines 404A and 404B, and that therefore the conversion of fluid flow energy to electrical energy may resume. In response to the fluid speed signal, at least one processor 428 may halt transmitting a braking signal to electronic brake control 518, and/to mechanical brake control 520, causing at least one brake 608 of fluid turbines 404A and 404B and/or generators 406A and 406B to release. By way of another non-limiting example, in FIG. 13, at least one processor 428 may communicate with each processor 512 of each braking circuit 1300 (e.g., each associated with a different one of fluid turbines 404) to halt transmitting a braking signal to each electronic brake control 518.

In some embodiments, the braking signal is configured to synchronize each fluid turbine in the plurality of geographically-associated fluid turbines. Synchronizing may include coordinating or regulating, e.g., operation of the plurality of geographically-associated fluid turbines in a cooperative manner. Causing each geographically-associated fluid turbine to slow, stop and/or restart at substantially the same time may allow coordinating the plurality of geographically-associated fluid turbines to operate as a single fluid energy conversion system. For example, at least one processor may synchronize the plurality of geographically-associated fluid turbines to ensure that a combined power output from the plurality of geographically-associated fluid turbine meets certain criteria (e.g., minimal or maximal thresholds to meet grid compatibility, safety, efficiency, and/or profitability criteria). As another example, at least one processor may synchronize the plurality of geographically-associated fluid turbines to allow performing testing and/or maintenance of the plurality of geographically-associated fluid turbines.

In some embodiments, synchronizing allows for application of a Maximum Power Point Tracking (MPPT) protocol to the plurality of geographically-associated fluid turbines upon release of braking. Release of braking may involve halting the sending of a braking signal configured to slow and/or stop a fluid turbine. For instance, after stopping or slowing the plurality of geographically-associated fluid turbines (e.g., to a substantially common rotational velocity), the at least one processor may release braking, allowing each geographically-associated fluid turbine to resume converting energy from a fluid flow to electrical energy. An MPPT protocol may be understood as described elsewhere in this disclosure. Application of an MPPT protocol to the plurality of geographically-associated fluid turbines may involve at least one processor transmitting a plurality of signals to the plurality of geographically-associated fluid turbines, the plurality of signals configured to apply one or more loads to one or more rotors of the geographically-associated fluid turbines. The one or more loads may allow extracting a maximum (e.g., near maximum) amount of power from the plurality of geographically-associated fluid turbines operating as a single fluid energy conversion system.

In some embodiments, the synchronizing harmonizes rotational timing for each turbine in the plurality of geographically-associated fluid turbines. A rotational timing of a fluid turbine may refer to a rotational frequency of each fluid turbine (e.g., corresponding to a rotational frequency of a rotor connected thereto, for example measure as RMP or cycles per second). Harmonizing a rotational timing may involve coordinating the rotational timing such that each of the geographically-associated fluid turbines may spin at substantially the same frequency. In some embodiments, harmonizing rotational timing for each geographically-associated fluid turbine may cause the geographically-associated fluid turbines to produce substantially the same level of electric power output and/or electric power output signals having substantially the same frequency.

In some embodiments, the synchronizing coordinates a rotational orientation of each turbine in the plurality of geographically-associated turbines. A rotational orientation of a fluid turbine may refer to a rotational direction (e.g., clockwise or counter-clockwise). Coordinating a rotational orientation of each fluid turbine may include controlling or regulating the rotational orientation of each fluid turbine. For example, the at least one processor may apply a braking signal to cause all of the geographically-associated fluid turbines to rotate clockwise, or counter-clockwise, or to alternate between clockwise rotating fluid turbines and counter-clockwise rotating fluid turbines.

By way of a non-limiting example, in FIG. 4, at least one processor 428 may transmit a braking signal to at least one brake 608 to synchronize each of fluid turbines 404A and 404B, e.g., by synchronizing the rotations. For example, synchronizing may allow at least one processor 428 to simultaneously apply an MPPT protocol to each of fluid turbines 404A and 404B, such that a joint operation of fluid turbines 404A and 404B extracts a maximum power (e.g., or a near maximum power) from a fluid flow. As another example, the synchronization may allow at least one processor 428 to harmonize a frequency of rotation, starting and/or stopping of rotation, delays in rotation, and/or any other rotational timing attribute for fluid turbines 404A and 404B. As a further example, the synchronization may allow at least one processor 428 to harmonize a rotational orientation of fluid turbines 404A and 404B, e.g., to cause both of fluid turbines 404A and 404B to spin clockwise or counterclockwise, or alternatively to cause fluid turbine 404A to spin clockwise and fluid turbine 404B to spin counterclockwise. By way of another non-limiting example, in FIG. 13, at least one processor 428 may communicate with each processor 512 of each braking circuit 1300 (e.g., each associated with a different one of fluid turbines 404) to synchronize the operation of fluid turbines 404 via electronic brake control 518 and/or mechanical brake control 520.

By way of another non-limiting example, in FIGS. 7-11, at least one processor (e.g., configured with inverter 434) may transmit a braking signal to brake circuit 712 to synchronize fluid turbines 404. Synchronizing fluid turbines 404 may allow the at least one processor to apply an MPPT protocol to each of fluid turbines to extract a maximum (e.g., or near maximum) power from a fluid flow. Similarly, the at least one processor may harmonize a frequency of rotation and/or a rotational orientation of fluid turbines 404.

Some embodiments involve a non-transitory computer readable medium containing instructions that when executed by at least one processor cause the at least one processor to perform operations for coordinated braking of a plurality of geographically-associated fluid turbines, the operations comprising: accessing memory storing information indicative of a tolerance threshold for at least one operating parameter associated with the plurality of geographically-associated fluid turbines; receiving information from at least one sensor indicative of on the at least one operating parameter for a particular fluid turbine among the plurality of geographically-associated fluid turbines; compare the information indicative of the at least one operating parameter for the particular fluid turbine with the tolerance threshold stored in memory; determining, based on the comparison, whether the at least one operating parameter for the particular fluid turbine deviates from the tolerance threshold; and upon a determination that the at least one operating parameter for the particular fluid turbine exceeds the tolerance threshold, sending a braking signal to each of the geographically-associated fluid turbines to slow each of the geographically-associated fluid turbines.

By way of a non-limiting example, in FIG. 4, at least one processor 428 may perform operations for coordinated braking of geographically-associated fluid turbines 404A and 404B. At least one processor 428 may access memory 430 storing information indicative of a tolerance threshold for at least one operating parameter associated with geographically-associated fluid turbines 404A and 404B. At least one processor 428 may receive information from at least one sensor (e.g., at least one sensor 418 of FIG. 5) indicative of on the at least one operating parameter for fluid turbine 404A. At least one processor 428 may compare the information indicative of the at least one operating parameter for fluid turbine 404A with the tolerance threshold stored in memory 430. At least one processor 428 may determine, based on the comparison, whether the at least one operating parameter for fluid turbine 404A deviates from the tolerance threshold (e.g. for both of fluid turbines 404A and 404B). Upon determining that the at least one operating parameter for fluid turbine 404A exceeds the tolerance threshold, at least one processor 428 may send a braking signal to each of charge controllers 410A and 410A, which may engage an electronic brake (e.g., via electronic brake control 518 and/or charge controllers 410) and/or at least one mechanical brake 608 (e.g., via mechanical brake control 520) of geographically-associated fluid turbines 404A and 404B, to at least slow each of the geographically-associated fluid turbines 404A and 404B.

Figure 15:
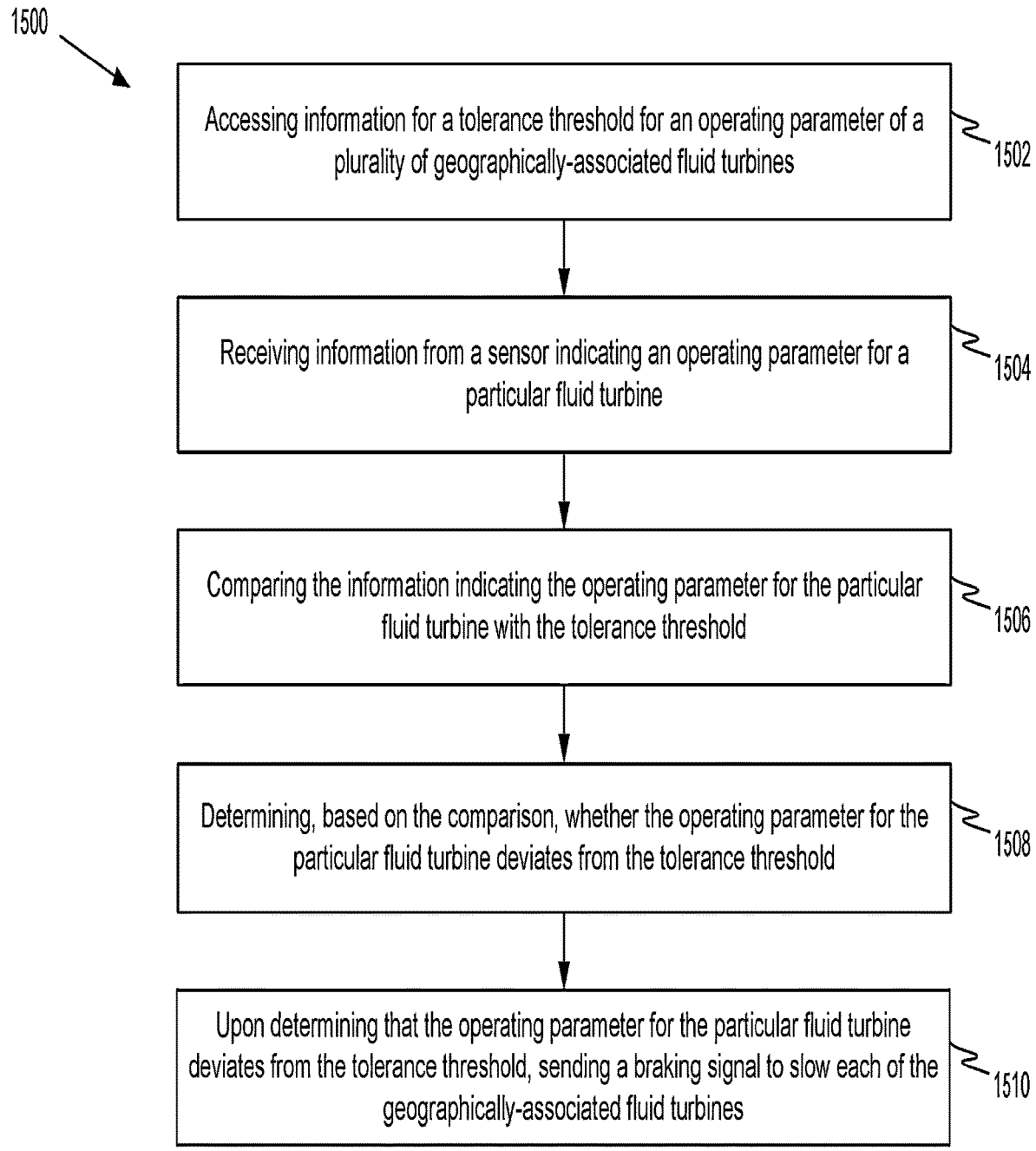
FIG. 15 is a flow diagram of an exemplary process for coordinated braking of a plurality of geographically-associated associated fluid turbines, consistent with embodiments of the present disclosure.

FIG. 15 illustrates a flowchart of an exemplary process 1500 for coordinated braking of a plurality of geographically-associated associated fluid turbines, consistent with embodiments of the present disclosure. In some embodiments, process 1500 may be performed by at least one processor (e.g., at least one processor 428 and/or processor 512) to perform operations or functions described herein. In some embodiments, some aspects of process 1500 may be implemented as software (e.g., program codes or instructions) that are stored in a memory (e.g., memory 430 and/or memory 514) or a non-transitory computer readable medium. In some embodiments, some aspects of process 1500 may be implemented as hardware (e.g., a specific-purpose circuit). In some embodiments, process 1500 may be implemented as a combination of software and hardware.

Referring to FIG. 15, process 1500 includes a step 1502 of accessing memory storing information indicative of a tolerance threshold for at least one operating parameter associated with the plurality of geographically-associated fluid turbines. By way of a non-limiting example, in FIG. 4, at least one processor 428 may access memory 430 storing a tolerance threshold for a rotational speed associated with fluid turbines 404A and 404B. Process 1500 includes a step 1504 of receiving information from at least one sensor indicative of at least one operating parameter for a particular fluid turbine among the plurality of geographically-associated fluid turbines. By way of a non-limiting example, in FIG. 4, at least one processor 428 may receive a rotational speed from rotation sensor 502 of charge controller 410A of fluid turbine 404A. Process 1500 includes a step 1506 of comparing the information indicative of the at least one operating parameter for the particular fluid turbine with the tolerance threshold stored in memory. By way of a non-limiting example, in FIG. 4, at least one processor 428 may compare the rotational speed tolerance threshold retrieved from memory 430 to the rotational speed for fluid turbine 404A received from rotation sensor 502 associated with charge controller 410A. Process 1500 includes a step 1508 of determining, based on the comparison, whether the at least one operating parameter for the particular fluid turbine deviates from the tolerance threshold. By way of a non-limiting example, based on the comparison, at least one processor 428 may determine that fluid turbine 404A is spinning at a rate that exceeds the rotation speed tolerance threshold. Process 1500 includes a step 1510 of, upon a determination that the at least one operating parameter for the particular fluid turbine exceeds the tolerance threshold, sending a braking signal to each of the geographically-associated fluid turbines to slow each of the geographically-associated fluid turbines. By way of a non-limiting example, in FIG. 4, at least one processor 428 may send a braking signal to charge controller 410A and 410B of fluid turbines 404A and 404B, respectively, to slow each of fluid turbines 404A and 404B. By way of another non-limiting example, in FIGS. 7-11, at least one processor (e.g., configured with inverter 434) may send a braking signal to any of charge controllers 410, 802 and/or 902 to slow fluid turbines 404.

Applying an MPPT protocol to a cluster of geographically-associated fluid turbines may be beneficial for improving efficiency of the cluster as a whole. However, clustering geographically-associated fluid turbines may cause at least some fluid turbines of the cluster to become fluid-dynamically coupled in a less than optimal manner. Consequently, some fluid turbines may be affected differently when fluid flows through the cluster, as one or more downstream fluid turbines may be additionally affected by turbulence and/or draft generated by one or more upstream fluid turbines of the cluster. Moreover, a load predicted by an MPPT protocol to produce an optimal (or near-optimal) performance when applied to a single (e.g., isolated) fluid turbine may cause a fluid-dynamically coupled fluid turbine to produce a sub-optimal performance since the fluid flow used in the MPPT calculation may not account for fluid effects of other fluid turbines. To allow coordinating operations for a cluster of fluid turbine, systems, devices, methods, and non-transitory computer readable are disclosed for a coordinated MPPT protocol for a cluster of geographically-associated fluid turbines. The coordinated MPPT protocol may predict a loading state for a cluster of geographically-associated fluid turbines for improving a predicted power output for the entire cluster. In some instances, a loading state predicted for a cluster of geographically-associated fluid turbines may override one or more loading states predicted by an MPPT protocol applied to an isolated fluid turbine. In some embodiments, a cluster-level MPPT protocol may be applied in the absence of MPPT controllers dedicated to the individual fluid turbines.

Some embodiments involve a system for coordinating MPPT operations for a cluster of geographically-associated fluid turbines. A fluid turbine may include a mechanical device configured to capture energy from a fluid flow, as described elsewhere in this disclosure. A cluster of geographically associated fluid turbines may refer to a plurality of fluid turbines positioned in relative proximity to each other, as described elsewhere in this disclosure. Coordinating may include tuning, adjusting, synchronizing, and/or organizing, e.g., to achieve a targeted outcome.

In some embodiments, the cluster of fluid turbines includes horizontal axis turbines. Horizontal axis turbines (e.g., HAWTs) may refer to fluid turbines where an axis of rotation of the turbine blades may be substantially parallel to a fluid flow. In some embodiments, the cluster of fluid turbines includes vertical axis turbines. Vertical axis turbines (e.g., VAWTs) may refer to fluid turbines where an axis of rotation for the turbine blades may be substantially perpendicular to a fluid flow. In some embodiments, the cluster of fluid turbines may include drag fluid turbines. A drag fluid turbine may be propelled directly by a fluid flow and may reach a maximum rotational speed corresponding to the fluid flow speed. In some embodiments, the cluster of fluid turbines may include lift fluid turbines. A lift fluid turbine may have an airfoil shape (e.g., similar to a wing or a sail) and may be configured to cause an increase in lift force by presenting a greater angle to the fluid flow (e.g., an angle of attack). A lift fluid turbine may spin at a rotational speed greater than a fluid flow. In some embodiments, the fluid turbines are wind turbines. Wind turbines may refer to fluid turbines configured to convert an airflow to kinetic energy or mechanical rotational motion. A generator driven by a wind turbine may convert mechanical rotational motion to electrical energy. In some embodiments, the fluid turbines are water turbines. Water turbines may refer to fluid turbines configured to convert a water flow (e.g., a river, a waterfall, a hydroelectric dam, an ocean current) to electrical energy.

By way of a non-limiting example, FIG. 1 shows horizontal axis fluid turbine 102, and vertical axis fluid turbines 100, and 106-112. Fluid turbines 100 and 102 may be wind turbines, and fluid turbine 104 may be a water turbine.

MPPT operations may include one or more procedures associated with an MPPT protocol configured to coordinate fluid power capture of a fluid turbine by adjusting a rotational speed thereof. For each fluid speed, there may be an optimal or near-optimal rotational speed for a particular turbine at which the particular turbine may output a maximum or near-maximum amount of power. Therefore, a fluid turbine may be designed to operate at a maximum (or near maximum) power output when subjected to differing fluid speeds by spinning at differing rotational speeds. An MPPT operation may adjust a rotational speed of a fluid turbine to achieve an optimal (e.g., or near optimal) rotational speed for a given fluid speed by adjusting a load imposed on the fluid turbine. In some embodiments, a charge controller may adjust a load on a fluid turbine, e.g., by diverting some power generated by the fluid turbine to a dump load. Some MPPT operations may require prior knowledge of operational parameters of a fluid turbine, and some MPPT operations may require no prior knowledge but may be based on an iterative approach, e.g., using feedback. In some embodiments, MPPT operations may be performed absent fluid speed data from an anemometer, or using fluid speed data form an anemometer.

Coordinating MPPT operations for a cluster of geographically-associated fluid turbines may include adjusting one or more loads imposed on one or more fluid turbines included in the cluster of geographically-associated fluid turbines to cause an aggregated power produced by the cluster to reach a target level. In some instances, a target level for aggregate power output may correspond to a maximum or near-maximum level for a given fluid speed. In some embodiments, coordinating MPPT operations for a cluster of fluid turbines may include overriding one or more MPPT operations for an individual fluid turbine in the cluster, e.g., for a limited time duration. For example, causing one or more fluid turbines in a cluster of geographically-associated fluid turbines to operate at a sub-optimal level may improve an aggregate power output of the cluster as a whole. In some embodiments, MPPT operations may be coordinated for a cluster of geographically-associated fluid turbine in the absence of a fluid speed measurement by an anemometer.

Some embodiments involve at least one processor (e.g., configured to perform operations for coordinating MPPT operations for a cluster of fluid turbines).

At least one processor may include a single processor or multiple processors communicatively linked to each other and capable of performing computations in a cooperative manner, as described elsewhere in this disclosure. For example, at least one processor may include one or more processor for controlling operations of a plurality of geographically-associated fluid turbines to operate collectively as a single fluid energy conversion system.

Some embodiments involve receiving data from the cluster of geographically-associated fluid turbines. Data from a cluster of geographically-associated fluid turbines may include information detected by one or more sensors associated with one or more individual fluid turbines in a cluster of geographically-associated fluid turbines, and/or one or more sensors associated with a cluster of geographically-associated fluid turbines (e.g., taken as an integral fluid energy conversion system). The data may be associated with one or more of a fluid speed, a rotational speed (e.g., a blade RPM, a shaft RPM, and/or a rotor RPM), a power output (e.g., including one or more of a voltage level, a current level, a signal amplitude, a signal frequency, a phase shift), a load (e.g., a resistance and/or an impedance), a vibration, a temperature, a braking signal, and/or any other information detected by one or more sensors associated with a cluster of geographically-associated fluid turbines. The data may include information associated with each fluid turbine in the cluster, and/or information aggregated for the entire cluster of geographically-associated fluid turbines (e.g., including one or more statistics such as an average, a mode, a standard deviation, a maximum, a minimum, and/or any other statistical measure of data associated with a cluster of geographically-associated fluid turbines). The data may include information associated with different types of sensors (e.g., a fluid speed, a rotational speed, and a braking signal), or associated with a single type of sensor (e.g., temperature). The data may be associated with an instant in time, and/or with a time duration (e.g., at least 10 second, or at least 30 seconds). For example, the data may include a rotational speed determined for each fluid turbine in the cluster based on a rotor RPM and a blade-tip RPM over a 30 second time period, and/or an average rotational speed, a maximum rotational speed, and minimum rotational speed determined for the cluster based on a rotor RPM and a blade-tip RPM over the 30 second time period.

Receiving data from a cluster of geographically-associated fluid turbines may include receiving (e.g., by at least one processor) one or more electronic notifications from one or more sensors associated with one or more individual fluid turbines in a cluster of geographically-associated fluid turbines, and/or one or more sensors associated with the entire cluster. Receiving data may involve periodically polling one or more sensors (e.g., a voltage sensor, a current sensor, a braking sensor, a temperature sensor, a fluid speed sensor, a rotational speed sensor, a vibration sensor, and/or any other type of sensor associated with a cluster of geographically-associated fluid turbines) for information, and/or receiving an electronic notification from one or more sensors, e.g., as a synchronized event and/or an unsynchronized (e.g., interrupt) event. The at least one processor may receive data from one or more sensors via a wired and/or wireless communications link either locally or remotely, and may store the received information in memory (e.g., for immediate and/or subsequent access).

In some embodiments, the data received from the cluster of geographically-associated fluid turbines may include power data associated with one or more individual turbines in the cluster (e.g., each individual fluid turbine in the cluster), and/or power data associated with an aggregate power for the entire cluster of geographically-associated fluid turbines, operating as an integral fluid energy conversion system. Power (e.g., electric power) may be measured in watts (e.g., Kilowatts, or Megawatts) and may refer to a rate of electrical energy transferred by an electric circuit. Power may be calculated from a known voltage and/or current level (e.g., watts=volts x amps). Electric power may be generated by an electric generator (e.g., connected to a fluid turbine). As used herein, the phrase "power generated by a fluid turbine" or "power output from a fluid turbine" may refer to power generated by a generator associated with the fluid turbine. Power data may include information relating to a level of power outputted by a fluid turbine and/or a circuit connected thereto. Power data may include one or more of a measurement of a voltage signal, a current signal, a signal amplitude, a signal frequency, a resistance level, an impedance level, and/or any other measurement allowing to compute electric power.

Power data from a cluster of geographically-associated fluid turbines may include information associated with a power output of one or more individual fluid turbines in the cluster, and/or a net (e.g., total) amount of power produced by aggregating power generated by each fluid turbine in the cluster. The power data may include one or more of a voltage, current, signal amplitude, signal frequency, resistance and/or impedance for one or more individual fluid turbines in the cluster, and/or an aggregate voltage, an aggregate current, an aggregate DC signal, an aggregate AC signal, an aggregate signal amplitude, an aggregate signal frequency, and/or a total resistance and/or impedance associated with the cluster of fluid turbines (e.g., operating as an integral fluid energy conversion system). For example, power data may be used to determine how much power a particular fluid turbine and/or a cluster of geographically-associated fluid turbines may be producing under current fluid speed conditions. Receiving power data from a cluster of geographically-associated fluid turbines may include receiving data from a voltmeter and/or a current meter. In some embodiments, power data associated with a cluster of geographically-associated fluid turbines may include one or more DC power signals outputted by individual fluid turbines in the cluster, and/or an aggregate DC power output for the entire cluster (e.g. for charging a battery bank). In some embodiments, an inverter may convert an aggregate DC power output produced by a cluster of geographically-associated fluid turbines to a total power AC output (e.g., for outputting to an electrical grid), and power data associated with a cluster of geographically-associated fluid turbines may include the total (aggregate) power AC output.

By way of a non-limiting example, in FIG. 3, at least one processor 308 may receive data from cluster 300 of geographically-associated fluid turbines 100A-1000. By way of another non-limiting example, in FIG. 4, at least one processor (e.g., at least one processor 428 and/or processor 512) may receive data from fluid turbines 404A and 404B via at least one sensor 418A and 418B, respectively. For example, the at least one processor may receive power data from power output sensor 510.

By way of another non-limiting example, in FIG. 13, generator 406 may channel AC power output 408 to braking circuit 1300 (e.g., associated with charge controller 410) Rectifier 530 may convert AC power output 408 to a DC power signal. First voltage sensor 1310 may measure the converted DC power signal and may transmit a measurement of converted DC power signal to at least one processor 512, indicating AC power output 408.

Some embodiments involve determining changes to total power output of the cluster based on changes in loading states of individual fluid turbines in the cluster. A loading state of a fluid turbine may refer to one or more parameters characterizing a particular load (e.g., an electrical load) consuming or diverting power generated by a fluid turbine, causing rotation of the fluid turbine to slow down. In some embodiments, a loading state of a fluid turbine may additionally include one or more operational parameters of a fluid turbine subject to the particular load. A loading state of a fluid turbine may be characterized by an I-V curve (e.g., current versus voltage), resistance (e.g., for a resistive load) and/or inductance (e.g., for an indictive load), an amount of power consumed or diverted, and/or a timing and/or duration of power consumed. In some embodiments, a loading state of a fluid turbine may be associated with a rotational speed, a power output, a temperature, and/or a vibration level associated with a fluid turbine subject to the load. A loading state of a fluid turbine operating under a particular fluid speed may be associated with a particular rotational speed and power output. At least one loading state for a fluid turbine may correspond to a target rotational speed configured to produce a peak (or near peak) power output (e.g., according to an MPPT protocol).

Changes in a loading state of an individual fluid turbine may include one or more adjustments or modifications made to a load (e.g., a changed level of power consumed, changed timing, changed duration, changed impedance level) imposed on an individual fluid turbine and/or one or more corresponding changes in one or more operational parameters of the individual fluid turbine (e.g., a changed rotational speed or direction, power output, temperature, and/or vibration) in response to the changes made to the load. In some instances, at least one processor may subject a fluid turbine to a series of load changes (e.g. a series of changes in loading states of an individual fluid turbine) causing a corresponding series of changes in operational parameters. In some embodiments, the at least one processor may change a load on a fluid turbine to identify a loading state corresponding to a peak (or near peak) power output for the fluid turbine operating under a particular fluid speed (e.g., according to an MPPT protocol).

Changes in loading states of individual fluid turbines in a cluster may include subjecting at least some of the fluid turbines in a cluster to a changes in a load imposed thereon causing a corresponding changes in the operation of the at least some fluid turbines. For instance, the at least one processor may generate a plurality of signals (e.g., load signals), each signal characterized by a change in an amount of power for diverting from a fluid turbine (e.g., thereby subjecting the fluid turbine to a load). The at least one processor may transmit the signals to at least some of the fluid turbines in the cluster to implement changes in the loading states. In some embodiments, the at least one processor may subject the same changes in loading states (e.g., the same signals) to at least some of the fluid turbines in the cluster. In some embodiments, the at least one processor may subject different changes in loading states (e.g., different signals) to at least some of the fluid turbines in the cluster. The different changes in loading states (e.g., imposed on different individual fluid turbines in the cluster) may be associated with the same signal characteristics (e.g., different changes in frequency for different fluid turbines) or different signal characteristics (e.g., changes in frequency for some fluid turbines and changes in phase for other fluid turbines). In some embodiments, the at least one processor may subject all of the fluid turbines in a cluster to changes in loading states (e.g., the same or different changes). In some embodiments, changes in loading states of individual fluid turbines in a cluster may be indicated in data received from the cluster (e.g., power data).

In some instances, the at least one processor may generate multiple series of changes to loading states for differing individual fluid turbines in a cluster based on the response characteristics of different fluid turbines. For example, the at least one processor may subject different fluid turbines to different loads to cause the different fluid turbines to rotate at substantially the same rotational speed and/or direction, or alternatively to cause at least some of the fluid turbines to rotate at differing rotational speeds and/or directions. As another example, the at least one processor may subject different fluid turbines to different loads to cause the different fluid turbines to produce substantially the same power output (e.g., substantially the same phase and/or frequency), or alternatively to cause at least some of the fluid turbines to produce different power outputs (e.g., different phase and/or frequency).

Total power output of a cluster (e.g., of geographically associated fluid turbines may include an aggregate AC power signal and/or an aggregate DC power signal produced by combining power produced by each fluid turbine in the cluster. In some embodiments, to avoid loss due to aggregating interfering (e.g., incompatible) AC signals outputted by a plurality of fluid turbines in a cluster of geographically-associated fluid turbines, each AC signal produced by each fluid turbine in the cluster may be converted to a DC signal (e.g., via a dedicated rectifier). The plurality of DC signals may be aggregated, e.g., to prevent interference that may result in loss.

By way of a non-limiting example, in FIG. 3, at least one processor 308 may determine changes to total power output 314 of cluster 300 based on changes in loading states of individual fluid turbines 100A-100C in cluster 300.

By way of another non-limiting example, in FIG. 4, the at least one processor (e.g., at least one processor 428 and/or processor 512) may change one or more loading states on individual fluid turbines 404A and 404B, for example by sending signals to charge controllers 410A and 410B to impose new loading states on fluid turbines 404A and 404B. The changes in the loading states may cause corresponding changes in rotational speed for each of fluid turbines 404A and 404B. The at least one processor may receive data from rotation sensors 502 associated with each of fluid turbines 404A and 404B and may calculate power outputted by each of fluid turbines 404A and 404B based on the measured rotational speeds, for example, using one or more versions of chart 1200 (e.g., see FIG. 12). The at least one processor may calculate the total electric power output 440 produced by cluster 401 of fluid turbines 404A and 404B based on the calculated power output for each of fluid turbines 404A and 404B.

By way of a further non-limiting example, in FIG. 13, at least one processors 512 (e.g., dedicated to one of individual fluid turbines 404) may determine a power output of individual fluid turbine 404 based on changes in loading states imposed via electronic brake control 518 and/or based on signals received from first voltage sensor 1310. At least one processor 512 may communicate the changes in loading states for individual fluid turbine 404 to at least one processor 428 associated with cluster 401 of geographically-associated fluid turbines 404, thereby allowing at least one processor 428 to receive change in loading states for each individual fluid turbine 404 in cluster 401. At least one processor 428 may determine changes to total electric power output 440 of cluster 401 based on the received loading states for each individual fluid turbine 404 in cluster 401.

In some embodiments, determining changes to total power output of the cluster based on changes in loading states of individual fluid turbines in the cluster includes calculating or measuring changes to total power output. Calculating may include performing one or more arithmetic and/or logical computations. Measuring changes may include sensing a total power output periodically (e.g., by a voltage and/or current sensor). The at least one processor may receive (e.g., from a voltage and/or current sensor) a first total power output for a first time instance and a second total power output for a second time instance, and may calculate the difference between the first total power output and the second total power output. In some instances, the at least one processor may measure changes to total power output for a cluster of fluid turbines in response to subjecting individual turbines in the cluster to varying loading states.

By way of another non-limiting example, in FIGS. 4 and 5, based on the changes in the loading states, the at least one processor (e.g., at least one processor 428 and/or 512) may determine changes to total power outputted by fluid turbines 404A and 404B by receiving power output data measured by each power output sensor 510 configured with each of at least one sensor 418A and 418B associated with fluid turbines 404A and 404B, respectively.

In some embodiments, at least some of the turbines in the cluster are fluid-dynamically coupled. Fluid-dynamically coupled fluid turbines may refer to a situation where the output of one fluid turbine (e.g., an upstream fluid turbine) may impact operation of another fluid turbine (e.g., a downstream fluid turbine), where an upstream fluid turbine may encounter a fluid flow prior to a downstream fluid turbine. For example, turbulence or fluid flow generated by one fluid turbine may affect one or more of a rotational speed, a rotational direction, a power output, a vibration and/or any other operational aspect of another fluid turbine. In some instances, the fluid-dynamical coupling of two or more fluid turbines may positively or negatively affect a power output of one of the coupled fluid turbines. Thus, subjecting individual turbines to loading states associated with a peak power output (e.g., if operating independently, absent fluid-dynamic coupling) may instead produce a higher/lower total power output for the entire cluster due to a positive/negative affect attributed to fluid coupling between two or more of the fluid turbines in the cluster. In some embodiments, determining changes to total power output of the cluster may include calculating, measuring, appraising, or ascertaining changes (e.g., positive or negative changes) attributable to fluid coupling of two or more fluid turbines in the cluster.

By way of a non-limiting example, in FIG. 3, one or more of fluid turbines 100A-100C of cluster 300 may be fluid-dynamically coupled. For example, a draft produced by fluid turbine 100A may flow towards fluid turbine 100B and may affect the rotational spin of fluid turbine 100B. Similarly, a draft produced by fluid turbine 100B may flow towards fluid turbine 100C and may affect the rotational spin of fluid turbine 100C.

Some embodiments involve selecting a combination of loading states for the individual fluid turbines in the cluster to coordinate total power output for the cluster. A combination may refer to more than one. For example, a combination may include a selection of more than one element from a set of distinct member elements, for example, a subset of frequencies from a set of possible frequencies. A combination of loading states for the individual fluid turbines may include a same or similar combination of loading states for each turbine in a fluid turbine cluster, different loading states for at least some fluid turbines in the cluster, or differing loading states for each fluid turbine in the cluster. For example, at least some fluid turbines may receive the same load signal (e.g., the same level of diverted power, the same timing and the same duration) such that the at least some fluid turbines may have substantially similar loading states. Alternatively at least some fluid turbines may receive differing load signals (e.g., differing in one or more of a level of diverted power, timing and/or duration) such that some fluid turbines may have different loading states. In some embodiments, due to different operating parameters, two or more fluid turbines may be subjected to similar conditions and may be in different loading states. Selecting a combination of loading states for the individual fluid turbines may include choosing a particular combination of loading states from a plurality of candidate combinations. The selection may be based on efficiency, compliance with one or more standards or regulations (e.g., associated with the fluid turbines and/or a power sink), maximizing power output, minimizing wear, safety, and/or any other interest for coordinating operations of a cluster of geographically-associated fluid turbines.

Coordinating total power output for a cluster (e.g., of fluid turbines) may include synchronizing, tuning, and/or adjusting a total power output for an entire cluster of fluid turbines, for example to achieve a peak (or near-peak) total power output, an optimal (or near-optimal) total power output, an increase in total power output (e.g., relative to a total power output associated with loading states other than the selected combination), to achieve compliance with one or more specifications, regulations, and/or recommendations (e.g., associated with a battery bank, an electrical grid, a testing protocol, a maintenance protocol, and/or an MPPT protocol), and/or to achieve any other interest associated with a cluster of fluid turbines. In some embodiments, selecting a combination of loading states for the individual fluid turbines may involve overriding one or more loading states associated with implementing an MPPT protocol on a solitary fluid turbine. For example, a loading state configured to produce a peak power output for a non-fluid-dynamically coupled fluid turbine (e.g., based on an MPPT protocol applied to a single fluid turbine, in isolation of the other fluid turbines in the cluster) may result in a sub-peak total power output for the cluster as a whole, due to fluid-dynamical coupling between some of the fluid turbines. Thus, in some embodiments, the at least one processor may select loading states for individual fluid turbines in the cluster that account for fluid-dynamical coupling of at least some of the fluid turbines, and that may override one or more loading states associated with an MPPT protocol applied to one or more fluid turbines in isolation.

By way of a non-limiting example, in FIG. 3, at least one processor 308 may select the combination of loading states for individual fluid turbines 100A-1000. The selected combination of loading states may coordinate total power outputted by cluster 300. By way of another non-limiting example, in FIGS. 4, 5, and 13, at least one processor 512 (e.g., dedicated to one of individual fluid turbines 404) may send loading state data for the individual fluid turbine 404 to at least one processor 428. The loading state data may coordinate power output for the individual fluid turbine 404 (e.g., operating without consideration of the other fluid turbines 404 in cluster 401). In some embodiments, at least one processor 428 may select the combination of loading states for individual fluid turbines 404 based on loading state data received from each at least one processor 512 associated with each fluid turbine 404 in cluster 401. The selected combination of loading states may coordinate total electric power output 440 produced by cluster 401.

In some embodiments, selecting the combination of loading states for the individual fluid turbines in the cluster accounts for variations in fluid conditions affecting the cluster. Variations in fluid conditions may include changes in fluid speed, fluid flow direction, turbulence, and/or mobile (e.g., airborne) objects in a fluid flow. Variations in fluid conditions affecting a cluster may include a fluid speed dropping below an operating threshold for the fluid turbine in the cluster, a fluid speed exceeding a safety threshold for the fluid turbines in the cluster, a change in fluid speed causing one or more fluid turbines to cease or to begin producing a peak (or near peak) power output, a change in fluid flow causing, ceasing, increasing, or decreasing of fluid-dynamical coupling between two or more fluid turbines, and/or any other effect of a change in fluid flow on a cluster of fluid turbines. In some embodiments, the variations in fluid conditions are associated with variations in power outputted by differing ones of the fluid turbines in the cluster. Variations in power output may include an increase or a decrease in power output, beginning or ceasing to produce a peak (or near peak) power output, beginning or ceasing to produce a threshold power output for an electrical grid, beginning or ceasing to produce a threshold power output associated with a safety regulation, and/or any other type of variation in power output. Variations in power outputted by differing ones of the fluid turbines may refer to different power levels outputted by at least some fluid turbines in a cluster in response to varying fluid conditions. For example, when a fluid flow changes, the most upstream fluid turbine in a cluster may increase a power output by 5% but the most downstream fluid turbine in the cluster may decrease a power output by 2%. For instance, each individual fluid turbine in the cluster may be associated with a different graph (e.g., versions of chart 1200 of FIG. 12) mapping power outputs for different rotational speeds under different fluid conditions. The graph may include a mapping (e.g., a curved line) for each fluid condition indicating a different power output responses versus rotational speed. For example, under a first fluid speed, a fluid turbine may produce a peak (or near-peak) power output while spinning at a first rotational speed. However, under a second fluid speed, the fluid turbine may produce a sub-peak power output while operating at the first rotational speed. As fluid conditions vary, the at least one processor may monitor power outputs of the fluid turbines. Based on the power outputs, the at least one processor may change loading states for at least some of the fluid turbines, causing corresponding changes in rotational speeds to accommodate the varied fluid conditions. For example, the at least one processor may change loading states to track a peak (or near peak) power output for an individual fluid turbine.

By way of a non-limiting example, in FIG. 4, at least one processor 428 may select the combination of loading states for individual fluid turbines 404A-404B to account for variations in fluid conditions (e.g., of fluid flow 210) affecting cluster 401. For example, at least one processor 428 may detect an increased fluid flow speed. The increase in fluid flow speed may cause fluid turbines 404A-404B to operate outside of the peak (or near-peak) power outputs (e.g., in FIG. 12, as fluid speed varies between $v_{w1}$ to $v_{w6}$, the rotational speed needed to produce peak power outputs 1204 to 1214 varies as well). At least one processor 428 may select a combination of loads for individual fluid turbines 404A-404B to change each rotational speed to cause each of fluid turbines 404A-404B to produce a peak (or near-peak) power output. In some embodiments, the variations in fluid conditions may be associated with variations in power outputted by differing ones of fluid turbines 404A-404B. For example, a reduction in fluid speed of 5% may reduce the power output of fluid turbine 404A by 4% but may reduce the power output of fluid turbines 404B by only 2%. The at least one processor may adjust the loading states to cause each of fluid turbines 404A-404B to produce a peak (or near peak) power output for the new fluid speed condition.

In some embodiments, the selected combinations of loading states are configured to cause some fluid turbines in the cluster to operate differently from other fluid turbines in the cluster. A fluid turbine operating differently from another fluid turbines may refer to differences in rotational speed, braking forces, other resistances, power output, blade orientations, and/or any of the other examples provided herein. The turbines in a cluster may be loaded differently (e.g., alterable characteristics changed) so that not all of the turbines in a cluster operate in the same manner. For example, a similar change to loading states of different turbines may cause different rotational speeds, different rotational directions, generation of different output power (e.g., a different frequency, phase, amplitude), operation under different impedances and/or resistances, different temperatures, and/or different modes of vibration for different fluid turbines.

By way of a non-limiting example, in FIG. 4, at least one processor 428 may select combinations of loading states to cause fluid turbine 404A to operate differently than fluid turbine 404B. For example, the combinations of loading states may cause fluid turbine 404B to spin at a differing rotational speed and/or direction than fluid turbine 404A (e.g., due to fluid turbine 404B being downstream of fluid turbine 404A).

In some embodiments, the differences in operation vary based on changing fluid conditions. Changing fluid conditions may refer to one or more of a changed direction, changed speed, and/or changed turbulence of a fluid flow. Physical characteristics of a fluid turbine may additionally affect a response of a fluid turbine to a change in fluid conditions. For example, under a first fluid condition, the selected combinations of loading states may cause a first set of differences between a first group of fluid turbines and a second group of fluid turbines, whereas under a second fluid condition, the same selected combinations of loading states may cause a second set of differences between the first group of fluid turbines and the second group of fluid turbines. For example, under the first fluid conditions, the selected combination of loading states may cause the first group to spin faster than the second group, and under the second fluid conditions, the same selected combination of loading states may cause the first group to spin slower than the second group.

By way of a non-limiting example, in FIG. 4, the differences in operation of fluid turbines 404A-404B may vary based on changing conditions of fluid flow (e.g., fluid flow 210). For example, upon sensing a change in direction of fluid flow (e.g., via fluid speed sensor 504 of FIG. 5), at least one processor 428 may determine that fluid turbines 404A may now be downstream of fluid turbine 404B. Due to the changing conditions of the fluid flow, at least one processor 428 may cause fluid turbine 404B to spin at a differing rotational speed than fluid turbine 404A.

In some embodiments, the selected combinations of loading states vary over time for differing combinations of fluid turbines in the cluster. Vary over time may refer to a change, or an alteration over a time period. Different combinations of fluid turbines may refer to differing subsets of fluid turbines included in the cluster. Over time, conditions under which a cluster of fluid turbine operates may change. For example, fluid conditions may change, a demand for power may change (e.g., a peak demand of an electrical grid may change to a lull in demand), or a battery bank may require filling/emptying. The changed conditions may affect some fluid turbines differently than others. Under first operating conditions, the at least one processor may select a first combination of loading states for a first group of turbines. Over time, when conditions change to a second condition, the at least one processor may select a second combination of loading states for a second group of fluid turbines. For example, in the morning hours, an easterly wind may affect a cluster of wind turbines and the at least one processor may select loading states for east-facing turbines in the cluster. In the afternoon, the wind may change to a westerly wind, and the at least one processor may select different loading states for west-facing turbines in the cluster.

By way of a non-limiting example, in FIG. 3, at least one processor 308 may vary the selected combinations of loading states over time for differing combinations of fluid turbines 100B-100C in cluster 300. For example, during a first time period, at least one processor 308 may select a first loading state for fluid turbine 100A and a second loading state to each of fluid turbines 100B-100C. During a second time period (e.g., after sensing a changing condition in fluid flow 210), at least one processor 308 may select a third loading state to each of fluid turbines 100A and 100B, and a fourth loading state to fluid turbine 100C.

In some embodiments, the differing operations in the cluster include at least one of a rotational speed (RPM), a voltage output, a current output, a direction of rotation, a blade orientation to a fluid flow, or a relative blade orientation between at least two turbines in the cluster. A rotational speed may refer to a rotational velocity, acceleration, or pace of a blade tip, a shaft, a mounting plate connecting a plurality of blades to a rotor, a rotor, and/or any other rotatable component associated with a fluid turbine. A voltage output may refer to a potential difference associated with a power output of a fluid turbine. A current output may refer to net rate of flow of electric associated with a power output of a fluid turbine. A direction of rotation may refer to a clockwise or counter-clockwise rotation of a plurality of blades of a fluid turbine. A blade orientation to a fluid flow may refer to an incident angle between a fluid flow and a blade (e.g., a blade pitch and/or blade yaw). A relative blade orientation between at least two turbines in the cluster may refer to at least two fluid turbines having a different pitch and/or yaw relative to a common (e.g., vertical) axis. For example, the at least one processor may select a combination of loading states causing some fluid turbines to output power at a different voltage that other fluid turbines, and spin at different pitch and/or yaw angles than other fluid turbines.

By way of a non-limiting example, in FIG. 3, the differing operations in cluster 300 may include at least one of an RPM for any of fluid turbines 100A-100C, a blade orientation of any of fluid turbines 100A-100O to fluid flow 210, and/or a relative blade orientation between fluid turbines 100A and 100B in cluster 300. By way of another non-limiting example, in FIGS. 4-5, at least one processor 428 (e.g., corresponding to at least one processor 308) may communicate with at least one processor 512 of individual fluid turbine 404A and/or individual fluid turbine 404B to adjust a blade yaw via blade yaw control 526, and/or to adjust a blade pitch via blade pitch control 528. Additionally or alternatively, the differing operations in fluid turbines 404A and 404B may include a voltage output and/or current output (e.g., detected by power output sensors 510 of at least one sensor 418A and 418B, respectively).

In some embodiments, selecting the combination of loading states for the individual fluid turbines in the cluster accounts for a spatial distribution of the individual fluid turbines in the cluster. A spatial distribution may refer to one or more of a relative distance, a relative orientation, and/or a relative elevation between individual fluid turbines, and/or location of a fluid turbine relative to one or more physical objects (e.g., buildings, trees, objects, mountains, valleys, bridges) that may affect the operation of one or more fluid turbines in the cluster. A spatial distribution may affect a fluid-dynamical coupling between two or more fluid turbines (e.g., causing one fluid turbine to be downstream of another fluid turbine). In some instances, the at least one processor may store a spatial distribution of the individual fluid turbines in memory and may use the spatial distribution to determine fluid-dynamical coupling between differing fluid turbines (e.g., based on current fluid conditions). The at least one processor may select a combination of loading states for individual fluid turbines to account for any fluid-dynamical coupling based on the spatial distribution. In some instances, the at least one processor may determine a spatial distribution of the individual fluid turbines in the cluster based on image data received from one or more images sensors associated with the fluid turbines.

By way of a non-limiting example, in FIG. 3, the combination of loading states selected by at least one processor 308 for individual fluid turbines 100A-100C in cluster 300 may account for a spatial distribution of each of fluid turbines 100A-1000 in cluster 300. For example, the at least one processor may select different loading states for fluid turbines 100A and 100C (e.g., positioned at the ends of cluster 300) than the loading state selected for fluid turbine 100B (e.g., sandwiched between fluid turbines 100A and 100C). For instance, at least one processor 308 may cause fluid turbines 100A and 100C to spin at a differing rotational speed than fluid turbine 100B.

Some embodiments involve transmitting the selected combination of loading states to at least some of the individual fluid turbines in the cluster in order to vary rotational speeds of the at least some of the individual fluid turbines in the cluster. Transmitting may include sending, e.g., a signal via a wired or wireless channel. Transmitting the selected combination of loading states to at least some of the individual fluid turbines in the cluster may include generating signals configured to impose the selected combination of loading states on at least some individual fluid turbines (e.g., where the generated signals may account for physical characteristics of each individual fluid turbine), and sending the signals to the individual fluid turbines (e.g., or to an electric generator connected thereto), thereby imposing the loading states on the individual fluid turbines. Varying may include changing or modifying. Varying rotational speeds for some individual fluid turbines may include slowing one or more rotational speeds (e.g., by increasing a load), accelerating one or more rotational speeds (e.g., by decreasing a load), and/or changing a direction of rotation for some individual fluid turbines. In some instances, varying the rotational speeds for at least some fluid turbines may cause each of the fluid turbines to produce a target power output. A target power output may be associated with a peak (or near-peak) power output, and/or with compliance with one or more specifications and/or recommendations (e.g., associated with maintenance, safety, testing, compatibility, and/or any other interest associated with a fluid turbine). Similarly, a total target power output may be associated with a peak (or near-peak) total power output, and/or with compliance with one or more specifications and/or recommendations (e.g., associated with maintenance, safety, testing, compatibility, and/or any other interest associated with a cluster of fluid turbines). In some instances, varying the rotational speeds for some fluid turbines may cause at least one fluid turbine to produce non-target power outputs (e.g., divergent from a target power output). In some instances, a target total power output for a cluster of fluid turbines may include at least one non-target power output from at least one of the fluid turbines. For example, the at least one non-target power output, when combined with power outputs from other fluid turbines in the cluster, may produce the target total power output for the cluster, e.g., due to fluid-dynamical coupling.

By way of a non-limiting example, in FIG. 3, at least one processor 308 may transmit the selected combinations of loading states to at least fluid turbines 100A and 100B of cluster 300, in order to vary rotational speeds of at least fluid turbines 100A and 100B. By way of another non-limiting example, in FIG. 4, the at least one processor (e.g., at least one processor 428 and/or processor 512) may transmit the selected combination of loading states to fluid turbines 404A and 404B via charge controllers 410A and 410B, respectively. Charge controllers 410A and 410B may impose the selected combinations of loading states on fluid turbines 404A and 404B by diverting some power outputted by generators 406A and 406B to a dump load.

By way of another non-limiting example, in FIG. 10 taken together with FIGS. 4 and 13, a version of braking circuit 1300 may be associated with each charge controller 410 allowing for individual coordination of fluid turbines 404 (e.g., in isolation). For example, MPPT control 1002 of each braking circuit 1300 may be associated with at least one processor 512 and at least one memory 514 of charge controller 410 dedicated to an individual fluid turbine 404. Each at least one processor 512 may communicate with at least one processor 428 via interconnecting circuitry 414 allowing at least one processor 428 to coordinate cluster 401 of fluid turbines 404 operating together as integral fluid energy conversion system 400. At least one processor 428 may transmit the selected combinations of loading states to at least some of charge controllers 410, allowing at least some of processors 512 (e.g., and some of MPPT controls 1002) to vary rotational speeds of at least some of fluid turbines 404 in cluster 401.

In some embodiments, the combination of loading states for the individual fluid turbines in the cluster are selected based on applying an MPPT protocol to each individual fluid turbine to determine an associated individual loading state for each individual fluid turbine and subjecting at least one of the individual loading states for an individual fluid turbine to at least one global constraint for the cluster. An MPPT protocol may involve transmitting signals to adjust a rotational speed of a fluid turbine, as described elsewhere in this disclosure. Applying an MPPT protocol to each individual fluid turbine in a cluster may involve at least one processor communicating with one or more MPPT units to generate signals configured to impose loading states on each individual fluid turbine in conformance with an MPPT protocol, and transmitting the signals to the MPPT units. In some embodiments, each fluid turbine may be associated with a dedicated MPPT unit. In some embodiments, multiple fluid turbines may be associated with the same (e.g., common) MPPT unit. Determining an associated individual loading state for each individual fluid turbine (e.g., based on applying an MPPT protocol to each individual fluid turbine) may involve determining a signal for each individual fluid turbine configured to impose a loading state associated with producing a peak (or near-peak) power output. Since one or more individual fluid turbines may have different physical characteristics (e.g., size, shape, type, relative orientation and/or position to other objects, and/or wear), different load states (e.g., produced by different signals) may be required to produce a peak (or near-peak) power output for each individual fluid turbine. The at least one processor may associate an individual loading state with each individual fluid turbine in the cluster (e.g., to account for differing physical characteristics).

A constraint may refer to a restriction, a limitation (e.g., an upper bound and/or a lower bound). A constraint may be imposed on a system to achieve a target outcome, e.g., associated with efficiency, safety, reliability, and/or durability. A global constraint for a cluster of fluid turbines may refer to a constraint imposed on each fluid turbine in the cluster and/or on over the entire cluster of geographically-associated fluid turbines operating as an integral fluid energy conversion system (e.g., imposing a constraint globally on the cluster may allow, in some embodiments, violating the constraint locally on an individual fluid turbine). A global constraint for a cluster of fluid turbines may be associated with one or more of a load, a power output, a rotational speed, a vibration, a temperature, an impedance, a resistance, compliance with one or more regulations or recommendations, compliance and/or compatibility with an electrical grid, compatibility (e.g., voltage compatibility) with a battery bank, a timing, duration, maximum, minimum, average, mode, and/or standard deviation associated with any of the above, and/or with any other interest associated with a cluster of fluid turbines. Subjecting at least one individual loading state for an individual fluid turbine to at least one global constraint for the cluster may involve modifying an individual loading state for an individual fluid turbine (e.g., conforming with an MPPT protocol applied to the individual fluid turbine) to cause compliance of the cluster of fluid turbines with the global constraint. In some embodiments, subjecting at least one individual loading state for an individual fluid turbine to a global constraint for the cluster may cause the individual fluid turbine to cease producing a peak (or near peak) power output according to an MPPT protocol for the individual fluid turbine. For example, according to the MPPT protocol, the loading state for an individual fluid turbine may be associated with a first rotational speed. Subjecting the loading state to the global constraint may cause the individual fluid turbine to rotate at a second rotational speed (e.g., faster or slower than the first rotational speed). For instance, the global constraint may account for fluid-dynamical coupling between at least some individual fluid turbines.

By way of a non-limiting example, in FIGS. 10 and 11, the at least one processor (e.g., at least one processor 428 and/or 512) may select the combination of loading states for individual fluid turbines 404 by applying an MPPT protocol to each individual fluid turbine 404 (e.g., in isolation), to determine an associated individual loading state for each of fluid turbines 404. For example, the at least one processor may transmit signals to MPPT controls 1002 included in each of charge controllers 410 to subject each of fluid turbines 404 to a loading state conforming with an MPPT protocol (e.g., configured for a single fluid turbine). As another example, the at least one processor may transmit a signal to an MPPT unit configured with inverter 434 to control a load for subjecting on fluid turbines 404. In some embodiments, the at least one processor may apply the MPPT protocol to each of fluid turbines 404 by using one or more versions of chart 1200 (e.g., see FIG. 12) stored in memory (e.g., memory 430 of FIG. 4). The at least one processor may subject at least one of fluid turbines 404 to at least one global constraint for the cluster including all of fluid turbines 404. For example, the constraint may cap a total (e.g. aggregate) power output produced by all of fluid turbines 404 to conform with a specification for electrical energy sink 402 (e.g., by capping an aggregate DC power output 724 for delivery to battery bank 720 and/or by capping aggregate AC power output 722 for deliver to electrical grid 718). For example, DC power output 724 may be capped to 14V, or 40V, or any other voltage level compatible with a battery.

By way of another non-limiting example, in FIG. 13, each of at least one processors 512 (e.g., dedicated to an individual fluid turbine 404) may apply an MPPT protocol the individual fluid turbine 404 of cluster 401 via electronic brake control 518 to determine an associated loading state for the individual fluid turbine 404. Each of at least one processors 512 may transmit information indicative of the associated loading state to at least one processor 428 (e.g., associated with cluster 401 of fluid turbines 404). At least one processor 428 may subject at least one of the associated loading states for an individual fluid turbine 404 of cluster to a global constraint (e.g., a maximum or minimum power output, or a maximum or minimum rotational speed). At least one processor 428 may select the combination of loading states for individual fluid turbines 404 in cluster based on the associated individual loading states for each individual fluid turbine 404 (e.g., received from each of processors 512) and the application of the at least one global constraint.

In some embodiments, applying the MPPT protocol to each individual turbine includes, while each individual turbine is in operation in first fluid conditions, initially testing a generator electrical output of the individual turbine based on a sequence of differing loads. A fluid condition may include a speed, a direction, and/or a turbulence of a fluid flow. While each individual turbine is in operation in first fluid conditions may refer to a time period during which each individual fluid turbine in a cluster operates under a substantially uniform fluid flow (e.g., a substantially uniform fluid speed and/or direction), such that changes in operating parameters associated with each individual fluid turbine may not be attributable to changes in fluid flow conditions. A generator electrical output may refer to electric power generated by a generator connected to a fluid turbine by converting mechanical rotational energy of the fluid turbine to electrical energy. Initially testing a generator electrical output may refer to measuring, receiving, assessing, checking, or probing the electrical power prior to performing or implementing other procedures or operations. A sequence of differing loads may refer to a series or succession of differing loads, e.g., a succession of differing signals, each signal configured to impose a different load on an electric generator. Testing a generator electrical output based on a sequence of differing loads may involve assessing or evaluating each electrical output in response to one or more differing loads, for example to determine a correspondence between differing loads and electrical outputs.

By way of a non-limiting example, in FIGS. 10 and 11, while each individual turbine 404 is operating in first fluid conditions (e.g., a first wind speed), the at least one processor (e.g. processor 428 and/or 512) may apply the MPPT protocol to each individual fluid turbine 404 by testing each of AC power outputs 408 (e.g., generator electrical outputs) of each of generators 406 based on a sequence of (e.g., at least five or at least ten) differing loads. For example, the at least one processor may impose the loads via each of MPPT controls 1002.

By way of another non-limiting example, in FIG. 13, while each of fluid turbines 404 of cluster operates in first fluid conditions (e.g., 6 m/s), each of at least one processors 512 (e.g., dedicated to one of individual fluid turbines 404) may initially test AC power output 408 (e.g., a generator electrical output) of each fluid turbine 404 based on a sequence of ten different loads imposed on each of fluid turbines via each of electronic brake controls 518, thereby applying an MPPT protocol to each of fluid turbines 404.

In some embodiments, testing the generator of each individual turbine based on the sequence of differing loads includes simulating the differing loads on the generator and predicting a response of the generator. Simulating may refer to using a model (e.g., a mathematical model) to implement an abstraction of a physical phenomenon, for example, using at least one processor. Simulating different loads on a generator may include using a mathematical and/or computerized model of a generator (e.g., a power curve for a generator for example based on a prior physical testing of the same or similar generator) to assess a response of the generator to different loads. Predicting may refer to forecasting, extrapolating, interpolating, and/or otherwise gauging a potential outcome, e.g., based on a model or a simulation. Predicting a response of a generator (e.g., connected to a fluid turbine) to differing loads may include inputting differing load values into a model for a generator and computing an output response value (e.g., a simulated power output) for each input load value. In some embodiments, the at least one processor may use the simulated power output values to build a power curve for each generator.

By way of a non-limiting example, in FIGS. 10 and 11, the at least one processor (e.g., at least one processor 428 and/or 512) may test each of generators 406 of each individual fluid turbine 404 based a sequence of differing loads by simulating the differing loads on each of generators 406 and predicting a response. For example, the at least one processor may use a version of chart 1200 for each of fluid turbines 404 (e.g., stored in memory 430) and may simulate a response of each generator 406 to the sequence of differing loads based on the version of the graph.

By way of another non-limiting example, in FIGS. 4 and 13, at least one processor 428 may test each of generators 406 of each individual fluid turbine 404 by simulating the differing loads based on a model stored in memory 430, and predicting a response of each generator 406.

In some embodiments, testing the generator of each individual turbine based on the first sequence of differing loads includes applying the differing loads on each generator and measuring a response of each generator. Applying differing loads on each generator may include generating signals (e.g., physical signals) configured to impose differing loads on a generator and transmitting the generated signals to each generator. Measuring a response of each generator may include receiving a signal (e.g., a physical signal) from at least one sensor (e.g., a voltage and/or current sensor) configured with each generator (e.g., subsequent to transmitting a signal configured to impose a load) and determining from the received signals a physical power output for each generator. In some embodiments, the at least one processor may store the power outputs for each generator in memory. In some embodiments, the at least one processor may use the power outputs to build a power curve for each generator.

By way of a non-limiting example, in FIGS. 10 and 11, the at least one processor (e.g., at least one processor 428 and/or 512) may test generators 406 of each individual fluid turbine 404 based on the first sequence of differing loads by applying the differing loads on each of generators 406 via each of MPPT controls 1002 and/or an MPPT control configured with inverter 434. The at least one processor may measure a response of each of generators 406, e.g., by measuring each of AC power outputs 408.

By way of another non-limiting example, in FIG. 13, each of at least one processor 512 may apply the differing loads to each generator 406 via electronic brake control 518 and may measure a response of each generator 406 to the differing loads to thereby test each generator 406 of each individual fluid turbine 404.

In some embodiments, the at least one processor is configured to receive, determine, select, and transmit on a continual basis. A continual basis may refer to a period of time that is ongoing or extended. Receiving, determining, selecting and transmitting may be performed at regular intervals (e.g., continuously, every fraction of a minute, every minute, every 10 minutes, every half hour, or based on any other time interval). In some instances, determining, selecting, and transmitting may be performed in response to receiving notifications from one or more sensors (e.g., in response to polling one or more sensors, and/or to receiving synchronized and/or unsynchronized messages from one or more sensors). In some embodiments, the at least one processor is configured to adjust for varying fluid conditions over time. For example, determining, selecting, and transmitting may be performed in response to receiving notifications from one or more of an anemometer, a weather server, a weather satellite, and/or a weather balloon.

By way of a non-limiting example, in FIG. 4, the at least one processor (e.g., at least one processor 428 and/or processor 512) may perform the receiving, determining, selecting, and transmitting on a continual basis. For instance, during a first time period a fluid speed may reach 6 m/s and at least one processor 428 may transmit a first combinations of loading states to fluid turbines 404 (e.g., via charge controllers 410). During a second time period, the fluid speed may change to 7 m/s and at least one processor may adjust one or more loading states and select a second combination of loading states for transmitting to fluid turbines 404 via charge controllers 410.

In some embodiments, an upper-level MPPT protocol is applied at a DC stage through a charge controller. A charge controller may refer to an electronic device configured to help ensure compliance of a fluid turbine with one or more regulations, specifications, and/or recommendations, as described elsewhere in this disclosure. A DC stage may refer to a portion of an electronic circuit configured for direct current flow. A DC stage of a circuit may be located downstream from a rectifier configured to convert an AC signal (e.g., an AC power output of an electric generator) to a DC signal. A DC stage of a circuit may be associated with at least one processor. An upper-level MPPT protocol may refer to an MPPT protocol applied to a cluster of fluid turbines for determining a maximum (or near maximum) power point tracking for the cluster operating as an integral fluid energy conversion system. An upper-level MPPT protocol may encompass a plurality of MPPT protocols (e.g., lower-level MPPT protocols) applied to each individual fluid turbine in the cluster. The upper-level MPPT protocol may override one or more outputs of one or more lower-level MPPT protocols, for example, to account for fluid-dynamical coupling of at least some of the individual fluid turbines. For example, each generator may be associated with a charge controller including an MPPT control unit. Each MPPT control units may apply a (e.g., lower level) MPPT protocol to the associated generator. At least one processor may receive signals from each MPPT control unit and determine upper-level loading states corresponding to an upper-level MPPT protocol for the entire cluster. The at least one processor may transmit signals configured to impose the upper-level loading states to each associated charge controller. Each of the associated charge controllers may use the signals to impose the upper-level loading states on the associated generators.

By way of a non-limiting example, in FIG. 8, each of rectifiers 530 may convert each of AC power outputs 408 to DC power outputs, which may be transmitted to common charge controller 802 at a DC stage. At least one processor 428 (e.g., associated with cluster 401 of fluid turbines 404) may apply an upper-level MPPT protocol through common charge controller 802 at the DC stage. The upper level MPPT protocol may affect the operation of each of fluid turbines 404 in cluster 401 to coordinate a total electric power output (e.g., aggregate AC power output 722 and/or aggregate DC power output 724) by all of fluid turbines 404.

In some embodiments, an upper-level MPPT protocol is applied at an AC stage through an inverter. An inverter may refer to a device or circuitry that converts a direct current (DC) signal to an AC signal (e.g., a DC-to-AC converter), as described elsewhere in this disclosure. An AC stage may refer to a portion of an electronic circuit configured for alternating current flow. An AC stage of a circuit may be located downstream from an inverter configured to convert a DC signal to an AC signal. A circuit for a fluid turbine may include a first AC stage and a second AC stage. The first AC stage may correspond to an AC power output from a fluid turbine. The AC power output may be converted to a DC power signal (e.g., the DC stage) using a rectifier. The DC power signals may be combined to form an aggregate power signal in the DC stage. The aggregate DC power signal may be converted to an aggregate AC power output using an inverter, and corresponding to the second AC stage (e.g., downstream the DC stage). The inverter may include an MPPT unit for subjecting a load on a fluid turbine connected thereto. A cluster of geographically-associated fluid turbines may be connected to a common (e.g., shared) inverter for converting an aggregate DC power signal generated by the cluster to an aggregate AC power signal (e.g., for outputting to an electrical grid). In some embodiments, a shared inverter may include an MPPT unit for subjecting a load on an entire cluster of fluid turbines according to an upper-level MPPT protocol at an AC stage (e.g., the second AC stage). In some embodiments, an upper-level MPPT protocol applied at an AC stage through an inverter associated with a cluster of fluid turbines may be implemented in conjunction with a plurality of (e.g., lower-level) MPPT protocols applied to each individual fluid turbine, for example, at a DC stage through a charge controller, and/or at an AC stage (e.g., the first AC stage) through an electronic brake control.

By way of a non-limiting example, in FIG. 8, each of rectifiers 530 may convert each of AC power outputs 408 to DC power output signals. The DC signals may be combined to an aggregate DC signal and transmitted to inverter 434. Inverter 434 may convert the aggregate DC signal to a total AC power output 722 (e.g., an AC stage). At least one processor 428 may apply an upper-level MPPT protocol at the AC stage through inverter 434. The upper level MPPT protocol may affect the operation of each of fluid turbines 404 to coordinate aggregate (e.g., total) electric AC power output 722 of cluster 401.

Some embodiments involve a non-transitory computer readable medium containing instructions that when executed by at least one processor cause the at least one processor to perform operations for coordinating MPPT operations for a cluster of geographically-associated fluid turbines, the operations comprising: receiving data from the cluster of geographically-associated fluid turbines; determining changes to total power output of the cluster based on changes in loading states of individual fluid turbines in the cluster; selecting a combination of loading states for the individual fluid turbines in the cluster to coordinate total power output for the cluster; and transmitting the selected combination of loading states to at least some of the individual fluid turbines in the cluster in order to vary rotational speeds of the at least some of the individual fluid turbines in the cluster.

By way of a non-limiting example, in FIGS. 4-5, at least one processor (e.g., at least one processor 428 and/or 512) may perform operations for coordinating MPPT operations for cluster 401 of geographically-associated fluid turbines 404A-404B. The at least one processor may receive data from cluster 401 of geographically-associated fluid turbines 404A-404B (e.g., via each of at least one sensor 418A-418B). The at least one processor may determine changes to total electric power output 440 of cluster 401 based on changes in loading states of individual fluid turbines 404A-404B in cluster 401. The at least one processor may select a combination of loading states for individual fluid turbines 404A-404B in cluster 401 to coordinate total electric power output 440 for cluster 401. The at least one processor may transmit the selected combination of loading states to at least individual fluid turbine 404A in cluster 401 in order to vary a rotational speed of at least individual fluid turbine 404A in cluster 401.

Figure 16:
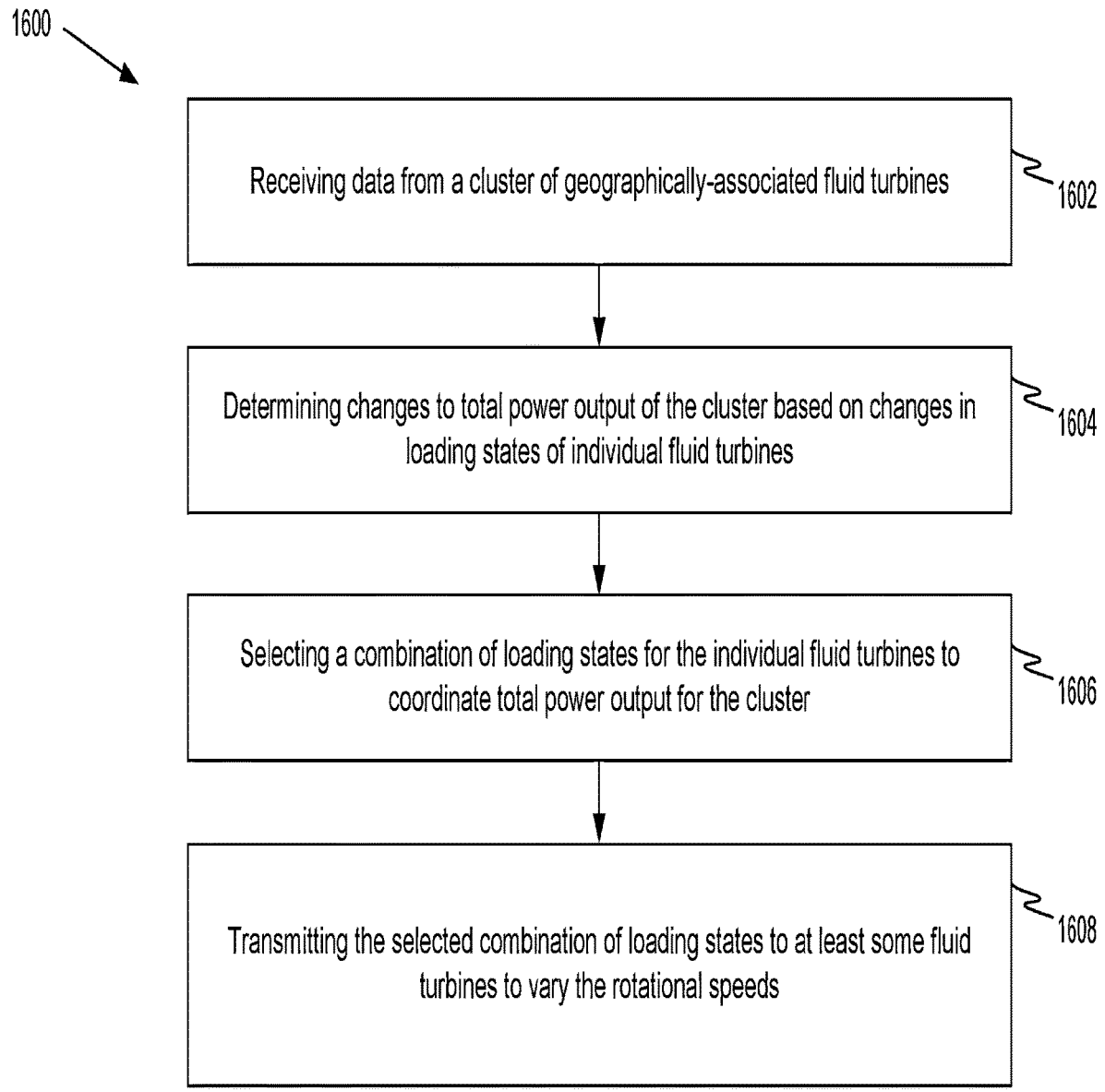
FIG. 16 is a flow diagram of an exemplary process for coordinating MPPT operations for a cluster of geographically-associated fluid turbines, consistent with embodiments of the present disclosure.

FIG. 16 illustrates a flowchart of an exemplary process 1600 for coordinating MPPT operations for a cluster of geographically-associated fluid turbines, consistent with embodiments of the present disclosure. In some embodiments, process 1600 may be performed by at least one processor (e.g., at least one processor 428 and/or processor 512) to perform operations or functions described herein. In some embodiments, some aspects of process 1600 may be implemented as software (e.g., program codes or instructions) that are stored in a memory (e.g., memory 430 and/or memory 514) or a non-transitory computer readable medium. In some embodiments, some aspects of process 1600 may be implemented as hardware (e.g., a specific-purpose circuit). In some embodiments, process 1600 may be implemented as a combination of software and hardware.

Referring to FIG. 16, process 1600 includes a step 1602 of receiving data from the cluster of geographically-associated fluid turbines. By way of a non-limiting example, in FIG. 43, at least one processor 428 may receive data from cluster 401 of geographically-associated fluid turbines 404A-404B. Process 1600 includes a step 1604 of determining changes to total power output of the cluster based on changes in loading states of individual fluid turbines in the cluster. By way of a non-limiting example, in FIG. 4, at least one processor 428 may determine changes to total electric power output 440 of cluster 401 based on changes in loading states of individual fluid turbines 404A-404B in cluster 401. Process 1600 includes a step 1606 of selecting a combination of loading states for the individual fluid turbines in the cluster to coordinate total power output for the cluster. By way of a non-limiting example, in FIG. 4, at least one processor 428 may select a combination of loading states for fluid turbines 404A-404B in cluster 401 to coordinate total electric power output 440 for cluster 401. Process 1600 includes a step 1608 of transmitting the selected combination of loading states to at least some of the individual fluid turbines in the cluster in order to vary rotational speeds of the at least some of the individual fluid turbines in the cluster. By way of a non-limiting example, in FIG. 4, at least one processor 428 may transmit the selected combination of loading states to at least one of individual fluid turbines 404A-404B in cluster 401 in order to vary rotational speeds of at least one of individual fluid turbines 404A-404B in cluster 401.

Fluid turbines arranged in a cluster may be synchronized to exploit output and fluid flow fluctuations from other wind turbines and thereby improve total power output. To achieve this, systems, methods, and computer program products are disclosed to coordinate the cycles of each turbine in a cluster by controlling one or more operating parameters. For example, controlling a load to adjust a rotational velocity of one or more fluid turbines may allow for adjusting a relative phase of the rotational cycles of two or more fluid turbines, which in turn may allow for exploiting fluid-dynamical coupling therebetween. Controllably changing operating parameters of each turbine, may allow at least some turbines to exploit fluid currents and drafts generated by one or more neighboring turbines in the cluster. For example, coordinating blade orientation of an upstream fluid turbines may allow the upstream fluid turbine to exploit at least some draft generated by a downstream fluid turbine, and coordinating blade orientations of two side-by-side fluid turbines may allow each side-by-side fluid turbine to mutually exploit at least some draft generated by each other side-by-side fluid turbine.

Some embodiments involve a system for synchronizing a plurality of geographically-associated fluid turbines. A fluid turbine may include a mechanical device configured to capture energy from a fluid flow, as described elsewhere in this disclosure. A plurality of geographically associated fluid turbines may refer to a cluster of fluid turbines positioned in relative proximity of each other, as described elsewhere in this disclosure. Synchronizing a plurality of geographically-associated fluid turbines may include coordinating, adjusting, and/or tuning one or more operating parameters of one or more of the plurality of geographically-associated fluid turbines to achieve a targeted goal (e.g., an increased total power output). Such operating parameters may be associated, for example, with fluid-dynamical coupling between two or more fluid turbines of the plurality of geographically-associated fluid turbines. Such operating parameters may include, for example, a rotational frequency and/or a phase of a rotational cycle of one or more of the fluid turbines. For example, the synchronization may increase and/or decrease fluid-dynamical coupling, adjust a timing (e.g., start time and stop time) and/or duration of fluid-dynamical coupling, and/or affect any other characteristic of fluid-dynamical coupling between at least two fluid turbines of a plurality of geographically-associated fluid turbines.

By way of a non-limiting example, fluid energy conversion system 400 in FIGS. 4-5, in conjunction with braking circuit 1300 in FIG. 13, collectively show a system for synchronizing a plurality of geographically-associated fluid turbines 404.

Some embodiments involve at least one processor. At least one processor may include a single processor or multiple processors communicatively linked to each other, e.g., to control operations of a plurality of geographically-associated fluid turbines to operate collectively as a single fluid energy conversion system, as described elsewhere in this disclosure.

Some embodiments involve receiving signals indicative of a phase of a rotational cycle of a plurality of rotating blades of a fluid turbine of the plurality of geographically-associated fluid turbines. A signal may refer to information encoded for transmission via a physical medium, as described elsewhere in this disclosure. Receiving signals (e.g., from a sensor) may involve polling periodically for an output signal, and/or receiving a signal, e.g., as a synchronized event and/or an unsynchronized event such as a real-time interrupt event, as described elsewhere in this disclosure. A rotational cycle of a plurality of rotating blades of a fluid turbine may refer to one of a series of repeating revolutions (e.g., complete revolutions of) 360° by a plurality of blades of a fluid turbine spinning in response to a fluid flow. A phase of a rotational cycle may refer to a particular stage or position within a revolution of a series of repeating revolutions. A phase of a rotational cycle may be measured as an angle, e.g., in units of degrees, radians, minutes, and/or seconds. For example, when measured in degrees, a full revolution may correspond to 360°, a quarter of a counter-clockwise revolution may correspond to a 90° phase, and a quarter of a clockwise revolution may correspond to a −90° phase. A blade may refer to an object having a cross-sectional shape with a curved surface configured to cause a rotational motion consistent with a fluid flow incident on the blades, as described elsewhere in this disclosure. A plurality of rotating blades of a fluid turbine may include multiple blades capable of rotating or spinning. A phase of a rotational cycle of a plurality of rotating blades of a fluid turbine may refer to positions of a plurality of blades within a rotational cycle. A phase in a rotational cycle for a plurality of blades may indicate an absolute and/or relative position of each of the blades with respect to one or more other objects, such as a sensor configured with a fluid turbine connected thereto, and/or one or more blades of another fluid turbine. A phase of a rotational cycle together with a rotational speed may allow tracking a distance and/or orientation between any one blade (e.g., or of a particular region on any one blade) and one or more other objects over time. The at least one processor may receive the signals from at least one sensor associated with the fluid turbine.

In some embodiments, at least one processor may receive first signals indicative of a phase of a rotational cycle of a first plurality of rotating blades of a first fluid turbine of the plurality of geographically-associated fluid turbines and receive second signals indicative of a phase of a rotational cycle of a second plurality of rotating blades of a second fluid turbine of the plurality of geographically-associated fluid turbines. For example, a first processor associated with a first fluid turbine may receive first signals from one or more sensors associated with at least one blade of the first fluid turbine and a second sensor associated with a second fluid turbine may receive second signals from one or more sensors associated with at least one blade of the second fluid turbine. The first processor and the second processor may transmit the first and second signals, respectively, to at least one processor configured to synchronize operations of the first and second fluid turbines to operate as an integral fluid energy conversion system.

By way of a non-limiting example, in FIGS. 4-5, for each fluid turbine 404A and 404B, the at least one processor (e.g., each processor 512 dedicated each of fluid turbines 404A and 404B, and/or processor 428 associated with cluster 401) may receive signals from at least one sensor 418A and 418B, respectively. The signals may be indicative of a phase rotational cycle of a plurality of blades (e.g., see blades 206 and 208 in FIG. 2) of each fluid turbine 404A and 404B. For example, the at least one sensor 418 may include rotation sensor 502 for measuring rotational velocity of each fluid turbine 404A and 404B. Rotation sensor 502 may include, for example, an internal measuring unit (e.g., IMU) allowing to track an orientation of each plurality of blades of fluid turbines 404A and 404B over time. The at least one processor may use the tracked orientations of each of the first and second plurality of blades to determine a phase of the rotational cycle, e.g., relative to a stationary object, and/or relative to each other.

In some embodiments, the first plurality of rotating blades is configured to generate a first fluid turbine downstream fluid flow. Downstream may refer to a relative location in a direction of fluid flow, where a fluid may arrive at a downstream location from an upstream location. An object located downstream may encounter a fluid flow after an object located upstream. A downstream fluid flow may refer to a fluid flowing from an upstream location to a downstream location. A fluid turbine downstream fluid flow may refer to a downstream fluid flow beyond the rotating blades of an upstream turbine or caused or generated by the rotating blades of a fluid turbine located upstream of another object (e.g., upstream of another fluid turbine located downstream). For example, the rotating blades of an upstream fluid turbine may generate turbulence and/or a draft that may alter fluid passing beyond the upstream fluid turbine.

Figure 17:
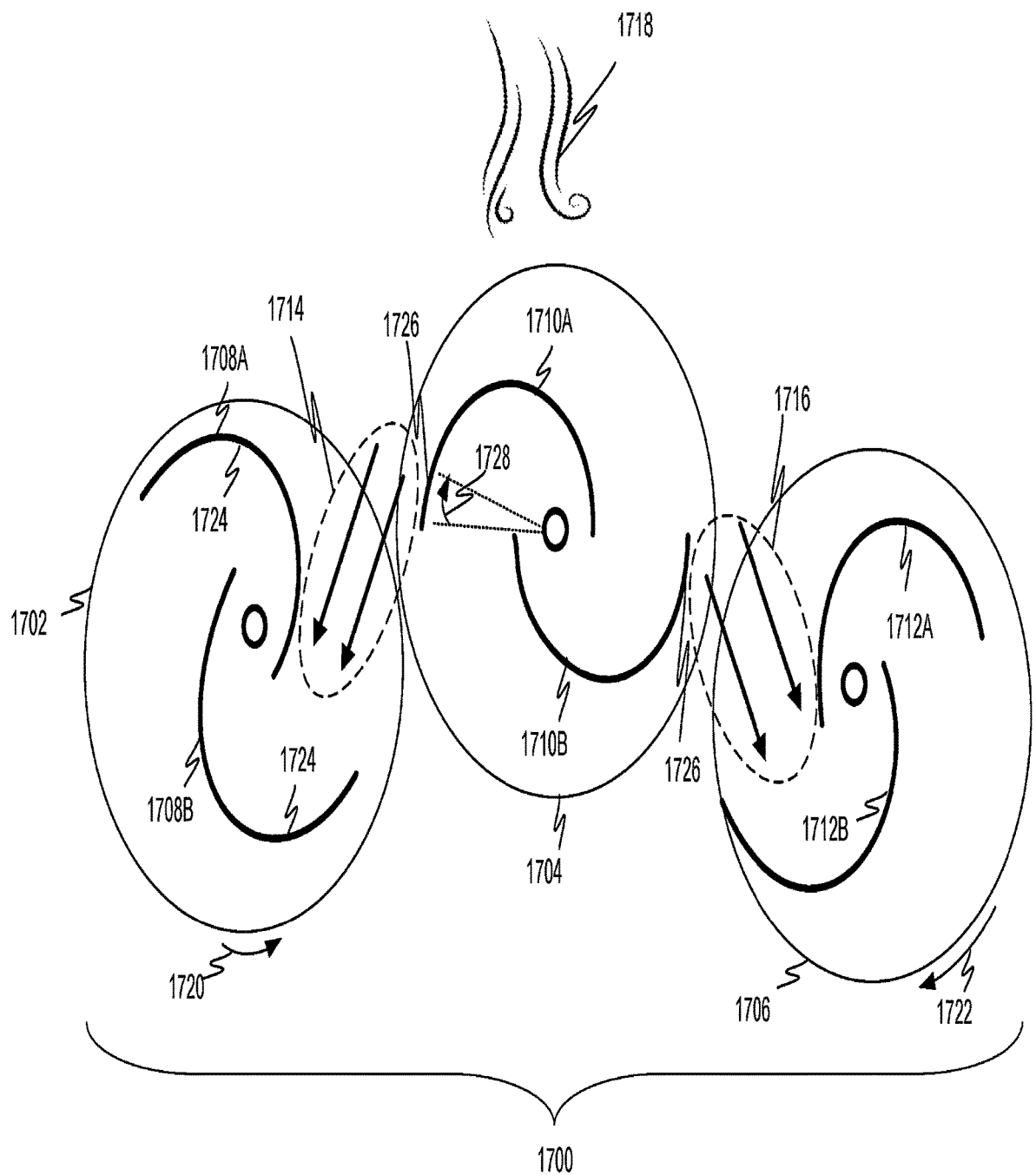
FIG. 17 is a schematic diagram of fluid flows of a plurality of geographically associated fluid turbines, consistent with some embodiments of the present disclosure.

By way of a non-limiting example, reference is made to FIG. 17 illustrating fluid flows of a plurality 1700 of geographically associated fluid turbines 1702, 1704, and 1706, consistent with some embodiments of the present disclosure. Each of fluid turbines 1702, 1704, and 1706 includes plurality of blades 1708A and 1708B, 1710A and 1710B, and 1712A and 1712B, respectively. In some embodiments, fluid turbines 1702, 1704, and 1706 may correspond to fluid turbines 404 (e.g., see FIG. 4). Thus, each of fluid turbines 1702, 1704, and 1706 may be associated with a generator (e.g., generator 406), at least one sensor (e.g., at least one sensor 418) at least one processor (e.g., at least one processor 308, 428, and/or 512) and a charge controller (e.g., charge controller 410). In some embodiments, fluid turbines 1702, 1704, and 1706 may correspond to fluid turbines 100A, 100B, and 100C (e.g., see FIG. 2). Plurality of blades 1710A and 1710B of fluid turbine 1704 may generate fluid turbine downstream fluid flows 1714 and 1716.

In some embodiments, the second plurality of rotating blades is configured to receive at least a portion of the first fluid turbine downstream fluid flow. A plurality of blades configured to receive a fluid flow may refer to blades of a fluid turbine shaped, rotationally phase controlled, and/or oriented to catch or interact with a fluid flow to cause a pressure differential on opposing sides of each blade, causing the plurality of blades to move in a spinning motion. Receiving at least a portion of the fluid turbine downstream flow may refer to catching or interacting with at least some of the turbulence and/or draft generated by fluid turbine located upstream. For example, an ambient fluid flow (e.g., wind or an ocean current) may cause a plurality of blades of an upstream fluid turbine to spin. The spinning motion of the plurality of blades located upstream may generate turbulence and/or a draft (e.g., a fluid turbine downstream fluid flow). A plurality of blades of a fluid turbine located downstream of the upstream fluid turbine may catch or interact with the ambient fluid flow affecting the upstream fluid turbine, and may additionally catch or interact with at least part of the fluid turbine downstream flow generated by the blades located upstream. In other words, fluid-dynamically coupling between the upstream fluid turbine and the downstream fluid turbine may cause the downstream fluid turbine to be affected by the fluid turbine downstream flow generated by the upstream fluid turbine in addition to being affected by the ambient flow fluid. The fluid turbine downstream flow (e.g., fluid-dynamical coupling) may affect characteristic of the rotation of the plurality of blades of the downstream fluid turbine. Such characteristics may include, for example, a rotational speed (e.g., an increase or decrease in rotational speed), a phase of a rotational cycle (e.g., a relative and/or absolute phase), a direction of rotation (e.g., a clockwise or counter-clockwise rotation), a steadiness (e.g., regularity) or unsteadiness (e.g., irregularity) of rotation, a (e.g. regular) or unsteady (e.g., irregular) rotation (e.g., caused by vibration of the plurality of blades of the downstream fluid turbine), and/or any other characteristic of a rotation of a plurality of blades of a fluid turbine.

By way of a non-limiting example, in FIG. 17, plurality of blades 1708A and 1708B of fluid turbine 1702 (e.g., the second plurality of blades of the second fluid turbine) may be located downstream of plurality of blades 1710A and 1710B of fluid turbine 1704 (e.g., the first plurality of blades of the first fluid turbine) relative to an ambient fluid flow 1718 (e.g., atmospheric wind or an ocean current). Plurality of blades 1708A and 1708B of fluid turbine 1702 may receive ambient fluid flow 1718, and may additionally receive at least a portion of fluid turbine downstream fluid flow 1714 (e.g., the first fluid turbine fluid flow) generated by first plurality of blades 1710A and 1710B of first fluid turbine 1704. Similarly, plurality of blades 1712A and 1712B of fluid turbine 1706 may be located downstream of first plurality of blades 1710A and 1710B of first fluid turbine 1704 and may receive ambient fluid flow 1718, as well as at least a portion of fluid turbine downstream fluid flow 1716 generated by first plurality of blades 1710A and 1710B of first fluid turbine 1704.

In some embodiments, the second plurality of rotating blades is configured to generate a differential power output attributable to the at least portion of the first fluid turbine downstream fluid flow. A differential power output may refer to a difference (e.g., a delta) between two different power outputs. A differential power output may be an absolute difference, and may not indicate which of the two power outputs is larger and which is smaller. Attributable may refer to being traced to, caused by, or otherwise associated with, e.g., another source or action. A differential power output attributable to the at least portion of a fluid turbine downstream fluid flow may refer to a (e.g., positive or negative) differential power output of a downstream fluid turbine that may be traced, caused by, or otherwise associated with turbulence and/or a draft generated by an upstream fluid turbine. For example, under an ambient fluid flow, a fluid-dynamically isolated fluid turbine may produce a first power output. Positioning the fluid turbine (e.g., under the same ambient fluid flow) downstream from an upstream fluid turbine to cause fluid-dynamical coupling therebetween may cause the downstream fluid turbine to be affected by at least a portion of a downstream fluid flow generated by the upstream fluid turbine. Consequently, the downstream fluid turbine may produce a second power output, different than the first power output. The difference between the second power output and the first power output may be attributable to the portion of the turbulence of draft generated by the upstream fluid turbine.

By way of a non-limiting example, in FIG. 17, plurality of rotating blades 1708A and 1708B of fluid turbine 1702 (e.g., the second plurality of rotating blades of the second fluid turbine) may generate a differential power output attributable to at least a portion of fluid turbine downstream fluid flow 1714 generated by first plurality of blades 1710A and 1710B of first fluid turbine 1704. Similarly, plurality of rotating blades 1712A and 1712B of fluid turbine 1706 may generate a differential power output attributable to at least a portion of fluid turbine downstream fluid flow 1716 generated by first plurality of blades 1710A and 1710B of first fluid turbine 1704.

Figure 18:
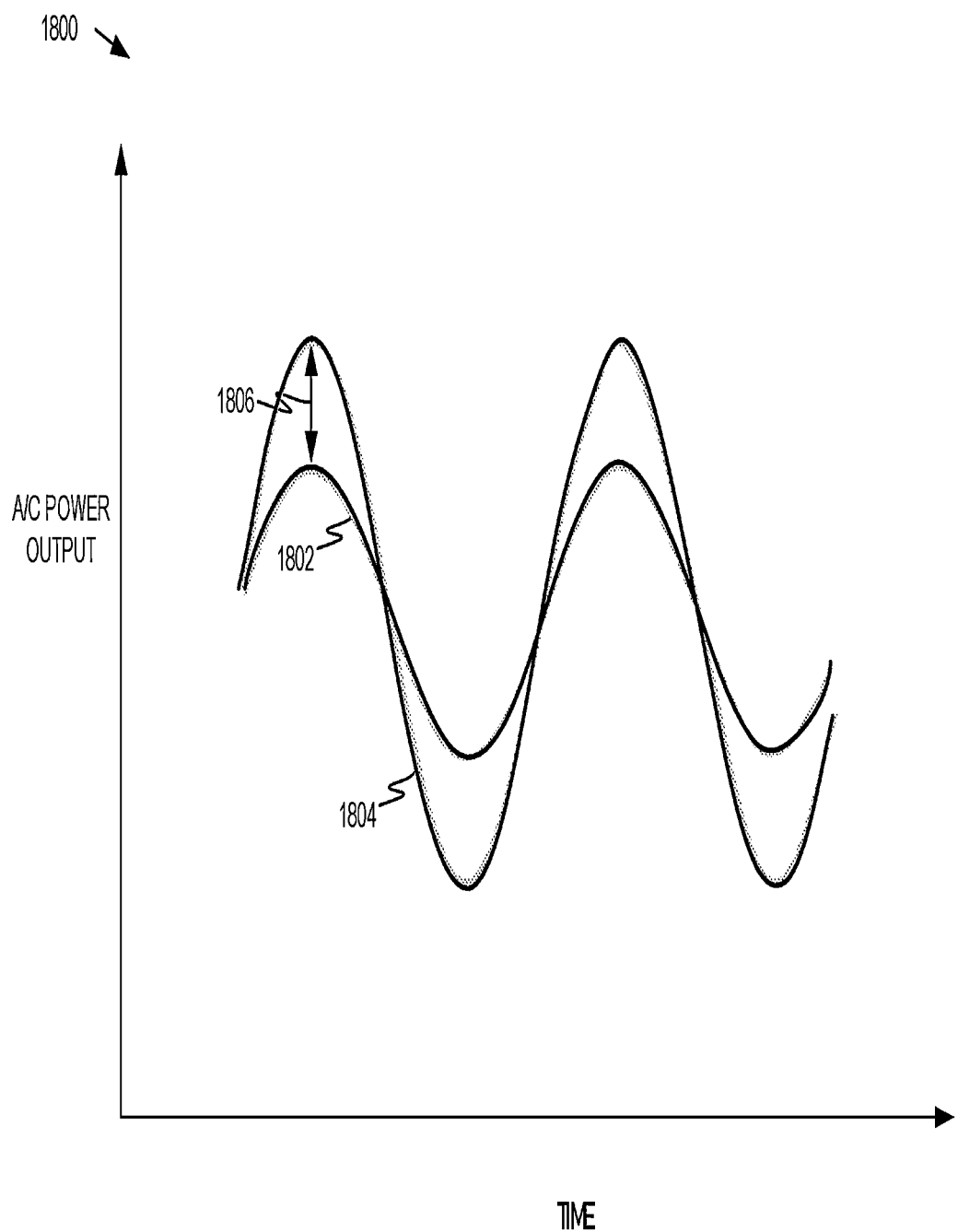
FIG. 18 is an exemplary graph of a cyclical power signals over time, consistent with some embodiments of the present disclosure.

Reference is made to FIG. 18 showing an exemplary graph 1800 of cyclical power outputs 1802 and 1804 over time, consistent with some embodiments of the present disclosure. Power output 1804 may be greater than power output 1802. Power output 1802 may correspond to an AC power output of a generator associated with the second plurality of rotating blades of the second fluid turbine attributable (e.g., solely) to ambient fluid flow 1718. For example, the second plurality of rotating blades of the second fluid turbine may correspond to plurality of blades 1708A and 1708B of fluid turbine 1702 or plurality of blades 1712A and 1712B of fluid turbine 1706. Greater power output 1804 may correspond to an AC power output of the generator associated with the second plurality of rotating blades attributable to ambient fluid flow 1718 and additionally attributable to at least a portion of the first fluid turbine downstream fluid flow (e.g., fluid turbine downstream flow 1714 or 1716) generated by first plurality of blades 1710A and 1710B of first fluid turbine 1704. A differential power output 1806 may be attributable to the at least a portion of the first fluid turbine downstream fluid flow (e.g., fluid turbine downstream flow 1714 or 1716) received by the first plurality of rotating blades (e.g., blades 1708A and 1708B, or blades 1712A and 1712B, respectively). For instance, differential power output 1806 may correspond to difference between the peaks or troughs of (e.g., AC) power output 1802 and greater power output 1804, an average difference between power outputs 1802 and 1804, or any other difference measure between power outputs 1802 and 1804. In some embodiments, power output 1804 may correspond to aggregate AC power output 722 (e.g., see FIGS. 7-11).

In some embodiments, the first fluid turbine is located upstream of the second turbine. Upstream may refer to a relative location in a fluid flow, where a fluid may flow from an upstream location to a downstream location. An object located upstream may encounter a fluid flow prior to an object located downstream. The first fluid turbine may receive the fluid flow before the second fluid turbine. The first fluid turbine may generate the first fluid turbine downstream fluid flow from the received fluid flow, such that the second fluid turbine may receive both the fluid flow and at least a portion of the first fluid turbine downstream fluid flow.

By way of a non-limiting example, first fluid turbine 1704 may be located upstream of fluid turbine 1702 and fluid turbine 1706 relative to fluid flow 1718.

In some embodiments, the plurality of geographically-associated fluid turbines are wind turbines and the fluid is flowing air. A wind turbine may include a fluid turbine configured to convert wind (e.g., an air flow) to electric energy via a generator connected thereto. Flowing air may refer to a current of air (e.g., a movement of air) from one location to another. Flowing air may be associated with a direction indicating a trajectory of motion.

In some embodiments, the plurality of geographically-associated fluid turbines are water turbines and the fluid is flowing water. A water turbine may include a fluid turbine configured to convert a water flow to electric energy via a generator connected thereto. Flowing water may include an ocean current, a river current, a water fall, and/or any other movement of water from one location to another. Flowing water may be associated with a direction indicating a trajectory of motion.

In some embodiments, rotational axes of the first fluid turbine and the second fluid turbine are substantially vertical. In some embodiments, rotational axes of the first fluid turbine and the second fluid turbine are substantially horizontal. A rotational axis of a fluid turbine may be defined by a shaft, rod, or line around which rotating elements of a fluid turbine revolve. Vertical may refer to substantially perpendicular to the ground and/or a fluid flow. A vertical fluid turbine (e.g., VAWT) may refer to a fluid turbine where an axis of rotation for the turbine blades may be substantially perpendicular to the ground and/or a fluid flow. Horizontal may refer to parallel to a fluid flow, and/or the ground. A horizontal fluid turbine (e.g., HAWT) may refer to a fluid turbine where an axis of rotation for the turbine blades may be substantially parallel to the ground and/or a fluid flow.

In some embodiments, each blade of the first plurality of blades and the second plurality of blades is a lift blade. A lift blade may refer to a blade having a configured to generate lift, for example, by having a curved surface for generating lower fluid pressure from a fluid flow, and an opposing flatter surface for generating higher fluid pressure from the fluid flow. The pressure difference may cause a lifting force perpendicular to the direction of the fluid flow.

By way of a non-limiting example, plurality 1700 of fluid turbines 1702, 1704, and 1706 may be wind turbines (e.g., see fluid turbines 100, 102, and 106 to 112 in FIG. 1) and fluid flow 1718 may be flowing air (e.g., wind). Alternatively, plurality 1700 of fluid turbines 1702, 1704, and 1706 may be water turbines (e.g., see fluid turbine 104) and fluid flow 1718 may be flowing water (e.g., an ocean or river current). In some embodiments, at least some of plurality 1700 of fluid turbines 1702, 1704, and 1706 may be vertical fluid turbines (e.g., see vertical axis fluid turbines 100 and 106 to 112). Alternatively, at least some of plurality 1700 of fluid turbines 1702, 1704, and 1706 may be horizontal fluid turbines (e.g., see horizontal fluid turbine 102). In some embodiments, each of blade of first plurality of blades 1710A and 1710B and each blade of plurality of blades 1708A and 1708B (e.g., the second plurality of blades) may be a lift blade. Similarly, each blade of plurality of blades 1712A and 1712B may be a lift blade.

In some embodiments, the first fluid turbine and the second fluid turbine are similarly shaped. Similarly shaped may refer to having substantially the same dimensions, design, and/or relative arrangement of the component parts. For example, the first and second fluid turbines may both be vertical-axis fluid turbines, or may both be horizontal-axis turbines. As another example, the first and second fluid turbines may have the same number of rotating blades, each rotating blade having a substantially similar airfoil shape.

By way of a non-limiting example, in FIG. 3, each of fluid turbines 100A, 100B, and 100C may be similarly shaped.

In some embodiments, the first signals and second signals are image signals received from at least one image sensor. Image signals may include electronic signals associated with data formatted according to a protocol associated with image or video data (e.g., JPEG, PNG, MP5). An image sensor may refer to device that captures and converts light into an electronic signal. Non-limiting examples of image sensors include cameras, CODs, CMOSs, CIDs, InGaAs's, rolling shutters, and global shutters) Image sensors may operate in the visible and/or IR spectrum. An image sensor may convert an image formed on an image sensor plane to image signals for transmitting to at least one processor. The at least one image sensor may be stationary (e.g., being affixed to a generator associated with the plurality of rotating blades) and/or may rotate (e.g., being affixed to one or the blades or a rotatable shaft connected thereto). The at least one image sensor may capture a sequence of images over a time period of the plurality of rotating blades, for example relative to one or more additional objects (e.g., stationary objects such as generator connected thereto and/or rotating objects such as another plurality of rotating blades). The at least one processor may analyze the image signals received from the at least one image sensor to determine a phase of a rotational cycle of a plurality of blades (e.g., using one or more image processing techniques, such as edge detection, object recognition, convolutions, Fourier transforms, and/or any other image processing technique), where the phase may be relative to the one or more objects captured in the image signals. Additionally or alternatively, the at least one image sensor may be associated with a magnetometer (e.g., a compass) allowing the at least one processor to determine a phase of a rotational cycle of the plurality of blades based on the image signals together with signals from the magnetometer.

By way of a non-limiting example, in FIGS. 4-5, the at least one processor (e.g., at least one processor 308, 428 and/or 512) may receive image signals from at least one image sensor 524 associated with each of fluid turbines 404A and 404B.

Figure 19:
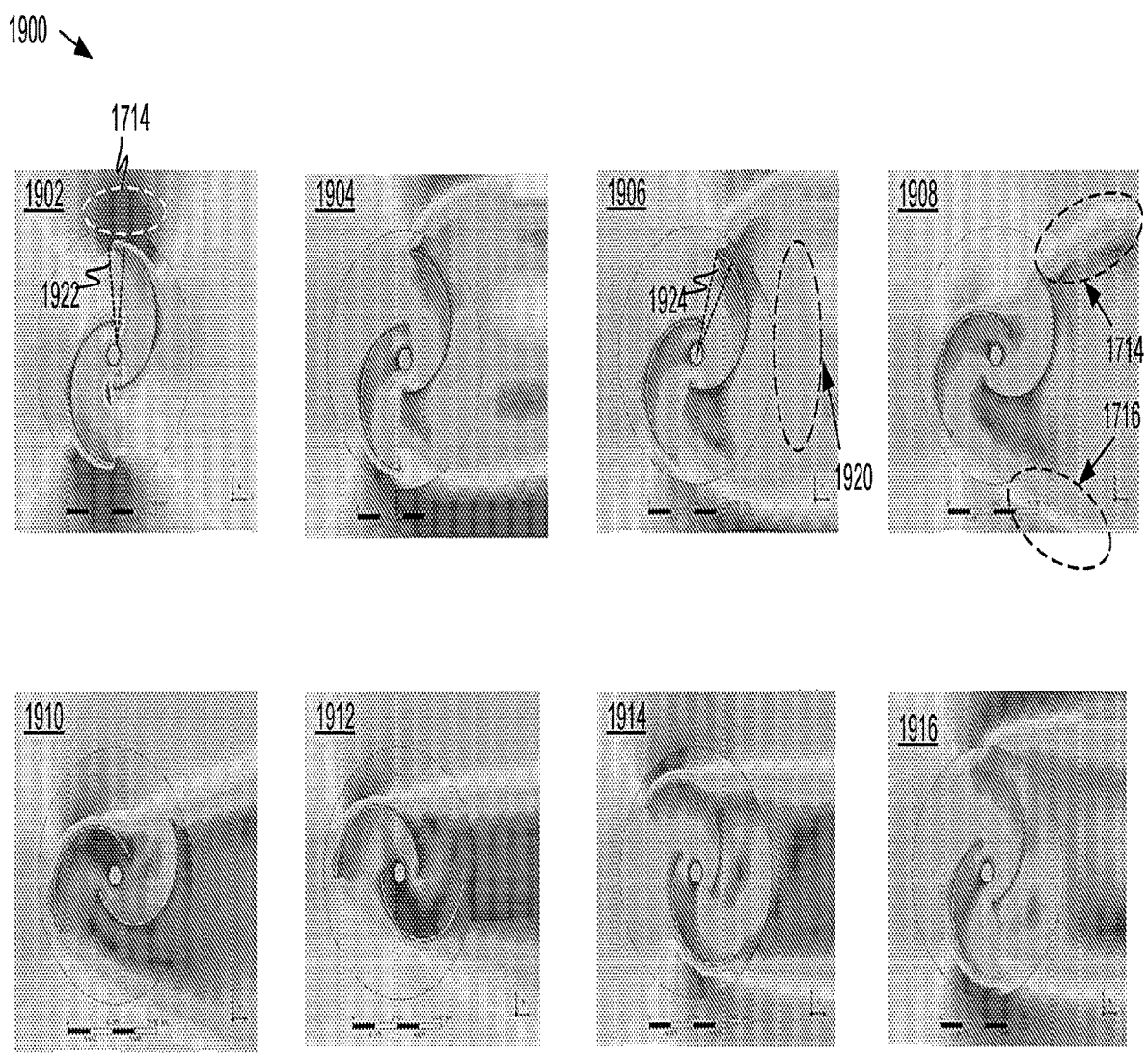
FIG. 19 shows a sequence of images signals of a plurality of blades of a fluid turbine rotating over a time period, consistent with some embodiments of the present disclosure.

By way of another non-limiting example, reference is made to FIG. 19 showing a sequence 1900 of image signals 1902 to 1916 (e.g., images) of a plurality of blades of a fluid turbine rotating over a time period, consistent with some embodiments of the present disclosure. Image signals 1902 to 1916 may be acquired by at least one image sensor 524. The fluid turbine depicted in image signals 1902 to 1916 may correspond any of fluid turbines 100A-100C, fluid turbines 404, and/or fluid turbines 1702, 1704, and 1706. The rotation of the plurality of blades depicted in image signals 1902 to 1916 over time may be clockwise and may produce cyclical power outputs 1802 and/or 1804. From left to right, top to bottom, the at least one processor (e.g., at least one processor 308, 512 and/or 428) may determine from image signals 1902 to 1916 a rotational phase for the plurality of blades depicted therein, beginning from 0° (e.g., image signal 1902), and increasing over time to 10° (e.g., image signal 1904), 30° (e.g., image signal 1906), 45° (e.g., image signal 1908), 60° (e.g., image signal 1910), 90° (e.g., image signal 1912), 135° (e.g., image signal 1914), and to 155° (e.g., image signal 1916). Upon reaching a full revolution (e.g., a phase of 360°), the at least one processor may reset the phase to 0° and repeat the process. The at least one processor may receive a version of sequence 1900 for each fluid turbine of the plurality of fluid turbines. For example, the at least one processor may receive a version of sequence 1900 for each of fluid turbines 1702, 1704, and 1706, allowing the at least one processor to analyze each version of sequence 1900 to determine a phase of a rotational cycle for each of fluid turbines 1702, 1704, and 1706, and to determine a relative phase shift therebetween.

Some embodiments involve determining from the first signals and the second signals that greater aggregate power output is achievable through blade phase coordination. Blade phase coordination may include one or more of adjusting, aligning, and/or arranging a (e.g., relative) phase of rotational cycles of the blades of at least two fluid turbines to cause the at least two fluid turbines to operate in a cooperative manner (e.g., as an integral fluid energy conversion system). Blade phase coordination may be achieved, for example, by decelerating and/or accelerating a rotational speed of at least one of the at least two fluid turbines for at least a limited period of time. Blade phase coordination between a first plurality of blades and a second plurality of blades (e.g., rotating at substantially similar rotational velocities) may allow maintaining a targeted distance and/or orientation between at least one blade (e.g., or a specific region on at least one blade) of the first plurality of blades and at least one blade (e.g., or a specific region on at least one blade) of the second plurality of blades over time. An aggregate power output (e.g., aggregate power signal) may refer to a power signal outputted (e.g., produced) by combining multiple electrical power signals originating from different power sources (e.g., generators) into a single, merged power signal. For example, an aggregate power output may be produced by converting multiple AC power outputs from multiple fluid turbines to multiple DC power signals, combining the multiple DC power signals to an aggregate DC power output, and optionally converting the aggregate DC power output to an aggregate AC power output using an inverter. A greater aggregate power output may include an increased aggregate power output, a targeted power output value (e.g., a minimum power output value), a targeted range of a power output, a statistical measure of targeted power output over time (e.g., a mean, mode, and/or standard deviation of an aggregate power output over time period), and/or any other measure of an aggregate power output that is greater than an aggregate power output achieved, e.g., prior to implementing a phase correction. Achievable (e.g., to achieve) may include attainable, feasible, and/or capable of being implemented to realize a targeted result. Determining from signals that greater aggregate power output is achievable through blade phase coordination may include using the received signals to perform one or more or measurements, comparisons, simulations, estimations, and/or calculations indicating a greater aggregate power output and/or a potential greater aggregate power output is achievable. For example, the at least one processor may apply a blade phase coordination to the plurality of geographically-associated fluid turbines and measure an aggregate power outputted by the plurality of geographically-associated fluid turbines subject to the blade phase coordination. The at least one processor may compare the measured aggregate power outputted under the blade phase coordination to an aggregate power outputted by the plurality of geographically-associated fluid turbines prior to applying the blade phase coordination. Based on the comparison, the at least one processor may determine if greater aggregate power is achievable via the blade phase coordination. In some embodiments, the at least one processor may apply a series of differing blade phase coordinations to the plurality of geographically-associated fluid turbines and make a series of measurements of differing aggregate power outputted under each differing blade phase coordination, followed by a series of comparisons (e.g., in an iterative manner) to determine a particular blade phase coordination associated with a maximum (e.g., or near maximum) aggregate power output. In some embodiments, the at least one processor may simulate an application of one or more blade phase coordinations on the plurality of geographically-associated fluid turbines and calculate one or more potential aggregate power outputs attributable to simulated blade phase coordinations to determine if greater aggregate power is achievable by applying one or more of the simulated blade phase coordinations to the plurality of geographically-associated fluid turbines. In some embodiments, the at least one processor may use one or more charts comparing power output to rotational speed (e.g., see FIG. 12) associated with one or more of the plurality of geographically-associated fluid turbines to calculate one or more potential aggregate power outputs attributable to one or more simulated blade phase coordinations.

By way of a non-limiting example, in FIGS. 17 and 18, the at least one processor (e.g., at least one processor 308, 512, and/or 428) may determine from the first signals and the second signals that greater aggregate power output is achievable through blade phase coordination. For example, referring to FIG. 19, the at least one processor may identify one or more fluid turbine downstream fluid flows 1714 and 1716 greater than one or more lesser fluid turbine downstream fluid flows 1920 generated by first fluid turbine 1704. The at least one processor may determine that the phase of downstream fluid turbine 1702 causes plurality of blades 1708A and 1708B to catch a small portion (e.g., or none) of fluid turbine downstream fluid flow 1714 and instead, catch a greater portion of the lesser fluid turbine downstream fluid flows 1920. Similarly, the phase of downstream fluid turbine 1706 may cause plurality of blades 1712A and 1712B to catch a small portion (e.g., or none) of fluid turbine downstream fluid flow 1716 and instead, catch a greater portion of lesser fluid turbine downstream fluid flows 1920. The at least one processor may determine that blade phase coordination may allow positioning and/or orienting plurality of blades 1708A and 1708B relative to plurality of blades 1710A and 1710B such that plurality of blades 1708A and 1708B catch a greater portion of greater fluid turbine downstream fluid flow 1714. Similarly, the at least one processor may calculate a blade phase coordination for plurality of blades 1712A and 1712B. The at least one processor may determine that allowing plurality of blades 1708A and 1708B and plurality of blades 1712A and 1712B to catch the greater portion of fluid turbine downstream fluid flows 1714 and 1716, respectively (e.g., via the blade phase coordination) may cause plurality 1700 of geographically-associated fluid turbines to achieve a greater aggregate power output.

Figure 20:
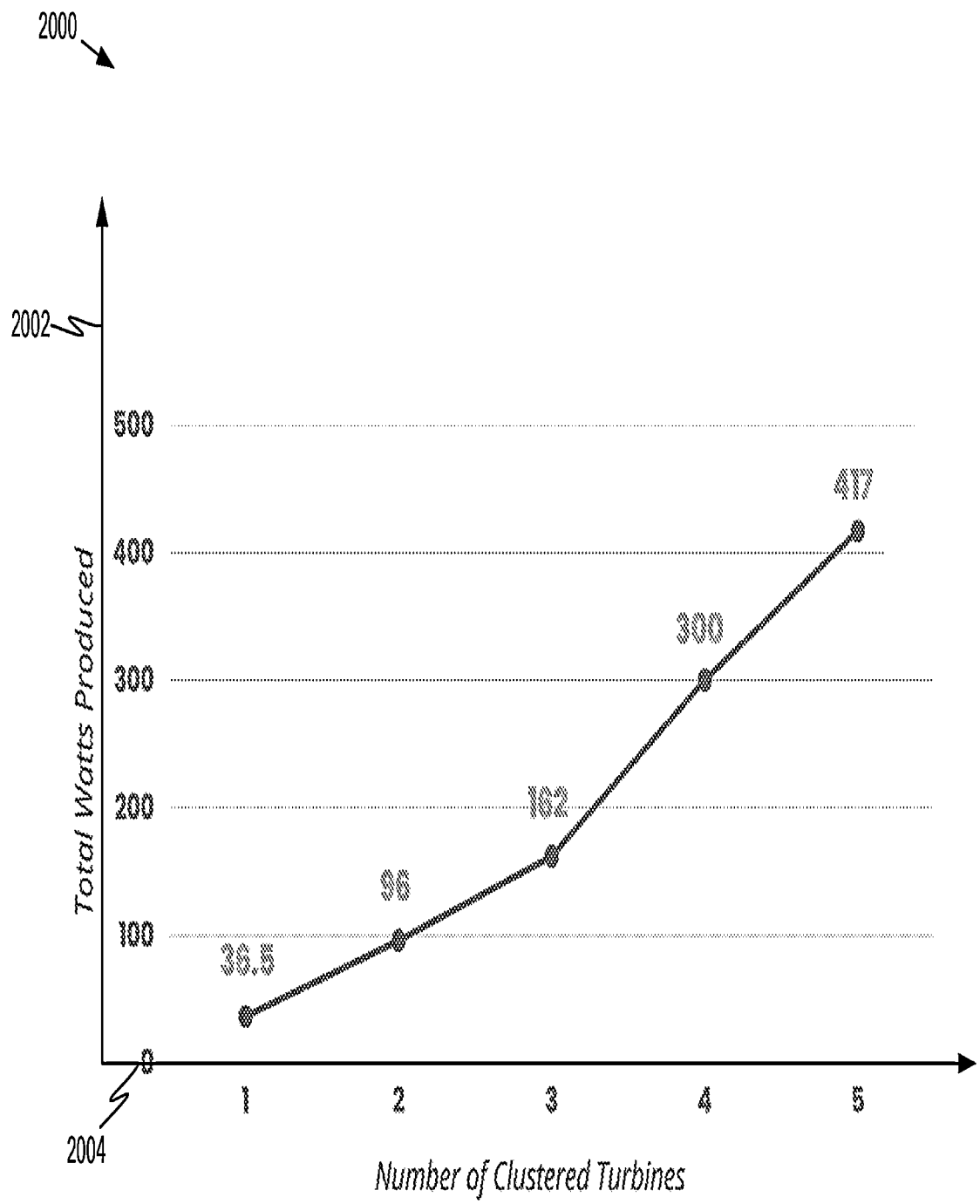
FIG. 20 is a chart of aggregate power output relative to a number of fluid turbines included in a plurality of geographically-associated fluid turbines, consistent with some embodiments of the present disclosure.

Reference is made to FIG. 20 showing a chart 2000 of aggregate power output 2002 relative to a number of fluid turbines 2004 included in a plurality of geographically-associated fluid turbines, consistent with some embodiments of the present disclosure. Chart 2000 shows that aggregate power output 2002 may increase non-linearly as the number of fluid turbines 2004 increases linearly (e.g., beyond three fluid turbines). The non-linear increase may be attributable to fluid-dynamical coupling between the greater than three individual fluid turbines in the cluster, which may be tuned or adjusted via blade phase coordination. For example, a single fluid turbine (e.g., operating independently) may produce an power output of 36.5 Watts, whereas a cluster of five geographically-associated fluid turbines may produce an aggregate output of 417 Watts, leading to an increase in aggregate power of 128%. The increase in aggregate power may be attributable to fluid-dynamical coupling and blade phase coordination between individual fluid turbines in the cluster.

Figure 21:
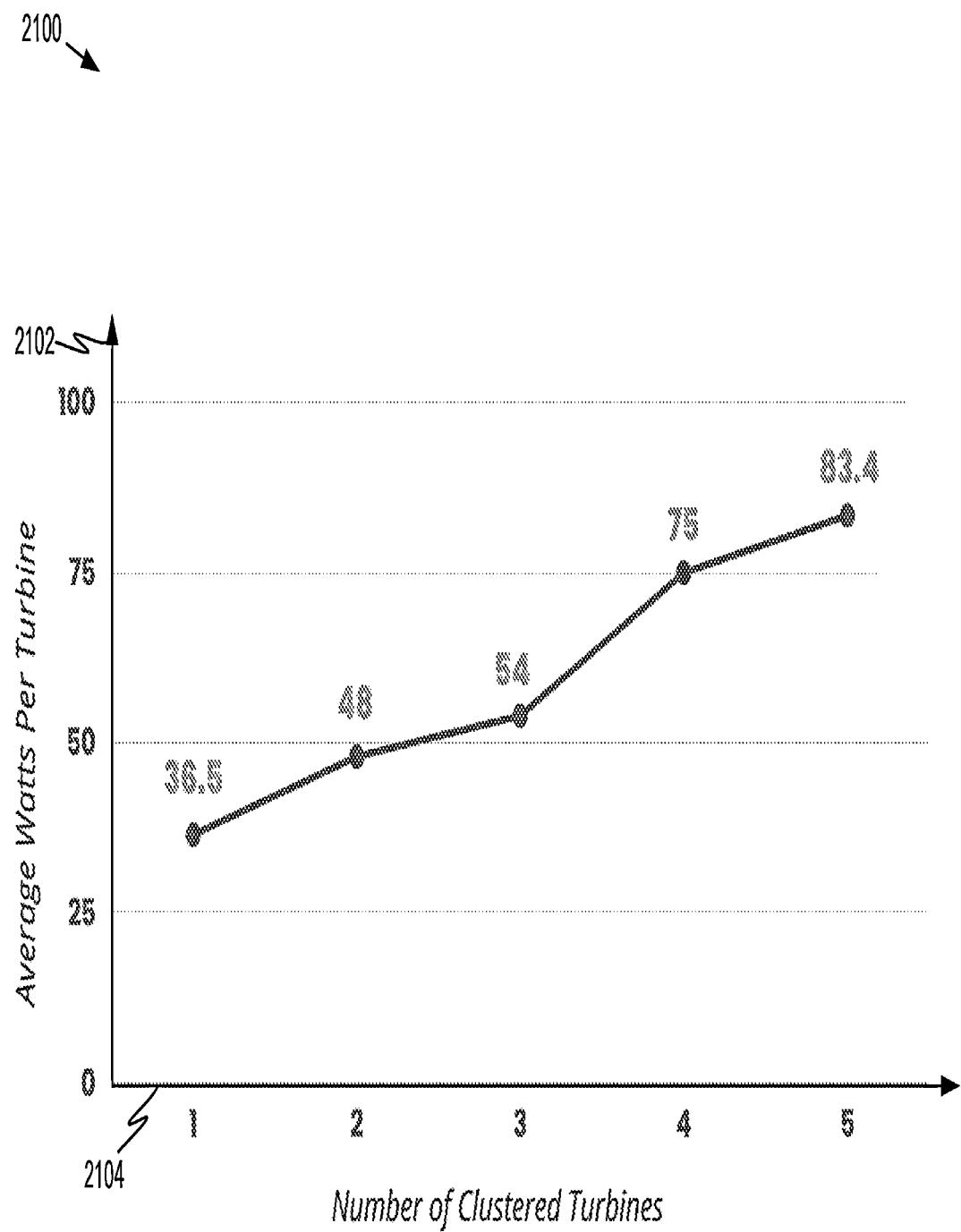
FIG. 21 is a is of average power output relative to a number of fluid turbines included in a plurality of geographically-associated fluid turbines, consistent with some embodiments of the present disclosure.

Reference is made to FIG. 21 showing a chart 2100 of average power output 2002 relative to a number of fluid turbines 2004 included in a plurality of geographically-associated fluid turbines, consistent with some embodiments of the present disclosure. Chart 2100 shows that average power output 2102 may increase non-linearly as the number of fluid turbines 2104 increases linearly (e.g., beyond three fluid turbines). The non-linear increase may be attributable to fluid-dynamical coupling between the greater than three individual fluid turbines in the cluster, which may be tuned or adjusted via blade phase coordination. For example, a single fluid turbine (e.g., operating independently) may produce an average power output of 36.5 Watts, whereas a cluster of five geographically-associated fluid turbines may produce an aggregate output of 83.4 Watts, leading to an increase in aggregate power of 128%. The increase in aggregate power may be attributable to fluid-dynamical coupling and blade phase coordination between individual fluid turbines in the cluster.

Some embodiments involve determining a phase correction between the first plurality of rotating blades and the second plurality of rotating blades based on the first signals and the second signals, in order to achieve the greater aggregate power output. A phase correction between the first plurality of rotating blades and the second plurality of rotating blades may refer to an adjustment or modification of a relative phase between the first plurality of rotating blades and the second plurality of rotating blades to cause a corrected relative phase therebetween. For example, prior to a phase correction, a relative phase between a first plurality of rotating blades and a second plurality of rotating blades may be 45°. A phase correction of 15° (e.g., counter-clockwise) may change the relative phase between the first plurality of rotating blades and the second plurality of rotating blades to 60°, whereas a phase correction of −15° (e.g., clockwise) may change the relative phase between the first plurality of rotating blades and the second plurality of rotating blades to 30°. Implementing a phase correction may involve adjusting a rotational speed of at least one of the fluid turbines (e.g., for a limited time period). For example, if the first and second fluid turbines are rotating at substantially the same rotational speed, the at least one processor may cause the rotational speed of at least one of the fluid turbines to decelerate and/or accelerate until a targeted phase is achieved between the first plurality of rotating blades and the second plurality of rotating blades. Ceasing the deceleration and/or acceleration of the at least one of the fluid turbines may allow the first and second plurality of rotating blades to resume rotation at substantially the same rotational speed, thereby maintaining the corrected phase therebetween. In some embodiments, implementing a phase correction may involve adjusting a rotational speed of at least one of the fluid turbines for an extended period of time. For example, if the first and second fluid turbines are rotating at substantially different rotational speeds, after implementing a phase correction, the at least one processor may continually accelerate and/or decelerate at least one of the fluid turbines to cause the first plurality of blades and second plurality of blades to rotate at substantially the same rotational speed, to maintain the phase correction over time. Achieving a greater aggregate power output may refer to realizing or attaining an increase (e.g., a targeted increase) in aggregate power output. In some embodiments, achieving a greater aggregate power output may include exploiting or diminishing (e.g., suppressing) an effect of fluid-dynamical coupling between the first plurality of rotating blades and the second plurality of rotating blades via the phase correction. For instance, if the differential power output attributable to the portion of the first fluid turbine downstream fluid flow is positive, a phase correction configured to exploit fluid-dynamical coupling between the first and second pluralities of rotating blades may facilitate in achieving a greater aggregate power output. Alternatively, if the differential power output attributable to the portion of the first fluid turbine downstream fluid flow is negative, a phase correction configured to suppress at least some of the fluid-dynamical coupling between the first and second pluralities of rotating blades may facilitate in achieving a greater aggregate power output.

By way of a non-limiting example, in FIG. 17, the at least one processor (e.g., at least one processor 308, 428, and/or 512) may determine a phase correction 1720 between first plurality of rotating blades 1710A and 1710B and second plurality of rotating blades 1708A and 1708B based on the first signals and the second signals, in order to achieve a greater aggregate power output, e.g., including greater power output 1804 instead of power output 1802. For example, temporarily slowing and/or increasing a rotational speed of first plurality of rotating blades 1710A and 1710B and/or second plurality of rotating blades 1708A and 1708B to introduce phase correction 1720 may allow second plurality of rotating blades 1708A and 1708B to catch a larger portion of fluid turbine downstream fluid flow 1714 and a smaller portion of the lesser fluid turbine downstream fluid flows 1920. Catching the larger portion of fluid turbine downstream fluid flow 1714 may allow a rotational velocity of second fluid turbine 1702 to increase and/or to comply with an MPPT protocol, thereby achieving a greater aggregate power output (e.g., aggregate power output 440 of FIG. 4, or aggregate AC power output 722 and/or aggregate DC power output 724 of FIGS. 7 to 11). For example, phase correction 1720 may correspond to a relative phase shift of 10° (e.g., in a counter-clockwise direction). In a similar manner the at least one processor may calculate a blade phase coordination 1722 for fluid turbine 1706 (e.g., corresponding to a relative clockwise phase shift of −20°).

Some embodiments involve calculating coordinating signals based on the determined phase correction. Calculating coordinating signals may include performing one or more mathematical and/or logical operations to determine signals configured to promote, engender, or otherwise bring about coordinated operation of two or more fluid turbines. Calculating coordinating signals based on a phase correction may include calculating coordinating signals configured to implement the phase correction, e.g., by subjecting a load onto one or more generator associated with the first fluid turbine and/or the second fluid turbine. The load may (e.g., temporarily) adjust a rotational velocity of the first fluid turbine and/or the second fluid turbine to impose the phase correction therebetween.

By way of a non-limiting example, in FIG. 17, the at least one processor (e.g., at least one processor 308, 428, and/or 512) may calculate coordinating signals based on determine phase corrections 1720 and 1722. For example, the coordinating signals may correspond to temporarily increasing and/or decreasing load on fluid turbines 1702 and 1706.

Some embodiments involve outputting the coordinating signals to impose the phase correction and thereby achieve the greater aggregate power output. Outputting coordinating signals to impose the phase correction may include transmitting one or more electronic signals configured to cause the phase correction between the first plurality of rotating blades and the second plurality of rotating blade. The at least one processor may transmit the coordinating signals to a braking system (e.g., a mechanical and/or electronic braking system) using one or more wire and/or wireless communication links. For example, the at least one processor may transmit coordinating signals indicating a load (e.g., a positive or negative load) to one or more charge controller associated with the first plurality of blades and/or the second plurality of blades. The at least one charge controller may adjust a load associated with the first plurality of blades and/or the second plurality of blades in accordance with the coordinating signals, e.g., using an electronic braking system.

By way of a non-limiting example, in FIGS. 13 and 17, the at least one processor (e.g., at least one processor 428 and/or 512) may output coordinating signals via braking circuit 1300. For example, each of fluid turbines 1702, 1704, and 1706 may be associated with a version of braking circuit 1300. The version of braking circuit 1300 associated with fluid turbine 1702 may impose phase correction 1720 and the version of braking circuit 1300 associate with fluid turbine 1706 may impose phase correction 1722.

In some embodiments, the at least one processor is further configured to receive third signals indicative of a phase of a rotational cycle of a third plurality of rotating blades of a third fluid turbine of the plurality of geographically-associated fluid turbines, wherein the third plurality of rotating blades is configured to generate a third fluid turbine downstream fluid flow; receive fourth signals indicative of a phase of a rotational cycle of a fourth plurality of rotating blades of a fourth fluid turbine of the plurality of geographically-associated fluid turbines, wherein the fourth plurality of rotating blades is configured to receive at least a portion of the third fluid turbine downstream fluid flow and generate a differential power output attributable to the at least portion of the third fluid turbine downstream fluid flow, wherein calculating coordinating signals is additionally based on the third signals and the fourth signals, the coordinating signals being further configured to impose an additional phase correction between the third plurality of rotating blades and the fourth plurality of rotating blades in order to achieve the greater aggregate power output, and wherein outputting the coordinating signals is further configured to impose the additional phase correction and thereby achieve the greater aggregate power output. For example, receiving, calculating and outputting for the third and fourth fluid turbines may include performing substantially similar functions described elsewhere in this disclosure with respect to the first and second fluid turbines.

Figure 22:
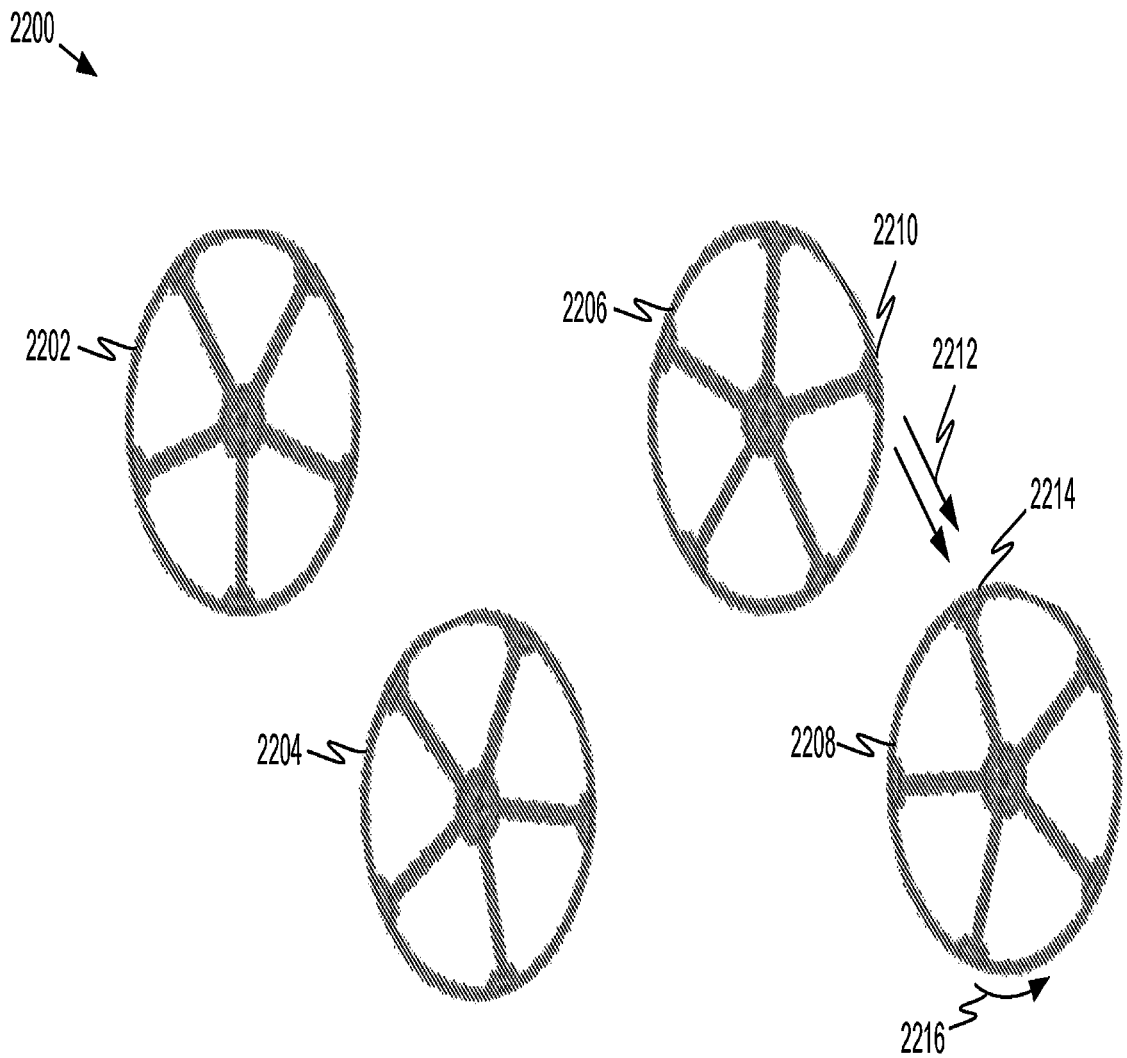
FIG. 22 is a schematic diagram of an exemplary cluster of fluid turbines, consistent with some embodiments of the present disclosure.

By way of a non-limiting example, reference is made to FIG. 22 showing a schematic diagram of an exemplary cluster 2200 of fluid turbines, consistent with some embodiments of the present disclosure. Cluster 2200 includes at least four geographically-associated fluid turbines 2202, 2204, 2206, and 2208 (e.g., each corresponding to any of fluid turbines 404 and/or fluid turbines 1702, 1704, and 1706). Thus each of fluid turbines 2202, 2204, 2206, and 2208 may be associated with a generator (e.g., generator 406), at least one sensor (e.g., at least one sensor 418) at least one processor (e.g., at least one processor 308, 428, and/or 512) and a charge controller (e.g., charge controller 410). Fluid turbines 2202 and 2204 may correspond to the first and second fluid turbines, respectively, and fluid turbines 2206 and 2208 may correspond to a third and fourth fluid turbine, respectively. The at least one processor may receive third signals (e.g., see image signals 1900 in FIG. 19) indicative of a phase of a rotational cycle of a third plurality of rotating blades 2210. Third plurality of rotating blades 2210 may generate a third fluid turbine downstream fluid flow 2212. The at least one processor may receive fourth signals (e.g., see image signals 1900 in FIG. 19) indicative of a phase of a rotational cycle of a fourth plurality of rotating blades 2214 of fourth fluid turbine 2208 of plurality of geographically-associated fluid turbines 2200. Fourth plurality of rotating blades 2214 may receive at least a portion of third fluid turbine downstream fluid flow 2212 and generate a differential power output (e.g., see differential power output 1806 of FIG. 18) attributable to the at least portion of the third fluid turbine downstream fluid flow 2212.

The at least one processor may additionally calculate the coordinating signals based on the third signals and the fourth signals. The coordinating signals may impose an additional phase correction 2216 between third plurality of rotating blades 2210 and fourth plurality of rotating blades 2214 to achieve the greater aggregate power output. Outputting the coordinating signals may impose additional phase correction 2216 and thereby achieve the greater aggregate power output.

In some embodiments, the coordinating signals are configured to generate a load for slowing rotation of at least one of the first plurality of blades and the second plurality of blades for a limited period of time, thereby imposing the first phase correction between the first plurality of blades and the second plurality of blades. A load (e.g., an electrical load) may refer to an impedance or resistance. Such a load may be imposed on an electrical generator (e.g., and a fluid turbine connected thereto) causing rotation of the electrical generator and/or a fluid turbine connected thereto to slow. Generating a load may involve drawing away at least some electrical energy produced by a generator to an energy sink. Drawing away more electrical energy (e.g., increasing a load) may increase an impedance causing a rotational velocity of the fluid turbine to slow down. Drawing away less electrical energy (e.g., decreasing the load) may reduce an impedance cause a rotational velocity of the fluid turbine to increase. Coordinating signals configured to generate a load for slowing a rotation of a plurality of blades (e.g., of a fluid turbine) may include electronic signals (e.g., transmitted by at least one processor) instructing an electronic braking system and/or a charge controller to divert (e.g., or increase an amount of diverted) electrical energy produced by the rotation of the plurality of blades to an energy sink. Diverting the electrical energy may introduce an impedance that may cause rotation of the plurality of blades to slow. A limited period of time may refer to a time duration that is bounded or restricted. Generating a load for slowing a plurality of blades for a limited period of time may involve introducing a load by diverting electrical energy produced by a generator connected to the plurality of blades, and removing the load once the limited period of time terminates, e.g., by ceasing the diverting of electrical energy. Generating a load for slowing a plurality of blades for a limited period of time may temporarily slow rotation of the plurality of blades to introduce a phase shift relative to another plurality of blades. Removing the load when the limited time period terminates may allow the plurality of blades to resume a prior rotational velocity (e.g., prior to generating the load) to maintain the phase shift between the first and second plurality of blades.

In some embodiments, the coordinating signals are configured to alter application of the load to at least one generator connected to at least one of the first fluid turbine and the second fluid turbine. Altering application of a load to a generator may include to changing, adjusting, tuning, and/or otherwise modifying a load imposed on a generator, for example by modifying a level of power diverted from a generator, modifying an impedance imposed on a generator, and/or using any other technique to adjust a load imposed on a generator. Modifying application of a load to a generator may cause a corresponding modification to a rotational velocity of a rotor of the generator. Increasing a load applied to a generator may cause the rotational velocity, and decreasing the load may cause the rotational velocity to increase. Increasing or decreasing a rotational velocity of a generator may cause a corresponding increase or decrease to a rotational velocity of a fluid turbine connected thereto.

By way of a non-limiting example, in FIG. 17, the at least one processor (e.g., at least one processor 308, 428, and/or 512) may calculate the coordinating signals to generate a load for slowing rotation of at least one of first plurality of blades 1710A and 1710B and second plurality of blades 1708A and 1708B for a limited period of time. For example, the at least one processor may transmit the coordinating signals to a charge controller (e.g., see charge controller 410 in FIG. 4) associated with each of first plurality of blades 1710A and 1710B and second plurality of blades 1708A and 1708B. The coordinating signals may impose first phase correction 1720 between first plurality of blades 1710A and 1710B and second plurality of blades 1708A and 1708B. In some embodiments, the coordinating signals may alter application of the load to a generator (e.g., generator 406) connected to at least one of first fluid turbine 1704 and second fluid turbine 1706. For example, the coordinating signals may increase or decrease the load, change a start or finish time for applying the load, extend or contract a duration for applying the load, and/or introduce any other alteration to the load.

In some embodiments, the coordinating signals are configured to reduce a load and thereby accelerate rotation of at least one of the first plurality of blades and the second plurality of blades for a limited period of time, thereby imposing the first phase correction between the first plurality of blades and the second plurality of blades. To reduce a load (e.g., on a generator and/or a fluid turbine connected thereto) may involve lessening an impedance imposed thereon, e.g., by lessening an amount of energy diverted away to an energy sink. Reducing a load may cause a rotational speed of a generator and/or a fluid turbine connected thereto to increase. Accelerate rotation of a plurality of blades may include increasing a rotational speed of a plurality of blades, for example by reducing a load imposed on a generator connected thereto. Reducing a load to accelerate rotation of a plurality of blades for a limited period of time may involve removing a load by ceasing to divert energy produced by a generator connected thereto for a limiting period of time, and re-introducing the load by diverting energy away from the generator once the limited period of time terminates. Reducing a load to accelerate rotation of a plurality of blades for a limited period of time may temporarily increase rotation of the plurality of blades to introduce a phase shift relative to another plurality of blades, and resume a prior rotational velocity of the plurality of blades (e.g., prior to generating the load) to maintain the phase shift.

By way of a non-limiting example, in FIG. 17, the coordinating signals may reduce a load and thereby accelerate rotation of at least one of first plurality of blades 1710A and 1710B and second plurality of blades 1708A and 1708B for a limited period of time. The reduction of the load may impose first phase correction 1720 between first plurality of blades 1710A and 1710B and second plurality of blades 1708A and 1708B.

Some embodiments involve calculating the coordinating signals includes applying a Maximum Power Point Tracking (MPPT) protocol to the plurality of geographically-associated fluid turbines. Maximum Power Point Tracking (MPPT) protocol may involve transmitting signals to adjust a rotational speed of a fluid turbine, as described elsewhere in this disclosure. In some embodiments, each fluid turbine may be associated with a chart or lookup table (e.g., stored in memory) mapping variations of power output versus rotational speed under various fluid speeds. The at least one processor may use the chart or lookup table to select an optimal (e.g., or near optimal) rotational speed for each associated fluid turbine, corresponding to a peak (e.g., or near peak) power output under a given fluid speed. In some embodiments, the at least one processor may apply one or more algorithms, such as a machine learning algorithm. The at least one processor may transmit signals to adjust the rotational speed of each geographically-associated fluid turbine to achieve the selected rotational speed for each fluid turbine, e.g., in compliance with an MPPT protocol.

By way of a non-limiting example, in FIG. 17, the at least one processor (e.g., at least one processor 308, 428, and/or 512) may apply an MPPT protocol (e.g., based on a version of chart 1200 associated with each of fluid turbines 1702, 1704, and 1706) to calculate the coordinating signals for each of fluid turbines 1702, 1704, and 1706 of cluster 1700.

Some embodiments involve obtaining at least one of a time-based or a frequency-based power wave for the plurality of geographically-associated fluid turbines, and wherein applying the MPPT protocol includes applying the at least one of the time-based or frequency based power wave to the MPPT protocol. A time-based power wave may refer to a correspondence (e.g., a graph, a chart, a table, an algorithm, a numerical or analytical model) indicating how much power is outputted at any given moment over time. A frequency-based power wave may refer to a correspondence (e.g., a graph, a chart, a table, an algorithm, a numerical or analytical model) indicating how much power is outputted at any particular frequency over a range of frequencies. A time-based power wave may be converted to a frequency-based power wave, and vice-versa, using, for example, a mathematical transformation, such as a Fourier transform. Applying the at least one of the time-based or frequency based power wave to the MPPT protocol may include transmitting signals to adjust a rotational speed of a fluid turbine based on a time-based or frequency-based power wave to cause a generator to operate according to the adjusted rotational speed and thereby produce a maximum (or near-maximum) power output.

By way of a non-limiting example, FIG. 14 shows graph 1400 representing a time-based power wave for a plurality of geographically-associated fluid turbines. For example, time-based power wave may correspond to an aggregate AC power output (e.g., aggregate AC power output 722 of FIGS. 7 to 11) for fluid turbines 1702, 1704, and 1706 of FIG. 17. The at least one processor (e.g., at least one processor 308, 428, and/or 512) may apply graph 1400 representing a time-based power wave to the MPPT protocol. For example, a frequency of graph 1400 may indicate an average rotational velocity for the plurality of geographically-associated fluid turbine, and an amplitude of graph 1400 may indicate a peak (or near peak) power output.

In some embodiments, each blade of the first plurality of blades and the second plurality of blades includes a flow-receiving surface and a flow-deflecting surface opposite the flow-receiving surface. An opposite surface may refer to an opposing surface of an object. For example, a substantially flat object may have an upwards facing surface and a downwards facing surface, opposite the upwards facing surface. A flow-receiving surface may refer to a first blade surface (e.g., or edge) configured to catch or interact with a fluid flow to create a differential fluid velocity between the first blade surface and a second blade surface opposite the first blade surface. The differential fluid velocity may create a pressure differential promoting rotation of the blade. A flow-deflecting surface may refer to the second blade surface (e.g., or edge) opposite the flow-receiving surface and may be configured to push a fluid flow away from the blade as the blade rotates. In some embodiments, a flow-receiving surface of a blade may be substantially flat, and a flow-deflecting surface of a blade may be curved, causing higher fluid pressure on the substantially flat flow-receiving surface and lower fluid pressure on the curved flow-deflecting surface. The difference in fluid pressure may induce a force (e.g., a lift force) promoting blade motion.

By way of a non-limiting example, in FIG. 17, each of blade of the first plurality of blades 1710A and 1710B and second plurality of blades 1708A and 1708B may include a flow receiving surface 1724 (e.g., see concave surfaces of second plurality of blades 1708A and 1708B) and a flow-deflecting surface 1726 (e.g., see convex surfaces of first plurality of blades 1710A and 1710B).

In some embodiments, each flow-receiving surface is configured to receive a first rotation-inducing fluid flow. A rotation-inducing fluid flow may refer to a fluid flow that, when incident on one or more blades of a fluid turbine, may cause the one or more blades to spin. A flow-receiving surface configured to receive a rotation-inducing fluid flow may refer to at least a portion of a blade surface configured to catch or interact with a fluid flow to produce a differential fluid velocity between the flow-receiving surface and the opposing flow-deflecting surface of the blade. The differential fluid velocity may cause a pressure differential promoting rotational motion of the blade. For example, a blade having a flow-receiving surface may have a curved or airfoil shape.

By way of a non-limiting example, in FIG. 17, flow-receiving surfaces 1724 of second plurality of blades 1708A and 1708B may receive first fluid turbine downstream fluid flow 1714 from first fluid turbine 1704, e.g., in addition to fluid flow 1718, inducing a rotation of second plurality of blades 1708A and 1708B.

In some embodiments, the flow-deflecting surfaces of the first plurality of blades are configured to at least partially generate the first fluid turbine downstream fluid flow in a first angular region of the plurality of blades during rotation. An angular region of the plurality of blades during rotation may refer to an arc (e.g., a fraction of a revolution) spanned by the plurality of blades as the rotating blades encompass a full revolution (e.g., 360°) during rotation. An angular region may be measured in angles, radians, minutes, and/or seconds, and may correspond to a fraction of a complete revolution. An angular region of the plurality of blades during rotation may remain substantially fixed as the blades rotate such that each blade of the plurality of blades may enter and exit the angular region in each full revolution. For example, the angular region may span a 30° arc between 75° and 105° of a full (e.g., counterclockwise 360°) revolution on a cartesian plane. Flow-deflecting surfaces of a plurality of blades configured to at least partially generate the first fluid turbine downstream fluid flow in a first angular region may refer to fluid-dynamic properties of the flow-deflecting surfaces of the plurality of blades that cause a fluid flow to be pushed away (e.g., deflected) from a flow-deflecting surface when the blade is located in the angular region. The flow-deflecting surfaces of the plurality of blades may deflect more fluid flow in some angular regions than others, e.g., depending on a shape of the flow-deflecting surface and/or on a direction of the fluid flow.

By way of a non-limiting example, in FIG. 17, flow-deflecting surfaces 1726 of first plurality of blades 1710A and 1710B may at least partially generate first fluid turbine downstream fluid flow 1714 in a first angular region 1728 of the plurality of blades during rotation.

In some embodiments, the first angular region is characterized by a flow velocity greater than a flow velocity in a second angular region. A flow velocity may refer to an instantaneous speed or rate of a flow or a speed or rate of flow over a time interval. A (e.g., first) flow velocity greater than a (e.g., second) flow velocity may refer to a first rate of motion of a continuous flow faster or higher than a second rate of rate of motion of a continuous flow. In a fixed time period, a fluid moving at the first flow velocity may cover a greater distance than a fluid moving at the second flow velocity. A first angular region (e.g., of a plurality of blades) characterized by a flow velocity greater than a flow velocity in a second angular region (e.g., of the plurality of blades) may refer to a first rate of motion of a continuous flow associated with the first angular region (e.g., a first fraction of a revolution) being faster or greater than a second rate of motion of a continuous flow associated with a different angular region, e.g., outside the first angular region. In some embodiments, the first angular region may be characterized by a greater average flow velocity over time, a greater maximum or minimum flow velocity, and/or a narrower standard deviation in flow velocity than a second angular region. For example, the first angular region may correspond to a 30° arc about 12-o'clock, and a second angular region may correspond to a 30° arc about 3-o'clock. The flow velocity of a fluid flow deflected from a blade located in the 30° arc about 12-o'clock may be greater than the flow velocity of a fluid flow deflected from a blade located in in the 30° arc about 3-o'clock.

By way of a non-limiting example, in FIG. 19, first angular region 1922 of the plurality of blades shown in image signal 1902 may be characterized by a flow velocity greater than second angular region 1924 shown in image signal 1906. For example, first angular region 1922 may be characterized by a flow velocity greater than any angular region external to angular region 1922. By way of another non-limiting example, in FIG. 17, first angular region 1728 of first plurality of blades 1710A and 1710B may be characterized by a flow velocity (e.g., of first fluid turbine downstream fluid flow) greater than an angular region of first plurality of blades 1710A and 1710B external to angular region 1728.

In some embodiments, the first phase correction is configured to cause the first fluid turbine downstream fluid flow in the first angular region to be at least partially received by the flow-receiving surface of the second plurality of blades to thereby achieve the greater aggregate power output. A phase correction configured to cause a fluid turbine downstream fluid flow in the first angular region to be at least partially received by a flow-receiving surface of the second plurality of blades may include applying a phase correction to adjust a distance and/or orientation of a flow-receiving surface of a blade of the second plurality of blades relative to a flow-deflecting surface of a blade of the first plurality of blades when the blade of the first plurality of blades is located in the first angular region. The phase correction may allow the flow-receiving surface of the blade of the second plurality of blades to receive at least part of the first fluid turbine downstream fluid flow deflected from the flow-deflecting surface of the blade of the first plurality of blades. Since the blade of the first plurality of blades deflecting the first fluid turbine downstream fluid flow is located in the first angular region, the flow velocity of the first fluid turbine downstream fluid flow may be greater than if the blade were located external to the first angular region. Consequently, the flow-receiving surface of a blade of the second plurality of blades may receive the first fluid turbine downstream fluid flow having a greater velocity (e.g., due to being deflected from the first angular region). The greater velocity may allow the second fluid turbine to generate a differential power output, e.g., in addition to the power output generated from the fluid flow absent the first fluid turbine downstream fluid flow. Aggregating the differential power output to the power generated by the plurality of geographically-associated fluid turbines may achieve the greater aggregate power output.

By way of a non-limiting example, in FIG. 19, image signals 1902 includes a first angular region 1922. When a flow-deflecting surface of a blade is located in first angular region 1922, the fluid turbine downstream fluid flow 1714 deflected from the flow-deflecting surface may be greater than a fluid turbine downstream fluid flow deflected from other angular regions. In FIG. 17, the first phase correction may align flow-receiving surface 1724 of blade 1708B of second fluid turbine 1702 with flow-deflecting surface 1726 of blade 1710A of first fluid turbine 1704 when flow-deflecting surface 1726 is located in first angular region 1728. Consequently, flow-receiving surface 1724 of blade 1708B may receive fluid turbine downstream fluid flow 1714 having a greater fluid velocity, increasing the rotational speed of second fluid turbine 1702. The increased rotational speed of second fluid turbine 1702 may allow achieving a greater aggregate power output (e.g., see aggregate power output 440 of FIG. 4).

In some embodiments, the at least one processor is configured to determine from the first signals and the second signals that the first plurality of blades has a similar phase cycle as the second plurality of blades. A phase cycle may refer to a single element (e.g., a motif) of a sequence of repeating elements that form a pattern characterizing a time-based waveform for a signal (e.g. a power signal). Characteristics of a phase cycle (e.g. for a signal) may include one or more of a time when a cycle begins, a time when a cycle ends, a duration of a cycle, a time in a cycle when a signal reaches a maximum value, a time in cycle when a signal reaches a minimum value, a time in a cycle when a signal reaches zero, and/or any other attribute of a waveform describing a signal over time. A phase cycle for a plurality of blades may include a correspondence between a position and/or orientation of a plurality of rotating blades at a given point time and a time-based waveform of a power signal generated by the plurality of rotating blades. A phase cycle for a plurality of blade may indicate a position and/or orientation for a plurality of blades corresponding to a peak (or near-peak) power output, a minimum (or near-minimum) power output, a zero power output, a duration of a complete revolution, a time when a revolution begins, a time when a revolution ends, and/or any other attribute characterizing a rotation of plurality of rotating blades associated with a power output waveform. In some embodiment, a phase cycle for a plurality of blades may include a direction (e.g., clockwise or counter-clockwise) of rotation.

In some embodiments, outputting the coordinating signals to impose the first phase correction is configured to cause the first plurality of blades and the second plurality of blades to assume differing phase cycles. Differing phase cycles may refer to two or more phase cycles (e.g. for two or more pluralities of rotating blades) distinguished by at least one characteristic of a phase cycle. Assume may refer to accepting or taking on. Causing a first plurality of blades and a second plurality of blades to assume differing phase cycles may involve adjusting (e.g., temporarily or on a continual basis) a rotation of the first and/or second plurality of blades (e.g., by adjusting a load imposed on a generator connected thereto) such that a phase cycle of the first plurality of blades may be distinguished from the second plurality of blades by at least one phase cycle characteristic. For example, the at least one processor may transmit coordinating signals causing a phase cycle for a first plurality of blades to be longer/shorter than a phase cycle for a second plurality of blades, and/or cause a maximum/minimum power output for the first plurality of blades to occur before/after a maximum/minimum power output for the second plurality of blades. In some embodiments, the at least one processor may determine that the first plurality of blades and second plurality of blades have differing phase cycles, and the coordinating signals may cause the first plurality of blades and the second plurality of blades to assume substantially similar phase cycles.

By way of a non-limiting example, in FIG. 4, the at least one processor (e.g., processor 308, 428, and/or 512) may determine from the first signals received from at least one sensor 418A and from the second signals received from at least one sensor 418B that the first plurality of blades of first fluid turbine 404A has a similar phase cycle as the second plurality of blades of second fluid turbine 404B (e.g., they rotate in unison, beginning and ending each revolution at the same orientation). The at least one processor may output the coordinating signals (e.g., to a version of braking circuit 1300 associated with each of first fluid turbine 404A and second fluid turbine 404B) to cause the first plurality of blades of first fluid turbine 404A to assume a differing phase cycles. For example, a phase cycle of first fluid turbine 404A may cause a peak power output to occur 1 second before a peak power output of second fluid turbine 404A.

Some embodiments involve determining from the first signals and the second signals that an orientation of the first plurality of blades is similar to an orientation of the second plurality of blades. An orientation of a plurality of blades may refer to a position (e.g., a relative position) of at least one blade of the plurality of blades (e.g., at a given instant in time). For example, an orientation for a plurality of blades may be such that at a beginning of each phase cycle, a first blade of the first plurality of blades faces north and a second blade faces south and halfway through the phase cycle, the first blade faces south, and the second blade faces north. A similar orientation may refer to two (or more) equivalent of matching orientations. An orientation of a first plurality of blades similar to an orientation of a second plurality of blades may involve the first and second plurality of blades initiating rotation from a substantially equivalent orientation (e.g., each including a blade oriented in substantially the same direction), and continuing rotation at substantially the same rotational velocity (e.g., in unison) thereby preserving the substantially equivalent orientation over time.

In some embodiments, outputting the coordinating signals is configured to cause the orientation of the first plurality of blades to differ from the orientation of the second plurality of blades. A different orientation may refer to a dissimilar or inequivalent orientation. For example, at the beginning of a phase cycle, one blade of a first plurality of blades may face north and a second blade of the first plurality of blades may face south, whereas one blade of a second plurality of blades may face west and a second blade of the second plurality of blades may face east. In such a case, the orientation of the first plurality of blades may be different than the orientation of the second plurality of blades by a quarter of a cycle (e.g., corresponding to a relative phase shift of 90° in each rotational cycle). Causing an orientation of a first plurality of blades to differ from an orientation of a second plurality of blades may involve adjusting (e.g., temporarily or continually) a rotation of the first and/or second plurality of blades (e.g., by adjusting a load imposed on a generator connected thereto) such that an orientation of the first plurality of blades may be distinguished from an orientation of the second plurality of blades. For example, the at least one processor may adjust a rotational speed of the first and/or second plurality of blades to introduce a relative phase shift therebetween. In some embodiments, the at least one processor may determine from the first and second signals that the orientation of the first and second plurality of blades is different, and the coordinating signals may cause the orientation of the first and second plurality of blades to be substantially similar.

By way of a non-limiting example, in FIG. 4, the at least one processor (e.g., at least one processor 308, 428, and/or 512) may determine from the first signals received from at least one sensor 418A and the second signals received from at least one sensor 418B that an orientation of the first plurality of blades of first fluid turbine 404A is similar to an orientation of the second plurality of blades of second fluid turbine 404B. The at least one processor may output the coordinating signals to cause the orientation of the first plurality of blades of first fluid turbine 404A to differ from the orientation of the second plurality of blades of second fluid turbine 404B.

In some embodiments, the first signals are indicative of first AC signals generated by the first fluid turbine, and wherein the second signals are indicative of second AC signals generated by the second fluid turbine. AC signals may refer to alternating current signals. AC signals generated by a fluid turbine may include AC signals generated by a generator connected to a fluid turbine. When a fluid flow causes a plurality of blades of a fluid turbine to rotate, the rotation of the plurality of blades may cause a corresponding rotation of a rotor of the generator. The rotation of the rotor may cause a fluctuating magnetic field for inducing an alternating current (e.g., AC signals) in copper windings of the generator (e.g., the rotor may include magnets surrounding copper windings located in a stator of the generator, or the reverse). Thus, characteristics (e.g., phase, frequency) of the AC signals generated by a generator connected to a fluid turbine may correspond to characteristics (e.g., phase, frequency) of the rotation of the plurality of blades of the fluid turbine. The at least one processor may use AC signals produced by a generator as an indication of the rotation of the plurality of blades connected thereto (e.g., accounting for one or more gears for adjusting a rotational speed of the plurality of blades and/or rotor).

In some embodiments, the first AC signals are characterized by a frequency and a relative phase corresponding to a frequency and phase of the rotational cycle of the first plurality of rotating blades at particular points in time, and wherein the second AC signals are characterized by a frequency and a relative phase corresponding to a frequency and phase of the rotational cycle of the second plurality of rotating blades at the particular points in time. Frequency may refer to a number of cycles per unit of time (e.g., per second or per minute). A frequency of an AC signal may be measured in Hz (e.g., cycles per second) and a frequency of a rotational cycle of a plurality of blades may be measured as revolutions per minute (e.g., RPM). As noted, a rotation of a plurality of blades of a fluid turbine may correspond to an AC signal produced by a generator connected thereto due to the associated fluctuating magnetic field inducing the AC signal. Thus, a waveform representing an AC signal may correspond to a pattern of rotation of a plurality of blades generating the AC signal in a fluid energy conversion system. Consequently, a frequency of rotation of the plurality of blades may correspond to a frequency of the AC signal (e.g., after accounting for gearing and conversion between RPM and Hz). Similarly, a relative phase of the plurality of blades may correspond to a relative phase of the AC signal. The first AC signals may be associated with the first plurality of rotating blades (e.g., the frequency and phase of the first AC signals may be associated with a rotational frequency and phase of the first plurality of blades, respectively). Similarly, the second AC signals may be associated with the second plurality of rotating blades (e.g., the frequency and phase of the second AC signals may be associated with a rotational frequency and phase of the second plurality of blades, respectively).

By way of a non-limiting example, in FIG. 14, graph 1400 shows a signal indicative of an AC signal. In FIG. 4, the at least one processor (e.g., processor 308, 428, or 512) may receive signals (e.g., corresponding to graph 1400) from power output sensors 512 of sensors 418A and 418B signals indicative of AC power outputs 408A and 408B of first fluid turbine 404A and second fluid turbine 408B, respectively. AC power output 408A may be characterized by a frequency and a relative phase corresponding to a frequency and phase of the rotational cycle of the first plurality of rotating blades of first fluid turbine 404A at particular points in time. Similarly, AC power output 408B may be characterized by a frequency and a relative phase corresponding to a frequency and phase of the rotational cycle of the second plurality of rotating blades of second fluid turbine 404B at the particular points in time. In some embodiments, each fluid turbine of the cluster of fluid turbines includes a rotating shaft to which respective first plurality of blades and second plurality of blades are connected. A shaft may include a pole, a rod, a post, a support, a pylon, or any other axle or axis. A rotating shaft may refer to a pole or rod secured in a manner to allow rotation (e.g., allowing at least one degree of freedom). Blades of a fluid turbine may be connected to a shaft allowing the blades to be supported by the shaft which may rotate with the blades. Connecting the shaft with the blades to a rotor may allow transferring kinetic energy of a flowing fluid to a rotary motion by the rotor to produce electrical energy.

In some embodiments, the first signals are associated with a rotation rate or position detector associated with the shaft of the first fluid turbine, and wherein the second signals are associated with a rotation rate or position detector associated with the shaft of the second fluid turbine. A rotation rate may refer to a number of revolutions per time unit (e.g., measure in Hz or RPM) and may correspond to a frequency. A position detector may include an accelerometer, a gyroscope, magnetometer, a potentiometer, an inductive position sensor, and/or any other sensor configured to measure position. A position detector associated with a shaft of a fluid turbine may include any device that measures a position of the shaft (e.g., a rotational orientation of the shaft). Examples of position detectors include RVDTs, potentiometers, optical encoders, and capacitive sensors. The position detector may transmit signals to at least one processor indicating a position of the position detector over time, allowing the at least one process to detect a rotation rate and/or phase of the rotating shaft.

By way of a non-limiting example, in FIG. 4, each of fluid turbines 404A and 404B may correspond to fluid turbine 106 (FIG. 1) including a rotating shaft 114 to which each respective plurality of blades (e.g., blades 208 and 206 of FIG. 2) may be connected. The first signals (e.g., received from at least one sensor 418A) may be associated with rotation rate measure by rotation sensor 502 (e.g., see FIG. 5, rotation sensor 502 may function as a position detector)

associated with shaft 114 of first fluid turbine 404A, and the second signals (e.g., received from at least one sensor 418B) may be associated with a rotation rate measure by rotation sensor 502 (e.g., functioning as a position detector) associated with shaft 114 of second fluid turbine 404B.

In some embodiments, the plurality of geographically-associated fluid turbines includes a plurality of additional turbines and wherein the coordinating signals are configured to impose additional phase corrections on each of the additional turbines. Additional fluid turbines may refer to other fluid turbines included in the plurality of fluid turbines, other than the first and second fluid turbines. For example, the plurality of fluid turbines may include more than two, more than ten, more than twenty, more than thirty, or any number of fluid turbines. Additional phase corrections of each of the additional fluid turbines may include additional signals transmitted by the at least one processor to each of the additional fluid turbines. Each of the additional signals may adjust a load on one or more of the additional fluid turbines, causing a corresponding adjustment to a phase of the one or more additional fluid turbines. In some embodiments, the at least one processor may cause a different load adjustment to different fluid turbine, thereby subjecting the different fluid turbines to different phase corrections. In some embodiments, the at least one processor may cause the same load adjustment to at least some of the additional fluid turbines, thereby subjecting the at least some of the additional fluid turbines to the same phase correction.

By way of a non-limiting example, in FIG. 22, plurality of geographically-associated fluid turbines 2200 may include a plurality of additional turbines 2206 and 2208. The coordinating signals may impose additional phase corrections on each of the additional turbines 2206 and 2208 (e.g., as well as on fluid turbines 2202 and 2204).

In some embodiments, calculating the coordinating signals is further based on at least one of a blade orientation, a blade rotational rate, or a power output of at least one of the first fluid turbine and the second fluid turbine. A blade orientation may refer to an angle of a blade relative to an axis of rotation, such as a blade pitch or blade yaw. A blade rotational rate may refer to a number of revolutions performed by a blade under a fluid flow per time unit (e.g., measured as RPM or Hz). A power output of a fluid turbine may refer to a power output of a generator connected to a fluid turbine. In some embodiments, calculating the coordinating signals is further based on at least one of a blade orientation, a blade rotational rate, a phase location, or a power output of at least one of the first fluid turbine and the second fluid turbine. A phase location may refer to where the blades are located in their circumferential orbit. A phase location may be measured in angles (e.g., relative to an initial location of a circumferential orbit), and/or as a distance (e.g., a cartesian distance) relative to one or more physical objects (e.g., stationary objects).

By way of a non-limiting example, in FIG. 4, the at least one processor (e.g., at least one processor 308, 428, and/or 512) may calculate the coordinating signals further based on at least one of a blade orientation (e.g., based on data received from pitch control 528 and/or yaw control 526), a blade rotational rate (e.g., based on data received from rotation sensor 502), or a power output (e.g., based on data received from power output sensor 510) of at least one of first fluid turbine 404A and second fluid turbine 404B.

In some embodiments, the at least one processor is associated with a charge controller connected to the plurality of geographically-associated fluid turbines. A charge controller may refer to an electronic device configured to help ensure compliance of a fluid turbine with one or more regulations, specifications, and/or recommendations, as described elsewhere in this disclosure.

By way of a non-limiting example, in FIGS. 8-9, the at least one processor (e.g., at least one processor 308, 428, and/or 512) may be associated with charge controller 802 and/or charge controller 902 connected to plurality 401 of geographically-associated fluid turbines 404. For example, the at least one processor may communicate with the charge controller to control a load for correcting a phase between two or more fluid turbines 404.

In some embodiments, at least one processor is associated with an inverter connected to the plurality of geographically-associated fluid turbines. An inverter may refer to a device or circuitry that converts a direct current (DC) signal to an AC signal (e.g., a DC-to-AC converter), as described elsewhere in this disclosure.

By way of a non-limiting example, in FIGS. 7-11, the at least one processor (e.g., at least one processor 308, 428, and/or 512) may be associated with inverter 434 connected to plurality 401 of geographically-associated fluid turbines 404. For example, the at least one processor may communicate with the inverter to control a load for correcting a phase between two or more fluid turbines 404.

In some embodiments, the at least one processor is associated with a control system external to the plurality of geographically-associated fluid turbines. A control system external to a plurality of geographically-associated fluid turbines may include a control system located remotely to the plurality of geographically-associated fluid turbines (e.g., such that the control system lacks geographical association with the plurality of geographically-associated fluid turbines), a control system housed in a housing separate from the geographically-associated fluid turbines, a control system associated with one or more additional pluralities of geographically-associated fluid turbines, and/or any other configuration for a control system that is separate from the plurality of geographically-associated fluid turbines. For example, the control system may be associated with a cloud computing service in communication with the plurality of geographically-associated fluid turbines. A control system may include at least one processor (e.g., located locally and/or remotely) configured to direct, manage, and/or administer one or more operations of a plurality of geographically-associated fluid turbines.

By way of a non-limiting example, in FIG. 4, at least one processor 428 may be associated with interconnecting circuit 414 functioning as a control system external to plurality 401 of geographically-associated fluid turbines 404.

Some embodiments involve a non-transitory computer readable medium containing instructions that when executed by at least one processor cause the at least one processor to perform operations for synchronizing a plurality of geographically-associated fluid turbines, the operations comprising: receiving first signals indicative of a phase of a rotational cycle of a first plurality of rotating blades of a first fluid turbine of the plurality of geographically-associated fluid turbines, wherein the first plurality of rotating blades is configured to generate a first fluid turbine downstream fluid flow; receiving second signals indicative of a phase of a rotational cycle of a second plurality of rotating blades of a second fluid turbine of the plurality of geographically-associated fluid turbines, wherein the second plurality of rotating blades is configured to receive at least a portion of the first fluid turbine downstream fluid flow and generate a differential power output attributable to the at least portion of the first fluid turbine downstream fluid flow; determining from the first signals and the second signals that greater aggregate power output is achievable through blade phase coordination; determining a phase correction between the first plurality of rotating blades and the second plurality of rotating blades based on the first signals and the second signals, in order to achieve the greater aggregate power output; calculating coordinating signals based on the determined phase correction; and outputting the coordinating signals to impose the phase correction and thereby achieve the greater aggregate power output.

By way of a non-limiting example, in FIG. 4 taken in conjunction with FIG. 17, at least one processor (e.g., processor 428 and/or 512) may receive first signals from at least one sensor 418 associated with first fluid turbine 1704 indicative of a phase of a first plurality of rotating blades (e.g., blades 1710A and 1710B) of first fluid turbine 1704. The first plurality of rotating blades 1710A and 1710B may generate a first fluid turbine downstream fluid flow 1714. The at least one processor may receive second signals from at least one sensor 418 associated with second fluid turbine 1702 indicative of a phase of a rotational cycle of second plurality of rotating blades 1708A and 1708B of second fluid turbine 1702 of plurality of geographically-associated fluid turbines 1700. Second plurality of rotating blades 1708A and 1708B may receive at least a portion of first fluid turbine downstream fluid flow 1714 and generate a differential power output (e.g., see differential power output 1806 in FIG. 18) attributable to the at least portion of first fluid turbine downstream fluid flow 1714. The at least one processor may determine from the first signals and the second signals that greater aggregate power output (e.g., aggregate power output 440) is achievable through blade phase coordination. The at least one processor may determine a phase correction 1720 between first plurality of rotating blades 1710A and 1710B and second plurality of rotating blades 1708A and 1708B based on the first signals and the second signals, in order to achieve the greater aggregate power output. The at least one processor may calculate coordinating signals based on the determined phase correction. The at least one processor may output the coordinating signals to impose phase correction 1720 and thereby achieve the greater aggregate power output 440. For example, the at least one processor may output the coordinating signals to a charge controller (e.g., any of charge controllers 410, 802, or 902), and/or to inverter 434.

Figure 23:
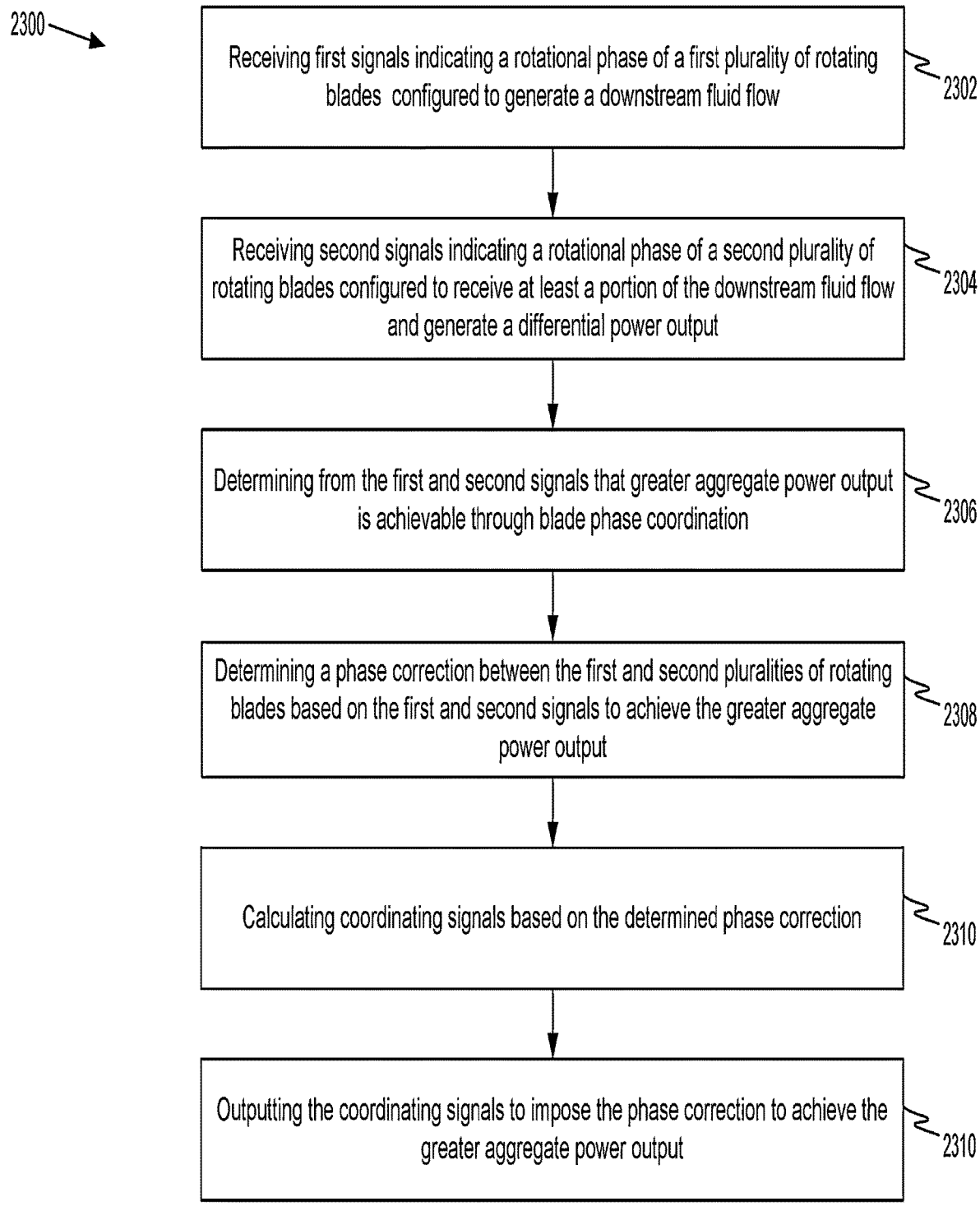
FIG. 23 is a flow diagram of an exemplary process for synchronizing a plurality of geographically-associated fluid turbines, consistent with some embodiments of the present disclosure.

FIG. 23 illustrates a flow diagram of an exemplary process 2300 for synchronizing a plurality of geographically-associated fluid turbines, consistent with embodiments of the present disclosure. In some embodiments, process 2300 may be performed by at least one processor (e.g., processor 428 and/or processor 512) to perform operations or functions described herein. In some embodiments, some aspects of process 2300 may be implemented as software (e.g., program codes or instructions) that are stored in a memory (e.g., memory 430 and/or memory 514) or a non-transitory computer readable medium. In some embodiments, some aspects of process 2300 may be implemented as hardware (e.g., a specific-purpose circuit). In some embodiments, process 2300 may be implemented as a combination of software and hardware.

Referring to FIG. 16, process 2300 includes a step 2302 of receiving first signals indicative of a phase of a rotational cycle of a first plurality of rotating blades of a first fluid turbine of the plurality of geographically-associated fluid turbines, wherein the first plurality of rotating blades is configured to generate a first fluid turbine downstream fluid flow. By way of a non-limiting example, in FIGS. 4 and 17, at least one processor (e.g., processor 428 and/or 512) may receive first signals from at least one sensor 418 associated with first fluid turbine 1704 indicative of a phase of a first plurality of rotating blades (e.g., blades 1710A and 1710B) of first fluid turbine 1704. The first plurality of rotating blades 1710A and 1710B may generate a first fluid turbine downstream fluid flow 1714. Process 2300 includes a step 2304 of receiving second signals indicative of a phase of a rotational cycle of a second plurality of rotating blades of a second fluid turbine of the plurality of geographically-associated fluid turbines, wherein the second plurality of rotating blades is configured to receive at least a portion of the first fluid turbine downstream fluid flow and generate a differential power output attributable to the at least portion of the first fluid turbine downstream fluid flow. By way of a non-limiting example, the at least one processor may receive second signals from at least one sensor 418 associated with second fluid turbine 1702 indicative of a phase of a rotational cycle of second plurality of rotating blades 1708A and 1708B of second fluid turbine 1702 of plurality of geographically-associated fluid turbines 1718. Second plurality of rotating blades 1708A and 1708B may receive at least a portion of first fluid turbine downstream fluid flow 1714 and generate a differential power output (e.g., see differential power output 1806 in FIG. 18) attributable to the at least portion of first fluid turbine downstream fluid flow 1714. Process 2300 includes a step 2306 of determining from the first signals and the second signals that greater aggregate power output is achievable through blade phase coordination. By way of a non-limiting example, The at least one processor may determine from the first signals and the second signals that greater aggregate power output (e.g., aggregate power output 440) is achievable through blade phase coordination. Process 2300 includes a step 2308 of determining a phase correction between the first plurality of rotating blades and the second plurality of rotating blades based on the first signals and the second signals, in order to achieve the greater aggregate power output. By way of a non-limiting example, the at least one processor may determine a phase correction 1720 between first plurality of rotating blades 1710A and 1710B and second plurality of rotating blades 1708A and 1708B based on the first signals and the second signals, in order to achieve the greater aggregate power output. Process 2300 includes a step 2310 of calculating coordinating signals based on the determined phase correction. By way of a non-limiting example, the at least one processor may calculate coordinating signals based on the determined phase correction. Process 2300 includes a step 2312 of outputting the coordinating signals to impose the phase correction and thereby achieve the greater aggregate power output. By way of a non-limiting example, the at least one processor may output the coordinating signals to impose phase correction 1720 and thereby achieve the greater aggregate power output 440.

Examples of inventive concepts are contained in the following clauses which are an integral part of this disclosure.

Clause 1. A system for coordinated braking of a plurality of geographically-associated fluid turbines, the system comprising:
at least one processor configured to:
access memory storing information indicative of a tolerance threshold for at least one operating parameter associated with the plurality of geographically-associated fluid turbines;
receive information from at least one sensor indicative of the at least one operating parameter for a particular fluid turbine among the plurality of geographically-associated fluid turbines;
compare the information indicative of the at least one operating parameter for the particular fluid turbine with the tolerance threshold stored in memory;
determine, based on the comparison, whether the at least one operating parameter for the particular fluid turbine deviates from the tolerance threshold; and
upon a determination that the at least one operating parameter for the particular fluid turbine deviates from the tolerance threshold, send a braking signal to each of the geographically-associated fluid turbines to slow each of the geographically-associated fluid turbines.

Clause 2. The system according to clause 1, wherein the at least one sensor includes a rotational sensor, and wherein the at least one operating parameter corresponds to a rotational speed of the particular fluid turbine.

Clause 3. The system according to clause 1 and 2, wherein the at least one sensor includes a fluid speed detector, and wherein the at least one operating parameter corresponds to fluid speed affecting the particular fluid turbine.

Clause 4. The system according to clause 1 to 3, wherein the at least one sensor includes a vibration sensor, and wherein the at least one operating parameter corresponds to a vibration of the particular fluid turbine.

Claus 5. The system according to clause 1 to 4, wherein the at least one sensor includes a temperature sensor, and wherein the at least one operating parameter corresponds to a temperature of the particular fluid turbine.

Clause 6. The system according to clause 1 to 5, wherein the at least one sensor includes a power output sensor, and wherein the at least one operating parameter corresponds to a power output of the particular fluid turbine.

Clause 7. The system according to any of clauses 1 to 6, wherein the slowing of each of the geographically-associated fluid turbines includes stopping each geographically-associated fluid turbine.

Clause 8. The system according to any of clauses 1 to 7, wherein the at least one processor is further configured to cause locking of each geographically-associated fluid turbine in a stopped state.

Claus 9. The system according to any of clauses 1 to 8, wherein the at least one processor is further configured to receive an unlock signal from a local or remote location and unlocking each of the geographically-associated fluid turbines in response to the unlock signal.

Clause 10. The system according to any of clauses 1 to 9, wherein following the locking, the at least one processor is configured to receive a fluid speed signal, and to cause an unlocking of each geographically-associated fluid turbine when the fluid speed signal corresponds to a fluid speed within the tolerance threshold.

Clause 11. The system according to any of clauses 1 to 10, wherein following the slowing, the at least one processor is configured to receive a fluid speed signal, and to cause a release of the braking for each geographically-associated fluid turbine when the fluid speed signal corresponds to a fluid speed within the tolerance threshold.

Clause 12. The system according to any of clauses 1 to 11, wherein the braking signal is configured to synchronize each fluid turbine in the plurality of geographically-associated fluid turbines.

Clause 13. The system according to any of clauses 1 to 12, wherein synchronizing allows for application of a Maximum Power Point Tracking (MPPT) protocol to the plurality of geographically-associated fluid turbines upon release of braking.

Clause 14. The system according to any of clauses 1 to 13, wherein the synchronizing harmonizes rotational timing for each turbine in the plurality of geographically-associated fluid turbines.

Clause 15. The system according to any of clauses 1 to 14, wherein the synchronizing coordinates a rotational orientation of each turbine in the plurality of geographically-associated turbines.

Clause 16. The system according to any of clauses 1 to 15, wherein the geographically-associated fluid turbines are wind turbines.

Clause 17. The system according to any of clauses 1 to 16, wherein the geographically-associated fluid turbines are water turbines.

Clause 18. A non-transitory computer readable medium containing instructions that when executed by at least one processor cause the at least one processor to perform operations for coordinated braking of a plurality of geographically-associated fluid turbines, the operations comprising:
accessing memory storing information indicative of a tolerance threshold for at least one operating parameter associated with the plurality of geographically-associated fluid turbines;
receiving information from at least one sensor indicative of on the at least one operating parameter for a particular fluid turbine among the plurality of geographically-associated fluid turbines;
compare the information indicative of the at least one operating parameter for the particular fluid turbine with the tolerance threshold stored in memory;
determining, based on the comparison, whether the at least one operating parameter for the particular fluid turbine deviates from the tolerance threshold; and
upon a determination that the at least one operating parameter for the particular fluid turbine exceeds the tolerance threshold, sending a braking signal to each of the geographically-associated fluid turbines to slow each of the geographically-associated fluid turbines.

Clause 19. A method for coordinated braking of a plurality of geographically-associated fluid turbines, the operations comprising:
accessing memory storing information indicative of a tolerance threshold for at least one operating parameter associated with the plurality of geographically-associated fluid turbines;
receiving information from at least one sensor indicative of at least one operating parameter for a particular fluid turbine among the plurality of geographically-associated fluid turbines;
compare the information indicative of the at least one operating parameter for the particular fluid turbine with the tolerance threshold stored in memory;
determining, based on the comparison, whether the at least one operating parameter for the particular fluid turbine deviates from the tolerance threshold; and upon a determination that the at least one operating parameter for the particular fluid turbine exceeds the tolerance threshold, sending a braking signal to each of the geographically-associated fluid turbines to slow each of the geographically-associated fluid turbines.

Clause 20. A system for coordinating MPPT operations for a cluster of geographically-associated fluid turbines, the system comprising:
at least one processor configured to:
receive data from the cluster of geographically-associated fluid turbines;
determine changes to total power output of the cluster based on changes in loading states of individual fluid turbines in the cluster;
select a combination of loading states for the individual fluid turbines in the cluster to coordinate total power output for the cluster; and
transmit the selected combination of loading states to at least some of the individual fluid turbines in the cluster in order to vary rotational speeds of the at least some of the individual fluid turbines in the cluster.

Clause 21. The system according to clause 1-20, wherein at least some of the turbines in the cluster are fluid-dynamically coupled.

Clause 22. The system according to any of clauses 1 to 21, wherein the combination of loading states for the individual fluid turbines in the cluster are selected based on applying an MPPT protocol to each individual fluid turbine to determine an associated individual loading state for each individual fluid turbine and subjecting at least one of the individual loading states for an individual fluid turbine to at least one global constraint for the cluster.

Clause 23. The system according to any of clauses 1 to 22, wherein applying the MPPT protocol to each individual turbine includes, while each individual turbine is in operation in first fluid conditions, initially testing a generator electrical output of the individual turbine based on a sequence of differing loads.

Clause 24. The system according to any of clauses 1 to 23, wherein testing the generator of each individual turbine based on the sequence of differing loads includes simulating the differing loads on the generator and predicting a response of the generator.

Clause 25. The system according to any of clauses 1 to 24, wherein testing the generator of each individual turbine based on the first sequence of differing loads includes applying the differing loads on each generator and measuring a response of each generator.

Clause 26. The system according to any of clauses 1 to 25, wherein selecting the combination of loading states for the individual fluid turbines in the cluster accounts for variations in fluid conditions affecting the cluster.

Clause 27. The system according to any of clauses 1 to 26, wherein the variations in fluid conditions are associated with variations in power outputted by differing ones of the fluid turbines in the cluster.

Clause 28. The system according to any of clauses 1 to 27, wherein selecting the combination of loading states for the individual fluid turbines in the cluster accounts for a spatial distribution of the individual fluid turbines in the cluster.

Clause 29. The system according to any of clauses 1 to 28, wherein the at least one processor is configured to receive, determine, select, and transmit on a continual basis.

Clause 30. The system according to any of clauses 1 to 29, wherein the at least one processor is configured to adjust for varying fluid conditions over time.

Clause 31. The system according to any of clauses 1 to 30, wherein the fluid turbines are wind turbines.

Clause 32. The system according to any of clauses 1 to 31, wherein the fluid turbines are water turbines.

Clause 33. The system according to any of clauses 1 to 32, wherein determining includes calculating or measuring changes to total power output.

Clause 34. The system according to any of clauses 1 to 33, wherein the selected combinations of loading states are configured to cause some fluid turbines in the cluster to operate differently from other fluid turbines in the cluster.

Clause 35. The system according to any of clauses 1 to 34, wherein the differences in operation vary based on changing fluid conditions.

Clause 36. The system according to any of clauses 1 to 35, wherein the selected combinations of loading states vary over time for differing combinations of fluid turbines in the cluster.

Clause 37. The system according to any of clauses 1 to 35, wherein the differing operations in the cluster include at least one of a rotational speed (RPM), a voltage output, a current output, a direction of rotation, a blade orientation to a fluid flow, or a relative blade orientation between at least two fluid turbines in the cluster.

Clause 38. The system according to any of clauses 1 to 37, wherein the cluster of fluid turbines includes horizontal axis turbines.

Clause 39. The system according to any of clauses 1 to 38, wherein the cluster of fluid turbines includes vertical axis turbines.

Clause 40. The system according to any of clauses 1 to 39, wherein an upper-level MPPT protocol is applied at a DC stage through a charge controller.

Clause 41. The system according to any of clauses 1 to 40, wherein an upper-level MPPT protocol is applied at an AC stage through an inverter.

Clause 42. A non-transitory computer readable medium containing instructions that when executed by at least one processor cause the at least one processor to perform operations for coordinating MPPT operations for a cluster of geographically-associated fluid turbines, the operations comprising:
receiving data from the cluster of geographically-associated fluid turbines;
determining changes to total power output of the cluster based on changes in loading states of individual fluid turbines in the cluster;
selecting a combination of loading states for the individual fluid turbines in the cluster to coordinate total power output for the cluster; and
transmitting the selected combination of loading states to at least some of the individual fluid turbines in the cluster in order to vary rotational speeds of the at least some of the individual fluid turbines in the cluster.

Clause 43. A method for coordinating MPPT operations for a cluster of geographically-associated fluid turbines, the method comprising:

receiving data from the cluster of geographically-associated fluid turbines;

determining changes to total power output of the cluster based on changes in loading states of individual fluid turbines in the cluster;

selecting a combination of loading states for the individual fluid turbines in the cluster to coordinate total power output for the cluster; and transmitting the selected combination of loading states to at least some of the individual fluid turbines in the cluster in order to vary rotational speeds of the at least some of the individual fluid turbines in the cluster.

Clause 44. A system for synchronizing a plurality of geographically-associated fluid turbines, the system comprising:

at least one processor configured to:

receive first signals indicative of a phase of a rotational cycle of a first plurality of rotating blades of a first fluid turbine of the plurality of geographically-associated fluid turbines, wherein the first plurality of rotating blades is configured to generate a first fluid turbine downstream fluid flow;

receive second signals indicative of a phase of a rotational cycle of a second plurality of rotating blades of a second fluid turbine of the plurality of geographically-associated fluid turbines, wherein the second plurality of rotating blades is configured to receive at least a portion of the first fluid turbine downstream fluid flow and generate a differential power output attributable to the at least portion of the first fluid turbine downstream fluid flow;

determine from the first signals and the second signals that greater aggregate power output is achievable through blade phase coordination;

determine a phase correction between the first plurality of rotating blades and the second plurality of rotating blades based on the first signals and the second signals, in order to achieve the greater aggregate power output;

calculate coordinating signals based on the determined phase correction; and output the coordinating signals to impose the phase correction and thereby achieve the greater aggregate power output.

Clause 45. The system of clause 44, wherein the at least one processor is further configured to receive third signals indicative of a phase of a rotational cycle of a third plurality of rotating blades of a third fluid turbine of the plurality of geographically-associated fluid turbines, wherein the third plurality of rotating blades is configured to generate a third fluid turbine downstream fluid flow;

receive fourth signals indicative of a phase of a rotational cycle of a fourth plurality of rotating blades of a fourth fluid turbine of the plurality of geographically-associated fluid turbines, wherein the fourth plurality of rotating blades is configured to receive at least a portion of the third fluid turbine downstream fluid flow and generate a differential power output attributable to the at least portion of the third fluid turbine downstream fluid flow, wherein calculating coordinating signals is additionally based on the third signals and the fourth signals, the coordinating signals being further configured to impose an additional phase correction between the third plurality of rotating blades and the fourth plurality of rotating blades in order to achieve the greater aggregate power output, and wherein outputting the coordinating signals is further configured to impose the additional phase correction and thereby achieve the greater aggregate power output.

Clause 46. The system according to any of clauses 1 to 45, wherein each blade of the first plurality of blades and the second plurality of blades includes a flow-receiving surface and a flow-deflecting surface opposite the flow-receiving surface, wherein each flow-receiving surface is configured to receive a first rotation-inducing fluid flow, and wherein the flow-deflecting surfaces of the first plurality of blades are configured to at least partially generate the first fluid turbine downstream fluid flow in a first angular region of the plurality of blades during rotation, wherein the first angular region is characterized by a flow velocity greater than a flow velocity in a second angular region, and wherein the first phase correction is configured to cause the first fluid turbine downstream fluid flow in the first angular region to be at least partially received by the flow-receiving surface of the second plurality of blades to thereby achieve the greater aggregate power output.

Clause 47. The system according to any of clauses 1 to 46, wherein the coordinating signals are configured to generate a load for slowing rotation of at least one of the first plurality of blades and the second plurality of blades for a limited period of time, thereby imposing the first phase correction between the first plurality of blades and the second plurality of blades.

Clause 48. The system according to any of clauses 1 to 47, wherein the coordinating signals are configured to alter application of the load to at least one generator connected to at least one of the first fluid turbine and the second fluid turbine.

Clause 49. The system according to any of clauses 1 to 48, wherein the coordinating signals are configured to reduce a load and thereby accelerate rotation of at least one of the first plurality of blades and the second plurality of blades for a limited period of time, thereby imposing the first phase correction between the first plurality of blades and the second plurality of blades.

Clause 50. The system according to any of clauses 1 to 49, wherein the first fluid turbine is located upstream of the second turbine.

Clause 51. The system according to any of clauses 1 to 50, wherein calculating the coordinating signals includes applying a Maximum Power Point Tracking (MPPT) protocol to the plurality of geographically-associated fluid turbines.

Clause 52. The system according to any of clauses 1 to 51, wherein the at least one processor is further configured to obtain at least one of a time-based or a frequency-based power wave for the plurality of geographically-associated fluid turbines, and wherein applying the MPPT protocol includes applying the at least one of the time-based or frequency based power wave to the MPPT protocol.

Clause 53. The system according to any of clauses 1 to 52, wherein the plurality of geographically-associated fluid turbines are wind turbines, and wherein the fluid is flowing air.

Clause 54. The system according to any of clauses 1 to 53, wherein the plurality of geographically-associated fluid turbines are water turbines, and wherein the fluid is flowing water.

Clause 55. The system according to any of clauses 1 to 54, wherein rotational axes of the first fluid turbine and the second fluid turbine are substantially vertical.

Clause 56. The system according to any of clauses 1 to 55, wherein the at least one processor is configured to determine from the first signals and the second signals that the first plurality of blades has a similar phase cycle as the second plurality of blades, and wherein outputting the coordinating signals to impose the first phase correction is configured to cause the first plurality of blades and the second plurality of blades to assume differing phase cycles.

Clause 57. The system according to any of clauses 1 to 56, wherein the at least one processor is configured to determine from the first signals and the second signals that an orientation of the first plurality of blades is similar to an orientation of the second plurality of blades, and wherein outputting the coordinating signals is configured to cause the orientation of the first plurality of blades to differ from the orientation of the second plurality of blades.

Clause 58. The system according to any of clauses 1 to 57, wherein each blade of the first plurality of blades and the second plurality of blades is a lift blade.

Clause 59. The system according to any of clauses 1 to 58, wherein the first fluid turbine and the second fluid turbine are similarly shaped.

Clause 60. The system according to any of clauses 1 to 59, wherein rotational axes of the first fluid turbine and the second fluid turbine are substantially horizontal.

Clause 61. The system according to any of clauses 1 to 60, wherein the first signals are indicative of first AC signals generated by the first fluid turbine, and wherein the second signals are indicative of second AC signals generated by the second fluid turbine, wherein the first AC signals are characterized by a frequency and a relative phase corresponding to a frequency and phase of the rotational cycle of the first plurality of rotating blades at particular points in time, and wherein the second AC signals are characterized by a frequency and a relative phase corresponding to a frequency and phase of the rotational cycle of the second plurality of rotating blades at the particular points in time.

Clause 62. The system according to any of clauses 1 to 61, wherein each fluid turbine of the cluster of fluid turbines includes a rotating shaft to which respective first plurality of blades and second plurality of blades are connected, wherein the first signals are associated with a rotation rate or position detector associated with the shaft of the first fluid turbine, and wherein the second signals are associated with a rotation rate or position detector associated with the shaft of the second fluid turbine.

Clause 63. The system according to any of clauses 1 to 62, wherein the plurality of geographically-associated fluid turbines includes a plurality of additional turbines and wherein the coordinating signals are configured to impose additional phase corrections on each of the additional turbines.

Clause 64. The system according to any of clauses 1 to 63, wherein the first signals and second signals are image signals received from at least one image sensor.

Clause 65. The system according to any of clauses 1 to 64, wherein calculating the coordinating signals is further based on at least one of a blade orientation, a blade rotational rate, or a power output of at least one of the first fluid turbine and the second fluid turbine.

Clause 66. The system according to any of clauses 1 to 65, wherein the at least one processor is associated with a charge controller connected to the plurality of geographically-associated fluid turbines.

Clause 67. The system according to any of clauses 1 to 66, wherein the at least one processor is associated with an inverter connected to the plurality of geographically-associated fluid turbines.

Clause 68. The system according to any of clauses 1 to 67, wherein the at least one processor is associated with a control system external to the plurality of geographically-associated fluid turbines.

Clause 69. A non-transitory computer readable medium containing instructions that when executed by at least one processor cause the at least one processor to perform operations for synchronizing a plurality of geographically-associated fluid turbines, the operations comprising:
receiving first signals indicative of a phase of a rotational cycle of a first plurality of rotating blades of a first fluid turbine of the plurality of geographically-associated fluid turbines, wherein the first plurality of rotating blades is configured to generate a first fluid turbine downstream fluid flow;
receiving second signals indicative of a phase of a rotational cycle of a second plurality of rotating blades of a second fluid turbine of the plurality of geographically-associated fluid turbines, wherein the second plurality of rotating blades is configured to receive at least a portion of the first fluid turbine downstream fluid flow and generate a differential power output attributable to the at least portion of the first fluid turbine downstream fluid flow;
determining from the first signals and the second signals that greater aggregate power output is achievable through blade phase coordination;
determining a phase correction between the first plurality of rotating blades and the second plurality of rotating blades based on the first signals and the second signals, in order to achieve the greater aggregate power output
calculating coordinating signals based on the determined phase correction; and
outputting the coordinating signals to impose the phase correction and thereby achieve the greater aggregate power output.

Clause 70. A method for synchronizing a plurality of geographically-associated fluid turbines, the method comprising:
receiving first signals indicative of a phase of a rotational cycle of a first plurality of rotating blades of a first fluid turbine of the plurality of geographically-associated fluid turbines, wherein the first plurality of rotating blades is configured to generate a first fluid turbine downstream fluid flow;
receiving second signals indicative of a phase of a rotational cycle of a second plurality of rotating blades of a second fluid turbine of the plurality of geographically-associated fluid turbines, wherein the second plurality of rotating blades is configured to receive at least a portion of the first fluid turbine downstream fluid flow and generate a differential power output attributable to the at least portion of the first fluid turbine downstream fluid flow;

determining from the first signals and the second signals that greater aggregate power output is achievable through blade phase coordination;

determining a phase correction between the first plurality of rotating blades and the second plurality of rotating blades based on the first signals and the second signals, in order to achieve the greater aggregate power output;

calculating coordinating signals based on the determined phase correction; and outputting the coordinating signals to impose the phase correction and thereby achieve the greater aggregate power output.

Disclosed embodiments may include any one of the following bullet-pointed features alone or in combination with one or more other bullet-pointed features, whether implemented as a system and/or method, by at least one processor or circuitry, and/or stored as executable instructions on non-transitory computer readable media or computer readable media.

A system for coordinated braking;

a plurality of geographically-associated fluid turbines;

at least one processor configured to access memory storing information;

information indicative of a tolerance threshold for at least one operating parameter associated with a plurality of geographically-associated fluid turbines;

at least one processor configured to receive information from at least one sensor;

information indicative of at least one operating parameter for a particular fluid turbine among a plurality of geographically-associated fluid turbines;

at least one processor configured to compare information indicative of the at least one operating parameter for the particular fluid turbine with a tolerance threshold stored in memory;

at least one processor configured to determine, based on a comparison, whether the at least one operating parameter for a particular fluid turbine deviates from a tolerance threshold;

at least one processor configured to send a braking signal to each of a plurality of geographically-associated fluid turbines;

slowing each of the geographically-associated fluid turbines upon a determination that at least one operating parameter for a particular fluid turbine deviates from a tolerance threshold;

at least one sensor including a rotational sensor;

at least one operating parameter corresponding to a rotational speed of the particular fluid turbine;

at least one sensor including a fluid speed detector;

at least one operating parameter corresponding to fluid speed affecting the particular fluid turbine;

at least one sensor including a vibration sensor;

at least one operating parameter corresponding to a vibration of the particular fluid turbine;

at least one sensor including a temperature sensor;

at least one operating parameter corresponding to a temperature of the particular fluid turbine;

at least one sensor including a power output sensor;

at least one operating parameter corresponding to a power output of the particular fluid turbine;

stopping each geographically-associated fluid turbine;

at least one processor configured to cause locking of each geographically-associated fluid turbine in a stopped state;

at least one processor configured to receive an unlock signal;

a local or remote location;

at least one processor configured to unlock each of the geographically-associated fluid turbines in response to an unlock signal;

at least one processor configured to receive a fluid speed signal;

at least one processor configured to cause an unlocking of each geographically-associated fluid turbine;

a fluid speed signal corresponding to a fluid speed within a tolerance threshold;

at least one processor configured to receive a fluid speed signal;

at least one processor configured to cause a release of a braking for each geographically-associated fluid turbine;

a fluid speed signal corresponding to a fluid speed within a tolerance threshold;

a braking signal configured to synchronize each fluid turbine in a plurality of geographically-associated fluid turbines;

synchronizing to allow for application of a Maximum Power Point Tracking (MPPT) protocol to a plurality of geographically-associated fluid turbines upon release of braking;

synchronizing configured to harmonize rotational timing for each turbine in a plurality of geographically-associated fluid turbines;

synchronizing configured to coordinate a rotational orientation of each turbine in a plurality of geographically-associated turbines;

a plurality of geographically-associated fluid turbines including wind turbines;

a plurality of geographically-associated fluid turbines including water turbines;

a non-transitory computer readable medium containing instructions that when executed by at least one processor cause the at least one processor to perform operations for coordinated braking of a plurality of geographically-associated fluid turbines;

accessing memory storing information indicative of a tolerance threshold for at least one operating parameter associated with a plurality of geographically-associated fluid turbines;

receiving information from at least one sensor indicative of one of at least one operating parameter for a particular fluid turbine among a plurality of geographically-associated fluid turbines;

comparing the information indicative of the at least one operating parameter for the particular fluid turbine with the tolerance threshold stored in memory;

determining, based on the comparison, whether the at least one operating parameter for the particular fluid turbine deviates from the tolerance threshold;

upon a determination that at least one operating parameter for a particular fluid turbine exceeds a tolerance threshold, sending a braking signal to each of a plurality of geographically-associated fluid turbines to slow each of the geographically-associated fluid turbines.

a method for coordinated braking of a plurality of geographically-associated fluid turbines;

accessing memory storing information indicative of a tolerance threshold for at least one operating parameter associated with a plurality of geographically-associated fluid turbines;

receiving information from at least one sensor indicative of at least one operating parameter for a particular fluid turbine among a plurality of geographically-associated fluid turbines;

comparing information indicative of at least one operating parameter for a particular fluid turbine with a tolerance threshold stored in memory;

determining, based on a comparison, whether at least one operating parameter for a particular fluid turbine deviates from a tolerance threshold;

upon a determination that at least one operating parameter for a particular fluid turbine exceeds a tolerance threshold, sending a braking signal to each of a plurality of geographically-associated fluid turbines to slow each of the geographically-associated fluid turbines.

a system for coordinating MPPT operations for a cluster of geographically-associated fluid turbines;

at least one processor configured to receive data from a cluster of geographically-associated fluid turbines;

at least one processor configured to determine changes to total power output of a cluster based on changes in loading states of individual fluid turbines in the cluster;

at least one processor configured to select a combination of loading states for an individual fluid turbine in a cluster to coordinate total power output for the cluster;

at least one processor configured to transmit selected combination of loading states to at least some individual fluid turbines in a cluster;

varying rotational speeds of at least some of individual fluid turbines in a cluster;

at least some of turbines in a cluster being fluid-dynamically coupled;

a combination of loading states for individual fluid turbines in a cluster selected based on applying an MPPT protocol to each individual fluid turbine;

determining an associated individual loading state for each individual fluid turbine;

subjecting at least one individual loading state for an individual fluid turbine to at least one global constraint for a cluster;

applying an MPPT protocol to each individual turbine;

initially testing a generator electrical output of an individual turbine based on a sequence of differing loads while each individual turbine is in operation in first fluid conditions;

testing a generator of each individual turbine based on a sequence of differing loads;

simulating differing loads on a generator;

predicting a response of a generator;

testing a generator of each individual turbine based on a first sequence of differing loads by applying the differing loads on each generator and measuring a response of each generator;

selecting a combination of loading states for individual fluid turbines in a cluster to account for variations in fluid conditions affecting the cluster;

variations in fluid conditions associated with variations in power outputted by differing fluid turbines in a cluster;

selecting combination of loading states for individual fluid turbines in a cluster to account for a spatial distribution of the individual fluid turbines in the cluster;

at least one processor configured to receive, determine, select, and transmit on a continual basis;

at least one processor configured to adjust for varying fluid conditions over time;

fluid turbines being wind turbines;

fluid turbines being water turbines;

determining by calculating or measuring changes to total power output;

selected combinations of loading states configured to cause some fluid turbines in a cluster to operate differently from other fluid turbines in the cluster;

differences in operation that vary based on changing fluid conditions;

selected combinations of loading states that vary over time for differing combinations of fluid turbines in a cluster;

differing operations in a cluster including at least one of a rotational speed (RPM), a voltage output, a current output, a direction of rotation, a blade orientation to a fluid flow, or a relative blade orientation between at least two fluid turbines in the cluster;

a cluster of fluid turbines including horizontal axis turbines;

a cluster of fluid turbines including vertical axis turbines;

an upper-level MPPT protocol applied at a DC stage through a charge controller;

an upper-level MPPT protocol applied at an AC stage through an inverter;

a non-transitory computer readable medium containing instructions that when executed by at least one processor cause the at least one processor to perform operations for coordinating MPPT operations for a cluster of geographically-associated fluid turbines;

receiving data from a cluster of geographically-associated fluid turbines;

determining changes to total power output of a cluster based on changes in loading states of individual fluid turbines in the cluster;

selecting a combination of loading states for individual fluid turbines in a cluster to coordinate total power output for the cluster;

transmitting selected combination of loading states to at least some individual fluid turbines in a cluster;

varying rotational speeds of at least some of individual fluid turbines in a cluster;

a method for coordinating MPPT operations for a cluster of geographically-associated fluid turbines;

receiving data from the cluster of geographically-associated fluid turbines;

determining changes to total power output of the cluster based on changes in loading states of individual fluid turbines in the cluster;

selecting a combination of loading states for the individual fluid turbines in a cluster to coordinate total power output for the cluster;

transmitting selected combination of loading states to at least some individual fluid turbines in the cluster;

varying rotational speeds of at least some of the individual fluid turbines in a cluster;

a system for synchronizing a plurality of geographically-associated fluid turbines:

at least one processor configured to receive first signals indicative of a phase of a rotational cycle;

a first plurality of rotating blades of a first fluid turbine of a plurality of geographically-associated fluid turbines, a first plurality of rotating blades configured to generate a first fluid turbine downstream fluid flow;

at least one processor configured to receive second signals indicative of a phase of a rotational cycle;
a second plurality of rotating blades of a second fluid turbine of a plurality of geographically-associated fluid turbines;
a second plurality of rotating blades configured to receive at least a portion of a first fluid turbine downstream fluid flow;
a second plurality of rotating blades configured to generate a differential power output attributable to an at least portion of the first fluid turbine downstream fluid flow;
at least one processor configured to determine from first signals and second signals that greater aggregate power output is achievable through blade phase coordination;
at least one processor configured to determine a phase correction between a first plurality of rotating blades and a second plurality of rotating blades based on first signals and second signals;
achieving a greater aggregate power output;
at least one processor configured to calculate coordinating signals based on a determined phase correction;
at least one processor configured to output coordinating signals to impose a phase correction and thereby achieve a greater aggregate power output;
at least one processor configured to receive third signals indicative of a phase of a rotational cycle of a third plurality of rotating blades of a third fluid turbine of a plurality of geographically-associated fluid turbines;
a third plurality of rotating blades configured to generate a third fluid turbine downstream fluid flow;
at least one processor configured to receive fourth signals indicative of a phase of a rotational cycle of a fourth plurality of rotating blades of a fourth fluid turbine of a plurality of geographically-associated fluid turbines;
a fourth plurality of rotating blades configured to receive at least a portion of a third fluid turbine downstream fluid flow;
a fourth plurality of rotating blades configured to generate a differential power output attributable to an at least portion of a third fluid turbine downstream fluid flow;
calculating coordinating signals additionally based on third signals and fourth signals;
coordinating signals configured to impose an additional phase correction between a third plurality of rotating blades and a fourth plurality of rotating blades in order to achieve the greater aggregate power output;
outputting coordinating signals to impose an additional phase correction and thereby achieve a greater aggregate power output;
each blade of a first plurality of blades and a second plurality of blades including a flow-receiving surface;
each blade of a first plurality of blades and a second plurality of blades including a flow-deflecting surface opposite a flow-receiving surface;
a flow-receiving surface configured to receive a first rotation-inducing fluid flow;
a flow-deflecting surface of a first plurality of blades configured to at least partially generate a first fluid turbine downstream fluid flow;
a first angular region of a plurality of blades during rotation;
a first angular region characterized by a flow velocity greater than a flow velocity in a second angular region;
a first phase correction configured to cause a first fluid turbine downstream fluid flow in a first angular region to be at least partially received by a flow-receiving surface of a second plurality of blades to thereby achieve a greater aggregate power output;
coordinating signals configured to generate a load for slowing rotation of at least one of a first plurality of blades and a second plurality of blades for a limited period of time;
imposing a first phase correction between a first plurality of blades and a second plurality of blades;
coordinating signals configured to alter application of a load to at least one generator connected to at least one of a first fluid turbine and a second fluid turbine;
coordinating signals configured to reduce a load;
coordinating signals configured to accelerate rotation of at least one of a first plurality of blades and a second plurality of blades for a limited period of time;
coordinating signals configured to impose a first phase correction between a first plurality of blades and a second plurality of blades;
a first fluid turbine is located upstream of a second turbine;
at least one processor configured to calculate the coordinating signals by applying a Maximum Power Point Tracking (MPPT) protocol to a plurality of geographically-associated fluid turbines;
at least one processor configured to obtain at least one of a time-based or a frequency-based power wave for a plurality of geographically-associated fluid turbines;
at least one processor configured to apply an MPPT protocol by applying at least one of a time-based or frequency based power wave to the MPPT protocol;
a plurality of geographically-associated fluid turbines being wind turbines;
a fluid being flowing air;
a plurality of geographically-associated fluid turbines being water turbines;
a fluid being flowing water;
rotational axes of first fluid turbine and second fluid turbine being substantially vertical;
the at least one processor configured to determine from first signals and second signals that a first plurality of blades has a similar phase cycle as a second plurality of blades;
outputting coordinating signals to impose a first phase correction;
causing a first plurality of blades and a second plurality of blades to assume differing phase cycles;
at least one processor configured to determine from first signals and second signals that an orientation of a first plurality of blades is similar to an orientation of a second plurality of blades;
outputting coordinating signals configured to cause an orientation of a first plurality of blades to differ from an orientation of a second plurality of blades;
each blade of a first plurality of blades and a second plurality of blades being lift blades;
a first fluid turbine and a second fluid turbine being similarly shaped;
rotational axes of a first fluid turbine and a second fluid turbine being substantially horizontal;
first signals indicative of first AC signals generated by a first fluid turbine;
second signals indicative of second AC signals generated by a second fluid turbine;
first AC signals characterized by a frequency and a relative phase corresponding to a frequency and phase of a rotational cycle of a first plurality of rotating blades at particular points in time;

second AC signals characterized by a frequency and a relative phase corresponding to a frequency and phase of a rotational cycle of a second plurality of rotating blades at the particular points in time;

each fluid turbine of a cluster of fluid turbines including a rotating shaft to which respective first plurality of blades and second plurality of blades are connected;

first signals associated with a rotation rate or position detector associated with a shaft of a first fluid turbine;

second signals associated with a rotation rate or position detector associated with a shaft of a second fluid turbine;

a plurality of geographically-associated fluid turbines including a plurality of additional turbines;

coordinating signals configured to impose additional phase corrections on each of additional turbines;

first signals and second signals being image signals received from at least one image sensor;

calculating coordinating signals based on at least one of a blade orientation, a blade rotational rate, or a power output of at least one of a first fluid turbine and a second fluid turbine;

at least one processor associated with a charge controller connected to a plurality of geographically-associated fluid turbines;

at least one processor associated with an inverter connected to a plurality of geographically-associated fluid turbines;

at least one processor associated with a control system external to a plurality of geographically-associated fluid turbines;

a non-transitory computer readable medium containing instructions that when executed by at least one processor cause the at least one processor to perform operations for synchronizing a plurality of geographically-associated fluid turbines;

receiving first signals indicative of a phase of a rotational cycle of a first plurality of rotating blades of a first fluid turbine of a plurality of geographically-associated fluid turbines;

a first plurality of rotating blades configured to generate a first fluid turbine downstream fluid flow;

receiving second signals indicative of a phase of a rotational cycle of a second plurality of rotating blades of a second fluid turbine of a plurality of geographically-associated fluid turbines;

a second plurality of rotating blades configured to receive at least a portion of a first fluid turbine downstream fluid flow and generate a differential power output attributable to the at least portion of the first fluid turbine downstream fluid flow;

determining from first signals and second signals that greater aggregate power output is achievable through blade phase coordination;

determining a phase correction between a first plurality of rotating blades and a second plurality of rotating blades based on first signals and second signals, in order to achieve the greater aggregate power output;

calculating coordinating signals based on determined phase correction;

outputting coordinating signals to impose a phase correction;

achieving a greater aggregate power output;

a method for synchronizing a plurality of geographically-associated fluid turbines;

receiving first signals indicative of a phase of a rotational cycle of a first plurality of rotating blades of a first fluid turbine of a plurality of geographically-associated fluid turbines;

a first plurality of rotating blades configured to generate a first fluid turbine downstream fluid flow;

receiving second signals indicative of a phase of a rotational cycle of a second plurality of rotating blades of a second fluid turbine of a plurality of geographically-associated fluid turbines;

a second plurality of rotating blades configured to receive at least a portion of a first fluid turbine downstream fluid flow;

a second plurality of rotating blades configured to generate a differential power output attributable to at least a portion of a first fluid turbine downstream fluid flow;

determining from first signals and second signals that greater aggregate power output is achievable through blade phase coordination;

determining a phase correction between a first plurality of rotating blades and a second plurality of rotating blades based on first signals and second signals, in order to achieve the greater aggregate power output;

calculating coordinating signals based on a determined phase correction;

outputting coordinating signals to impose a phase correction;

achieving a greater aggregate power output.

The invention claimed is:

1. A system for coordinating MPPT operations for a cluster of geographically-associated fluid turbines, the system comprising:
   at least one processor configured to:
   receive data from the cluster of geographically-associated fluid turbines, wherein the data includes information associated with a power output of at least one of the geographically-associated fluid turbines;
   determine changes to total power output of the cluster based on the received data and changes in loading states of individual fluid turbines in the cluster, wherein each loading state characterizes an electrical load diverting power generated by the individual fluid turbines;
   select a combination of loading states for at least two of the fluid turbines in the cluster to coordinate total power output for the cluster, wherein each selected loading state characterizes an amount of power diverted; and
   transmit the selected combination of loading states to the at least two fluid turbines in the cluster in order to vary rotational speeds of the at least two fluid turbines in the cluster.

2. The system of claim 1, wherein at least some of the turbines in the cluster are fluid-dynamically coupled.

3. The system of claim 1, wherein the combination of loading states for the individual fluid turbines in the cluster are selected based on applying an MPPT protocol to each individual fluid turbine to determine an associated individual loading state for each individual fluid turbine and subjecting at least one of the individual loading states for an individual fluid turbine to at least one global constraint for the cluster.

4. The system of claim 3, wherein applying the MPPT protocol to each individual turbine includes, while each individual turbine is in operation in first fluid conditions, initially testing a generator electrical output of the individual turbine based on a sequence of differing loads.

5. The system of claim 4, wherein testing the generator of each individual turbine based on the sequence of differing loads includes simulating the differing loads on the generator and predicting a response of the generator.

6. The system of claim 4, wherein testing the generator of each individual turbine based on the first sequence of differing loads includes applying the differing loads on each generator and measuring a response of each generator.

7. The system of claim 1, wherein selecting the combination of loading states for the individual fluid turbines in the cluster accounts for variations in fluid conditions affecting the cluster.

8. The system of claim 7, wherein the variations in fluid conditions are associated with variations in power outputted by differing ones of the fluid turbines in the cluster.

9. The system of claim 1, wherein selecting the combination of loading states for the individual fluid turbines in the cluster accounts for a spatial distribution of the individual fluid turbines in the cluster.

10. The system of claim 1, wherein the at least one processor is configured to receive, determine, select, and transmit on a continual basis.

11. The system of claim 10, wherein the at least one processor is configured to adjust for varying fluid conditions over time.

12. The system of claim 1, wherein the fluid turbines are wind turbines.

13. The system of claim 1, wherein the fluid turbines are water turbines.

14. The system of claim 1, wherein determining includes calculating or measuring changes to total power output.

15. The system of claim 1, wherein the selected combinations of loading states are configured to cause some fluid turbines in the cluster to operate differently from other fluid turbines in the cluster.

16. The system of claim 15, wherein the differences in operation vary based on changing fluid conditions.

17. The system of claim 16, wherein the selected combinations of loading states vary over time for differing combinations of fluid turbines in the cluster.

18. The system of claim 15, wherein the differing operations in the cluster include at least one of a rotational speed (RPM), a voltage output, a current output, a direction of rotation, a blade orientation to a fluid flow, or a relative blade orientation between at least two fluid turbines in the cluster.

19. The system of claim 1, wherein the cluster of fluid turbines includes horizontal axis turbines.

20. The system of claim 1, wherein the cluster of fluid turbines includes vertical axis turbines.

21. The system of claim 1, wherein an upper-level MPPT protocol is applied at a DC stage through a charge controller.

22. The system of claim 1, wherein an upper-level MPPT protocol is applied at an AC stage through an inverter.

23. A non-transitory computer readable medium containing instructions that when executed by at least one processor cause the at least one processor to perform operations for coordinating MPPT operations for a cluster of geographically-associated fluid turbines, the operations comprising:
receiving data from the cluster of geographically-associated fluid turbines, wherein the data includes information associated with a power output of at least one of the geographically-associated fluid turbines;
determining changes to total power output of the cluster based on the received data and changes in loading states of individual fluid turbines in the cluster, wherein each loading state characterizes an electrical load diverting power generated by the individual fluid turbines;
selecting a combination of loading states for at least two of the fluid turbines in the cluster to coordinate total power output for the cluster, wherein each selected loading state characterizes an amount of power diverted; and
transmitting the selected combination of loading states to the at least two fluid turbines in the cluster in order to vary rotational speeds of the at least two fluid turbines in the cluster.

24. A method for coordinating MPPT operations for a cluster of geographically-associated fluid turbines, the method comprising:
receiving data from the cluster of geographically-associated fluid turbines, wherein the data includes information associated with a power output of at least one of the geographically-associated fluid turbines;
determining changes to total power output of the cluster based on the received data and changes in loading states of individual fluid turbines in the cluster, wherein each loading state characterizes an electrical load diverting power generated by the individual fluid turbines;
selecting a combination of loading states for at least two of the fluid turbines in the cluster to coordinate total power output for the cluster, wherein each selected loading state characterizes an amount of power diverted; and
transmitting the selected combination of loading states to the at least two fluid turbines in the cluster in order to vary rotational speeds of the at least two fluid turbines in the cluster.

* * * * *